Dec. 9, 1947. H. L. CLARY ET AL Re. 22,947

MULTIPLYING UNIT

Original Filed June 26, 1939 26 Sheets-Sheet 1

Inventors
Hugh L. Clary
William H. Petit
By Lyon & Lyon
Attorneys

MULTIPLYING UNIT

Original Filed June 26, 1939 26 Sheets-Sheet 2

Inventors
Hugh L. Clary
William H. Pettit

By Lyon & Lyon Attorneys

Dec. 9, 1947. H. L. CLARY ET AL Re. 22,947

MULTIPLYING UNIT

Original Filed June 26, 1939 26 Sheets-Sheet 3

Inventors
Hugh L. Clary
William H. Petit
By Lyon & Lyon
Attorneys

Dec. 9, 1947. H. L. CLARY ET AL Re. 22,947

MULTIPLYING UNIT

Original Filed June 26, 1939 26 Sheets-Sheet 4

Inventors
Hugh L. Clary
William H. Petit
By Lyon & Lyon
Attorneys

Dec. 9, 1947. H. L. CLARY ET AL Re. 22,947

MULTIPLYING UNIT

Original Filed June 26, 1939 26 Sheets-Sheet 5

Inventors

Hugh L. Clary
William H. Petit

By Lyon & Lyon

Attorneys

Dec. 9, 1947. H. L. CLARY ET AL Re. 22,947

MULTIPLYING UNIT

Original Filed June 26, 1939 26 Sheets-Sheet 6

Inventors
Hugh L. Clary
William H. Petit
By Lyon & Lyon
Attorneys

Dec. 9, 1947. H. L. CLARY ET AL Re. 22,947

MULTIPLYING UNIT

Original Filed June 26, 1939 26 Sheets-Sheet 7

Inventors

Hugh L. Clary

William H. Petit

By Lyon & Lyon

Attorneys

MULTIPLYING UNIT

Original Filed June 26, 1939 26 Sheets-Sheet 8

Inventors
Hugh L. Clary
William H. Petit
By Lyon & Lyon
Attorneys

Dec. 9, 1947. H. L. CLARY ET AL Re. 22,947

MULTIPLYING UNIT

Original Filed June 26, 1939 26 Sheets-Sheet 9

Inventors
Hugh L. Clary
William H. Petit
By Lyon & Lyon
Attorneys

MULTIPLYING UNIT

Original Filed June 26, 1939 26 Sheets-Sheet 10

Inventors

Hugh L. Clary
William H. Petit

By Lyon & Lyon

Attorneys

MULTIPLYING UNIT

Original Filed June 26, 1939 26 Sheets-Sheet 11

Inventors

Hugh L. Clary
William H. Petit

By Lyon & Lyon Attorneys

MULTIPLYING UNIT

Original Filed June 26, 1939 26 Sheets-Sheet 12

Inventors
Hugh L. Clary
William H. Petit
By Lyon & Lyon
Attorneys

Inventors
Hugh L. Clary
William H. Petit
By Lyon & Lyon
Attorneys

Dec. 9, 1947. H. L. CLARY ET AL Re. 22,947

MULTIPLYING UNIT

Original Filed June 26, 1939 26 Sheets-Sheet 14

Inventors

Hugh L. Clary
William H. Petit

By Lyon & Lyon

Attorneys

MULTIPLYING UNIT

Original Filed June 26, 1939 26 Sheets-Sheet 15.

Inventors
Hugh L. Clary
William H. Pettit
By Lyon & Lyon
Attorneys

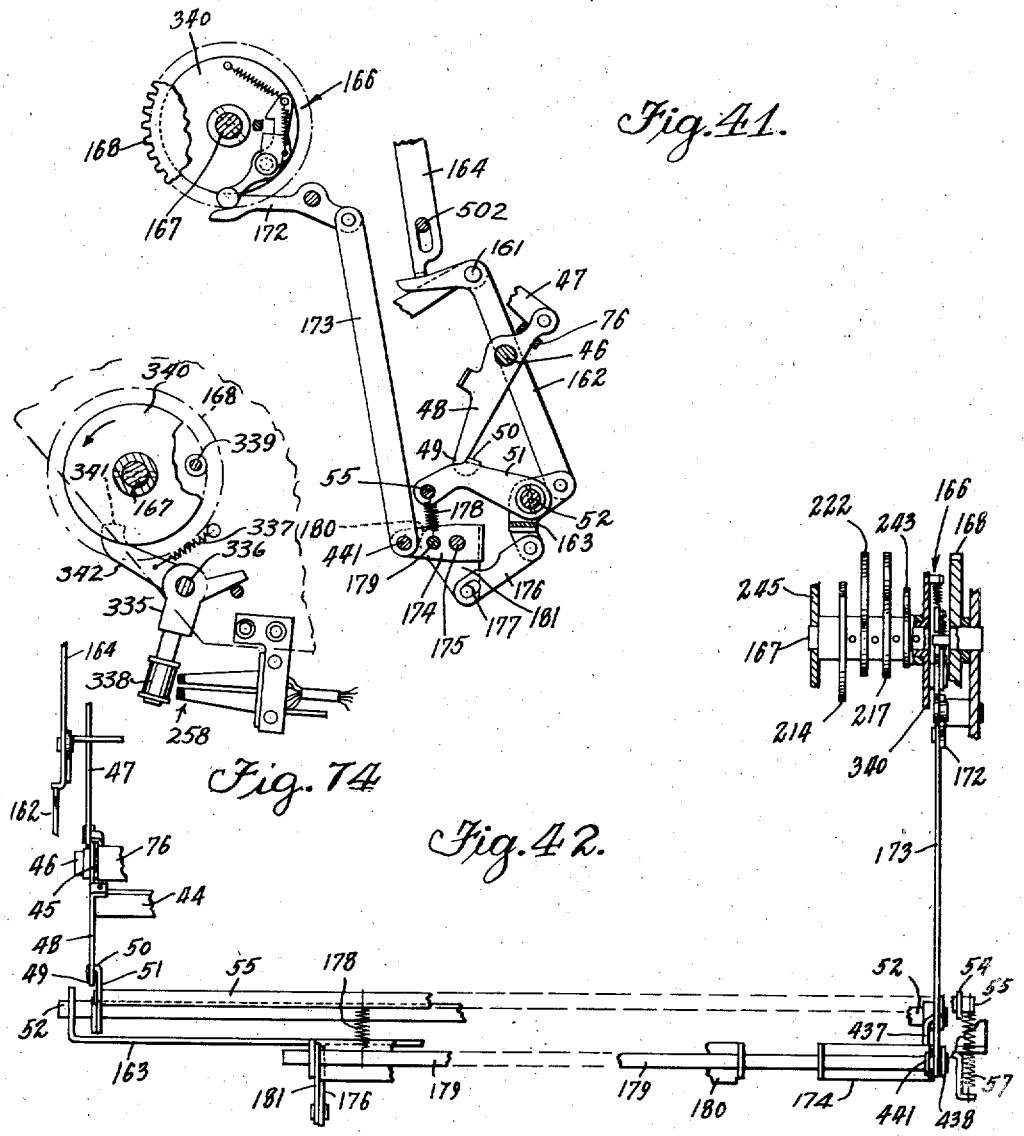
Inventors
Hugh L. Clary
William H. Petit
By Lyon & Lyon
Attorneys

MULTIPLYING UNIT
Original Filed June 26, 1939 26 Sheets-Sheet 17
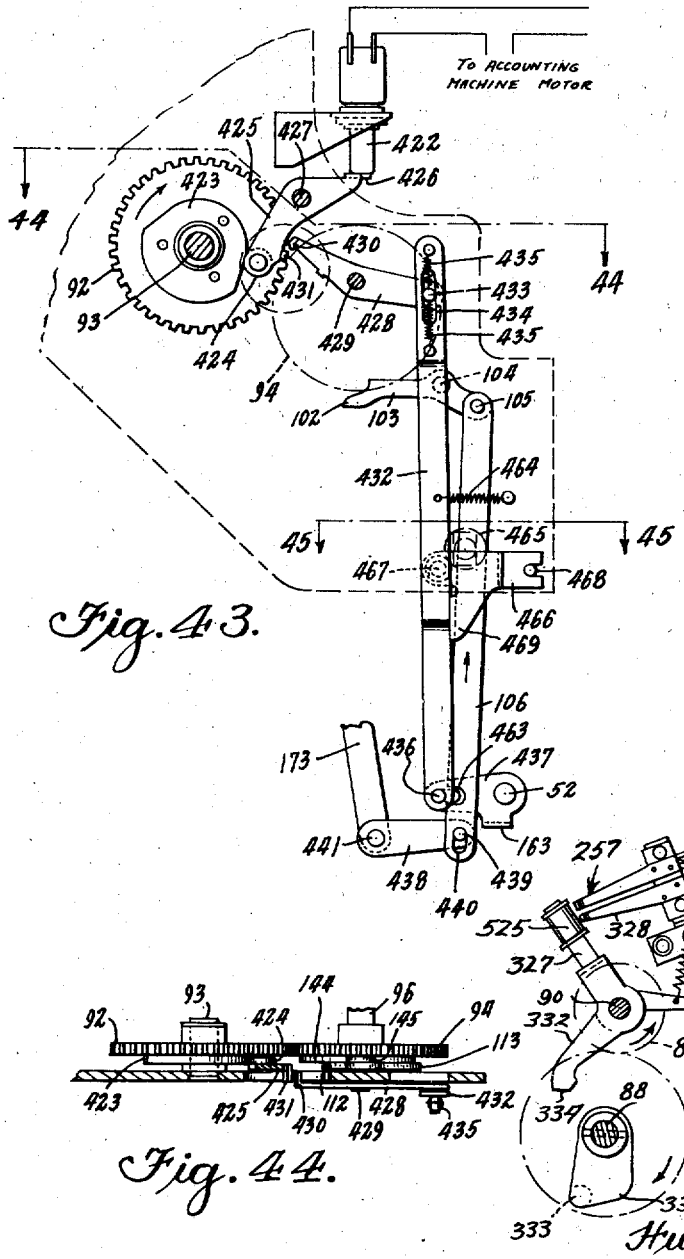
Fig. 43.
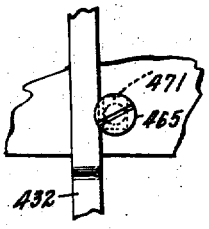
Fig. 46.
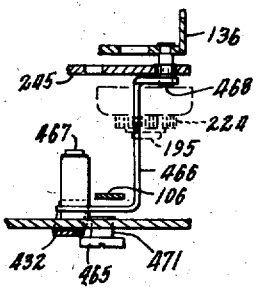
Fig. 45.
Fig. 44.
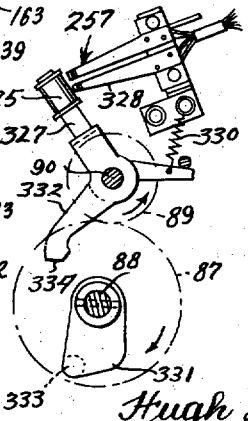
Fig. 72.
Inventors
Hugh L. Clary
William H. Pettit
By Lyon & Lyon
Attorneys MULTIPLYING UNIT
Original Filed June 26, 1939 26 Sheets-Sheet 18
Fig. 47.
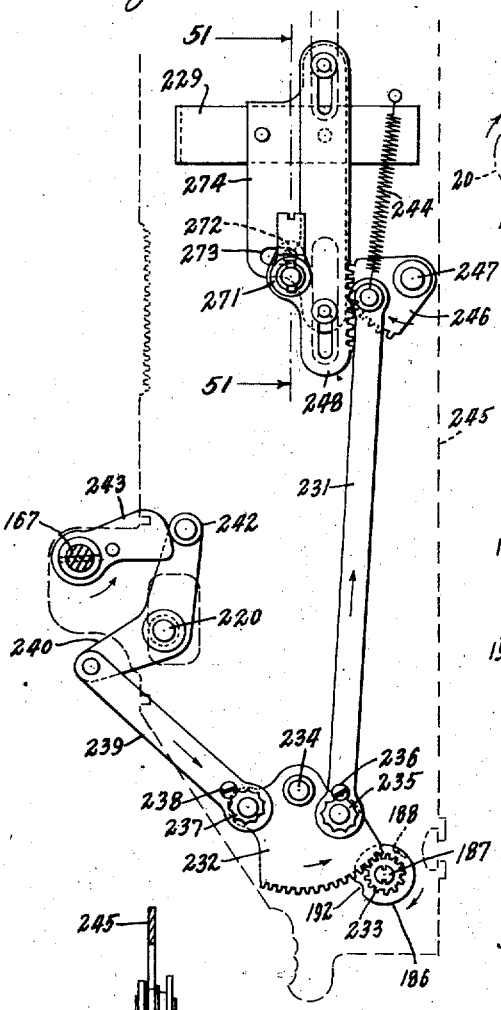
Fig. 48.
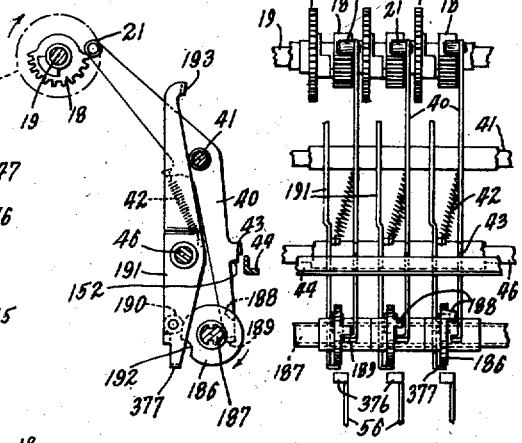
Fig. 50.
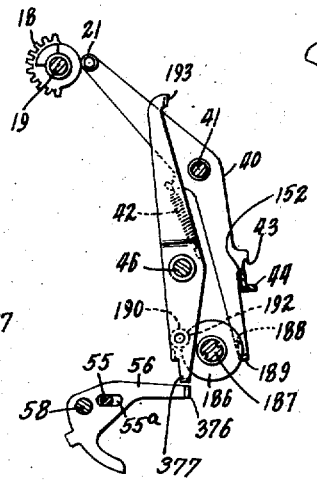
Fig. 49.
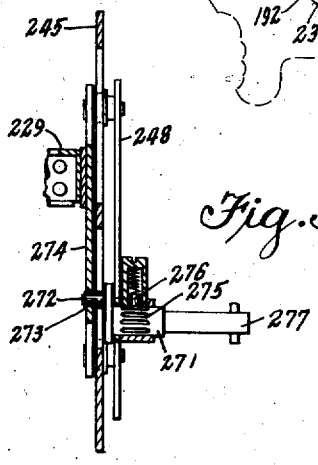
Fig. 51.
Inventors
Hugh L. Clary
William H. Petit
By Lyon & Lyon Attorneys

MULTIPLYING UNIT

Original Filed June 26, 1939 26 Sheets-Sheet 19

Inventors
Hugh L. Clary
William H. Petit
By Lyon & Lyon
Attorneys

MULTIPLYING UNIT

Original Filed June 26, 1939 26 Sheets-Sheet 20

Inventors
Hugh L. Clary
William H. Petit
By Lyon & Lyon
Attorneys

Dec. 9, 1947. H. L. CLARY ET AL Re. 22,947

MULTIPLYING UNIT

Original Filed June 26, 1939 26 Sheets-Sheet 21

Inventors

Hugh L. Clary
William H. Petit

By Lyon & Lyon

Attorneys

MULTIPLYING UNIT

Original Filed June 26, 1939 26 Sheets-Sheet 22

Inventors

Hugh L. Clary
William H. Pettit

By Lyon & Lyon Attorneys

Dec. 9, 1947. H. L. CLARY ET AL Re. 22,947

MULTIPLYING UNIT

Original Filed June 26, 1939 26 Sheets-Sheet 23

Inventors
Hugh L. Clary
William H. Petit
By Lyon & Lyon
Attorneys

Dec. 9, 1947. H. L. CLARY ET AL Re. 22,947
MULTIPLYING UNIT
Original Filed June 26, 1939 26 Sheets-Sheet 24
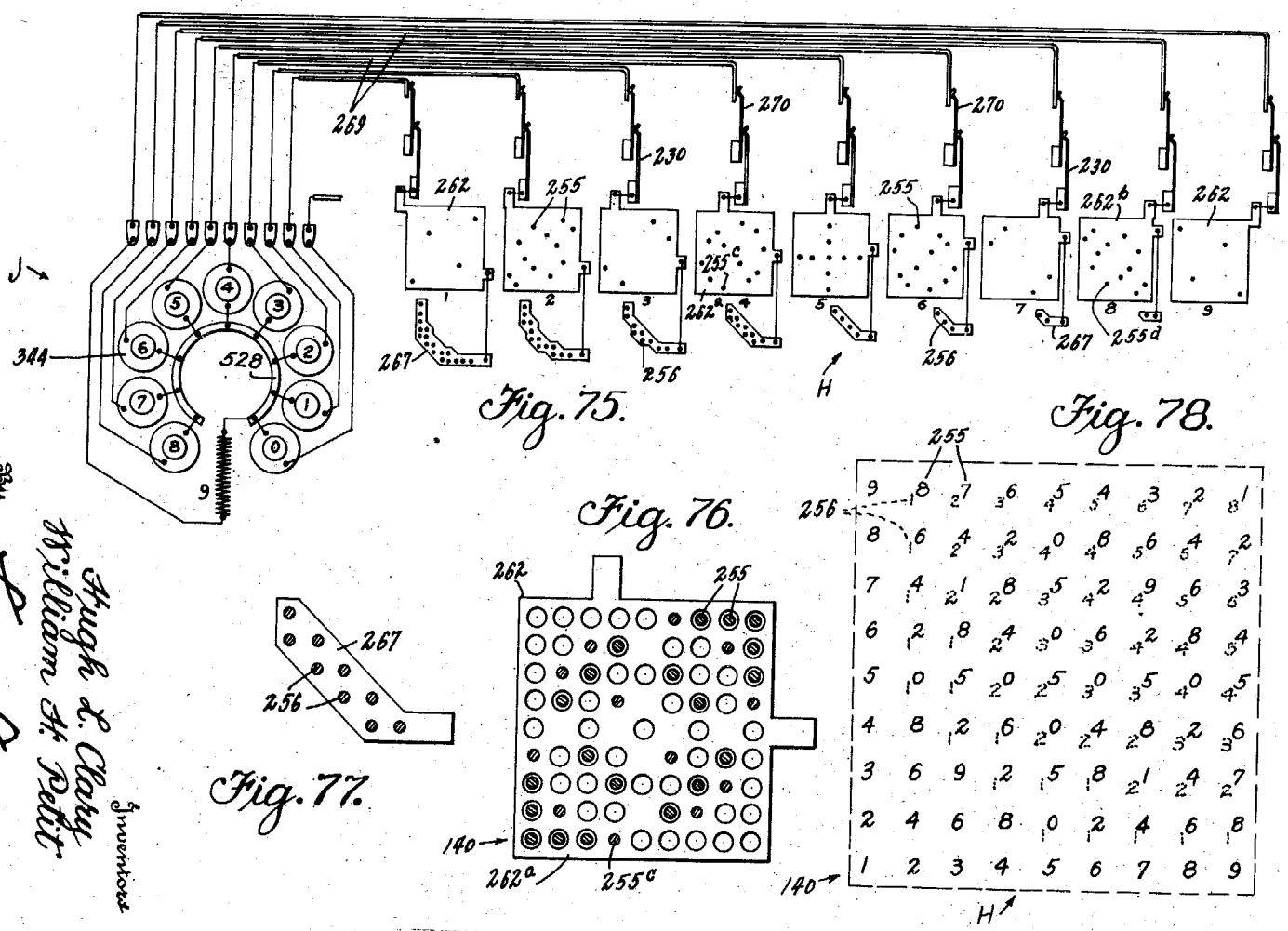
Inventors
Hugh L. Clary
William H. Petit
By Lyon & Lyon
Attorneys Dec. 9, 1947. H. L. CLARY ET AL Re. 22,947

MULTIPLYING UNIT

Original Filed June 26, 1939 26 Sheets-Sheet 25

Inventors
Hugh L. Clary
William H. Petit
By Lyon & Lyon
Attorneys

MULTIPLYING UNIT

Original Filed June 26, 1939 26 Sheets-Sheet 26

Inventors
Hugh L. Clary
William H. Petit
By Lyon & Lyon
Attorneys

Reissued Dec. 9, 1947

Re. 22,947

UNITED STATES PATENT OFFICE 22,947

MULTIPLYING UNIT

Hugh L. Clary and William H. Petit, Los Angeles, Calif., assignors, by direct and mesne assignments, to Clary Multiplier Corporation, Los Angeles, Calif., a corporation of California Original No. 2,403,480, dated July 9, 1946, Serial No. 281,082, June 26, 1939. Application for reissue August 24, 1946, Serial No. 692,740

16 Claims. (Cl. 235—60)

This invention relates to multiplying machines, and more particularly to a multiplying mechanism adapted for attachment to, or association with, known machines so as to supplement the functions normally performed by such machines with a multiplying function.

In the manufacture of multiplying machines, as far as applicants are informed, the endeavors which have heretofore been made to produce such a machine have been to produce an independent multiplying machine having its own peculiar characteristics and design.

The multiplying mechanism which is the subject of this invention may however be combined with machines which include an adding function so as to be operated from the keyboard thereof.

It is a particular object of this invention to provide an improved multiplying unit whereby the product of two numbers which have been set up by the depression of appropriate keys may be imparted automatically and rapidly to an accumulator or printing mechanism associated therewith.

It is another object of this invention to provide a multiplying unit adapted for chain multiplication wherein multiplication of two or more factors may be accomplished in a continuous process without resetting any of the products on the keyboard.

Another object of this invention is to provide a multiplying unit having associated therewith banks of keys, a printer and an accumulator, and having means actuated by the keys for setting the factors of a multiplication to produce a product, and in which multiplying unit there is provided a decimal control means whereby keys of a higher order may be used to set one of the factors, and which keys may subsequently be utilized to represent numbers of a lower decimal order, said product being printed in the decimally correct manner by the printer and accumulated by the accumulator.

Another object of this invention is to provide a multiplying unit adapted to be utilized as an attachment for an accounting machine by merely replacing one or more of the accumulators of said machine so as to convert the function of the elements controlling the operation of such accumulators to controlling elements for multiplying functions.

Another object of this invention is to produce a multiplying unit adapted for combination with a standard adding machine mechanism and which multiplying unit is operable to produce a product of two numbers by the same set of operations as are normally required to produce the sum of such numbers.

Another object of this invention is to produce a multiplying unit wherein numbers representing the two factors of multiplication are set up one after another on the keyboard of an adding machine associated therewith, and wherein the machine is actuated in a manner similar to that for addition to produce the product which may be then indicated or printed just as the sum of said two factors would have been in carrying out an adding operation.

Other objects and advantages of our invention it is believed will be apparent to those skilled in the art from the hereinafter set forth detailed description of a particular embodiment thereof as adapted to one type of accounting machine.

In the drawings:

Figure 41 is a fragmental detail elevation illustrating the control connections and clutch for the multiplier operating mechanism.

Figure 42 is a fragmental elevation in vertical section of the structure illustrated in Figure 41 viewed from left to right of Figure 41.

Figure 43 is a fragmental detached elevation illustrating further control linkages and safety mechanisms provided between the accounting machine control mechanism and the multiplier unit.

Figure 44 is a fragmental sectional view taken substantially on the line 44—44 of Figure 43.

Figure 45 is a plan section taken on the line 45—45 of Figure 43.

Figure 46 is a detached view of a portion of the linkage illustrated in Figure 43 showing a control element for fixed factor operation.

Figure 47 is a fragmental detail of the distribution control mechanism as related to the multiplier unit operating shaft illustrating the parts in the position of maximum translation of the decimal control means.

Figure 48 is a detached detail view of the operating and control connection between the main pinion control shaft and the multiplier brush shifting control means illustrating the same in non-operating position.

Figure 49 is a view similar to Figure 48 but illustrating the parts in operating or engaged position.

Figure 50 is a fragmental rear elevation of the mechanism illustrated in Figure 48 showing the first few sets of levers as viewed from the rear or right-hand end of the view of Figure 4.

Figure 51 is a sectional elevation taken substantially on the line 51—51 of Figure 47 showing the adjusting means of the decimal control mechanism.

Figure 72 is a detached fragmentary elevation of one of the multiplying control switches.

Figure 74 is a detached fragmentary elevation of the second of the multiplying control switches.

Figure 75 is a schematic diagrammatic view illustrating the complete set of circuits in one of the multiplying circuit units.

Figure 76 is a plan view partly in section of one of the contact plates in one of the multiplier circuit units, the illustration being of the No. 4 plate.

Figure 77 is a plan view partly in section of the complementary No. 4 plate of one of the multiplier circuit units.

Figure 78 is a schematic view illustrating the method of multiplication employed in our invention.

In order to set forth our invention so that it may be clearly understood by those skilled in the art, we have chosen to illustrate our invention as adapted to a particular accounting machine of well known construction. The principles of operation and construction of this machine are somewhat illustrated in the patents issued to Halcolm Ellis as follows: 1,197,277, Sept. 5, 1916, Number printing and punctuating mechanism; 1,197,278, Sept. 5, 1916, Multiple accumulator adding and listing machine; 1,065,673, June 24, 1913, Operating keys for adding and listing machines; and 1,203,863, Nov. 7, 1916, Mechanical calculator.

In choosing to represent our invention as adapted to this particular form of machine, we do not intend to be limited to this adaptation, but our invention is susceptible of use in connection with a variety of such machines.

In any adaptation to other forms of adding or accounting machines the means for attaching and connecting may vary in form but not in principle. Any mechanism devised for adding numbers by the use of differential movements may be adapted to the setting of the factors for multiplication, likewise any printing means associated with such adding means may be used to print the factors and the product.

The multiplying unit may be combined with an accounting machine without in any way limiting the use or capacity of the accounting machine functions. The necessary control connections may be provided by additional tabulating stop control elements or by keys to accommodate the control requirements.

Figure 2:
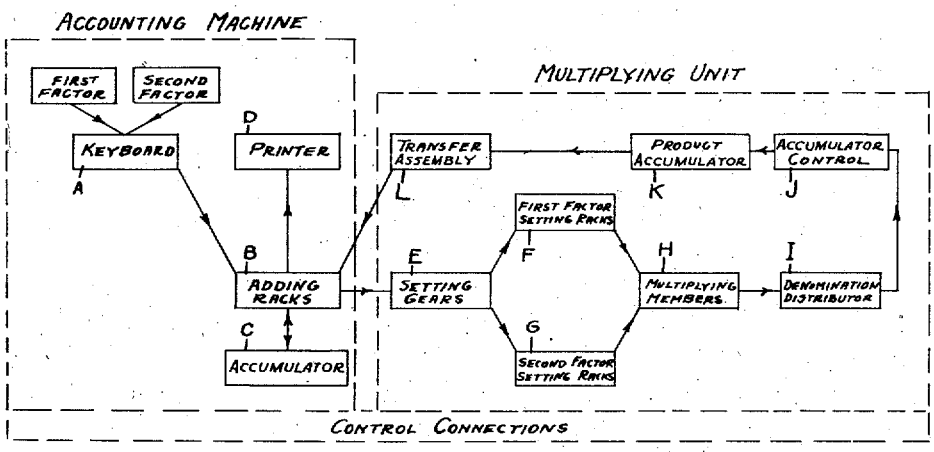
Figure 2 is a diagrammatic flow diagram illustrating diagrammatically the units of the accounting machine and the multiplying unit and their association and relationship in the machine embodying our invention.

In order that the fundamental principles of our invention may be more readily understood, we have illustrated our invention by a flow diagram, Figure 2, wherein the adaptation of the multiplying unit and its combination with the accounting machine is diagrammatically illustrated.

In the accounting machine there is primarily included a keyboard A which may be used for adding numbers and into which first and second factors of a multiplying problem may be set. The keyboard is utilized for actuating adding racks through a customary stop mechanism as utilized in such machine. These adding racks are diagrammatically illustrated at B.

Operatively connected with the adding racks in the accounting machine are accumulators C which in said machine normally act to add the numbers as set by the operation of the keyboard. These accumulators act in conjunction with a printing unit D whereby the numbers themselves may be printed separately and also whereby the sum of said numbers may be printed.

The multiplying unit of our invention is operatively connected with the accounting machine as thus diagrammatically illustrated by the racks B through extensions thereof which operate trains of setting gears E to first set up the first factor of the multiplication in the first factor setting racks F, and then to set up the second factor of the multiplication in second factor setting racks G.

The two factors as then set up operate the multiplying members H which determine the product, and through the denominational distributor I select electrically set stops in the accumulator control J. These stops control mechanically the operation of the product accumulator K to accumulate the partial products of the multiplication.

The transfer assembly L is coupled to the product accumulator K during the accumulator clearing operation to receive the product, and is then coupled with the racks B to print the product through the printer D and, if desired, to accumulate it on the accumulators C.

The racks B being operatively connected to setting gears E, it is also possible to reset the product on the setting racks F or G, thereby eliminating the necessity for setting the product on the keyboard as is required on conventional types of multiplying machines when performing multiplications with more than two factors.

The multiplying unit embodying our present invention is an improvement on that invention illustrated and described in the copending application of Hugh L. Clary, Serial No. 308,797, filed September 27, 1928, for Adding, subtracting and multiplying machine, now Patent No. 2,167,827, issued August 1, 1939.

The multiplying unit of our invention consists of novel means for setting the factors and indicating by dials or printing means the factors and product through an associated mechanism for addition such as is provided in the standard adding machine for listing, billing, bookkeeping, etc.

Included in our present invention are improved arrangements of the electrical multiplication tables, means for establishing the circuits, and means for translating the electrically set-up control stops into mechanical control for addition on the accumulator.

In the type of accounting machine illustrated, numbers are represented by keys 1 composing a keyboard. These keys in turn control the motion of racks 2 and the racks 2 in turn control printing segments 3 which print the numbers and accumulators 4 and 5 which accumulate them; this all being the well known function and construction of the accounting machine as illustrated so that a detailed description of how these particular operations are performed is believed to be unnecessary here.

The multiplying unit of our invention is operated and controlled by the racks 2 which operate the accumulators 4 and by the manual or automatic controls such as are normally used in machines of this type. The multiplying unit may therefore be combined with any machine in which addition is based upon the differential motion of racks or gears by merely linking the unit to these racks or gears in such manner that the differential motion which normally adds numbers into an accumulator is transmitted to the unit.

In adapting the multiplying unit embodying our invention to the particular machine as illustrated, the racks 2 are extended by the addition of rack segments 6 thereto by any suitable or desirable means.

In addition to the operating connection through the rack additions 6, the multiplying unit embodying our invention may be controlled by the tabulating stops located in various columnar positions or by control keys designed to actuate the accumulator-engaging links of the adding mechanism. The tabulating stops control the various accumulators and the functions incident to the operation of the accounting machine through depressing the tips of levers which are operatively connected to the appropriate control mechanism to be actuated. Thus a tabulating stop with the tip adapted to depress the tip of the appropriate control lever may be used to actuate a control mechanism as a substitute for the depression of a control operating key. Controls of this type are illustrated in the Ellis patents hereinabove listed and are well understood in this art.

As a further illustration of the type of machine to which the multiplying unit embodying our invention is adapted, reference is also had to the patents to E. J. Ens, No. 1,819,084, of August 18, 1931, for Quadruplex accumulator calculating machine, and the patent to R. A. Christian, No. 2,038,717, of April 28, 1936, for Calculating machine, which patents illustrate control mechanisms for this "Ellis" type adding machine and also indicate the adaptation of additional accumulators and controls therefor.

In the operation of this type of accounting machine, the rack unit B or the racks 2 actuate the accumulators C and printing unit D in accordance with the controls of such machine, depending upon whether it is desired to accumulate a sum in the accumulators and depending upon the particular operation being undertaken; also the position of the controls determine whether or not the printing mechanism D will operate to either print the individual factor entered into the machine or to print the totals as accumulated in the accumulators.

In addition to the operative connection established through the racks 2 of the multiplying unit there are also required control links between the control mechanism of the accounting machine and the elements of the multiplying unit; such control links will hereinafter be specifically set forth and are generally one to operate the controls for the multiplicand cycle, one to operate the control for the multiplier and clearing cycles, and one to take off the product. These operating cycles as referred to above are main subdivisions of the description and their nature will be brought out hereafter. The control links as utilized are the standard parts of the accounting machine used to control the accumulators for addition, subtraction and totaling. However, the accumulators normally controlled by these links must be removed from the accounting machine so that these links may be available for the control of the multiplying unit, or else the accounting machine must be provided with three control links in excess of what would normally be provided for the accounting machine without the multiplying unit. The timing and operations of the links is in no wise altered.

Figure 1:
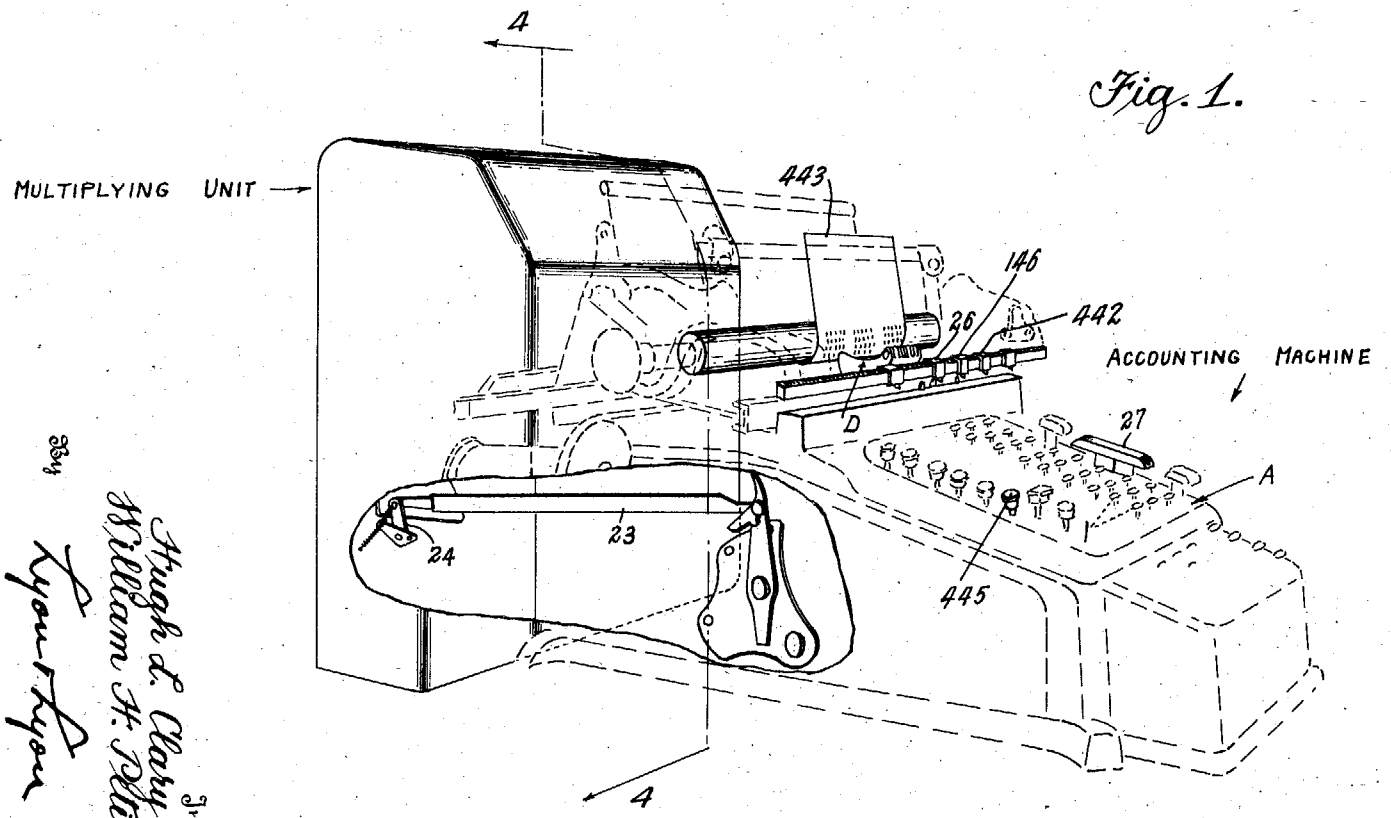
Figure 1 is a perspective view illustrating a multiplying unit embodying our invention as adapted to an accounting machine of a well known type illustrating the case of the same partly broken away to indicate one of the connections between the multiplying machine and the accounting machine.

In adapting the multiplying unit embodying our invention to the particular accounting machine under consideration, it is desirable that the adaptation be made in such manner that the mechanism may be utilized for tabulating the first factor or multiplicand, the second factor or multiplier, and the products of these factors, as is diagrammatically illustrated in Figure 1.

In order to accomplish this operation, the tabulating stops of the Ellis type machine are set in three positions on the tabulating or program bar of the accounting machine. In the first position the stop as thus provided will automatically actuate one of the connecting links which will in turn actuate a control mechanism in the multiplying unit to condition the multiplying unit to receive the multiplicand from the racks 2, the multiplicand having been previously set up on the keyboard of the accounting machine.

After the multiplicand has been set in the unit, the control mechanism of the multiplying unit will automatically disengage the multiplicand setting means of the said unit and engage the multiplier setting means. During this operation the accounting machine will have automatically tabulated to the second position.

When the second factor or multiplier has been set on the keyboard and the motor bar of the accounting machine actuated, the stop in the second position will automatically actuate the second link connecting the accounting machine with the multiplying unit which will in turn actuate a control mechanism in the multiplying unit to condition the multiplying unit to receive the multiplier from the racks 2 and to begin and carry to completion the multiplier and clearing cycles of the unit. During the multiplier and clearing cycles the multiplying unit will make one complete operating cycle for each significant digit other than zero of the multiplier or second factor and then will automatically make one additional operating cycle called the clearing cycle.

While these operations are proceeding to completion, the accounting machine will have tabulated to the third stop that is set. In this position when the appropriate control key is depressed and the motor bar of the accounting machine is actuated, the control mechanism of the accounting machine will actuate the third connecting link and engage the transfer assembly of the multiplying unit which now contains the product with the racks 2 of the accounting machine with the result that the product may be printed by the accounting machine in the same manner that a sum would be printed from an accumulator in the same machine.

The operation of taking off a product in the accounting machine is the same as a totaling operation in such machine and is performed in the same manner. Assuming completion of such operation, the accounting machine will then automatically tabulate to the first position through its customary return carriage mechanism and both the accounting machine and the multiplying unit will be then in their initial condition ready to proceed through another multiplying operation. The two factors used in the multiplying operation will be printed by the accounting machine as they are set up through the normal operation of that machine.

Through this manner of operation the respective multiplicands, multipliers and products of a series of multiplications will be tabulated in columns. As the accounting machine contains a plurality of accumulators for adding and subtracting, these accumulators may also be engaged with the racks by the controls normally provided for this purpose. It is therefore possible for the accounting machine to add or subtract the factors and the products as they are being tabulated. As previously stated it is also possible to reintroduce the product of a multiplication into the multiplying unit as a factor of a subsequent multiplication without resetting it in the keyboard. The reason the product need not be reset in the keyboard is because the amount of motion which the racks 2 impart to the multiplicand and multiplier setting gears can be controlled by the product indicating means, i. e., the transfer assembly L as well as by the keys as depressed in the keyboard.

Accounting machines are normally provided with several accumulators. The operation of these accumulators (except to the extent accumulators may have been removed to utilize the control links) is not limited by the addition of the multiplying unit and the multiplying unit will remain dormant during the operation of such accumulators as remain in the machine if the operator sets his program bar so that the control links of the multiplying unit will not be actuated. The selective operations of various accumulators through the tabulating stops or carriage control lugs of a program bar is a very well known feature of the Ellis type machine, and is fully described in the patents previously mentioned.

The foregoing describes in general terms the functions of the multiplying unit and its manner of association with the accounting machine, as well as the manner in which an operator utilizes the combination to accomplish multiplication.

We will now describe in more detail the structure and functions of the multiplying unit itself. As the description proceeds, reference will be made to the elements illustrated in Figure 2, which is a schematic outline of the functions of the machine and their inter-relationship.

Figure 22:
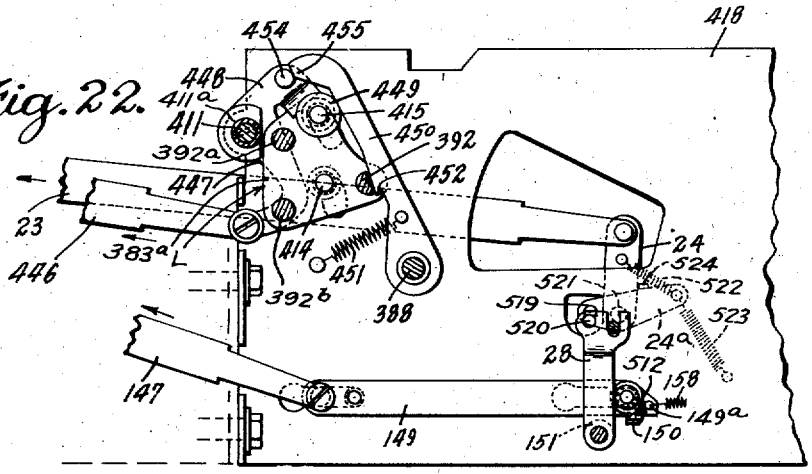
Figure 22 is a fragmental elevation partly in section illustrating the control connecting links between the multiplying unit and the accounting mechanism.

As illustrated in Fig. 2, there are certain control connections between the accounting machine and the multiplying unit which serve to actuate the various control elements of the multiplying unit in a manner to be described later. The control connections in this particular adaptation are illustrated in Figure 22 and are the links 23, 147 and 446. As has previously been said, they are standard parts of the accounting machine and are responsive to the control mechanism of the accounting machine which actuates them normally at the time required to add, subtract, total, or sub-total the appropriate accumulators of the accounting machine. The method by which the accounting machine actuates these links is described in the patents herein referred to and is well known to those familiar with the Ellis type machine.

*The setting gears and the multiplicand cycle*

After depressing the appropriate keys 1 of the keyboard as required to set the multiplicand, the motor bar is depressed, starting the accounting machine. As the rack 2 moves from its initial position, it will impart a motion to the gear 8, representative of the numbers from 1 to 9 as determined by the key 1 depressed in the corresponding bank of keys on the keyboard. There is one gear 8 for each rack and consequently for each bank of keys within the capacity of the multiplying unit. Each gear 8 is journaled on a shaft 9 upon which there is also journaled for each gear a pinion segment 10.

Interposed between the gears 8 and pinion segments 10 are flexible interconnecting means whereby the amount of movement of the racks 2 is imparted through the gears 8 to the pinion segments 10 driving the pinion segments 10 in a counter-clockwise direction, allowing the gears 8 to return to their initial position when the pinion segments 10 are held from such return, as will hereinafter be set forth. The flexible interconnections include lugs 11 (Figures 11–14) carried by the gears 8 and corresponding lugs 12 carried by the pinion segments 10, which lugs 11 and 12 are normally held in engagement by springs 13 so that when the gears 8 return to their initial position, the springs 13 are tensed when the pinion segments 10 are held from returning, but when not so held, the pinion segments 10 will follow the gears 8 to their initial position.

The pinion segments 10 mesh with idler gears 14 which in turn mesh with idler gears 15 journaled on shafts 16 and 17, respectively. The idler gears 15 in turn mesh with pinion segments 18. The pinion segments 18 are journaled on a shaft 19 on which shafts are also journaled gears 20.

Flexible interconnections are interposed between pinion segments 18 and the gears 20 of the same form of construction as provided between the gears 8 and pinion segments 10, but pinions 18 and gears 20 have no spring connections and the lugs on pinion segments 18 are free to move in a clockwise direction away from the lugs on gear 20. On each gear 20 is a pin 20ª and associated therewith is an aligning stop arm 22 which acts to hold the gear 20 while the pinion segments 18 are being set.

It will thus be apparent that, as the movement of the racks 2 is transmitted through the chain of gears thus described to the pinion segments 18, these pinion segments will move the same number of spaces away from the lugs on the gears 20 as the gears 8 move in a counter clockwise direction. The lugs on the pinion segments 18, when these segments are held as hereafter described, therefore become stops which set up in the multiplying unit by their position the number set up on the keyboard of the accounting machine. This is the same number that is printed by the printing segments 3 of the accounting machine through the normal operation of that machine.

Figure 3:
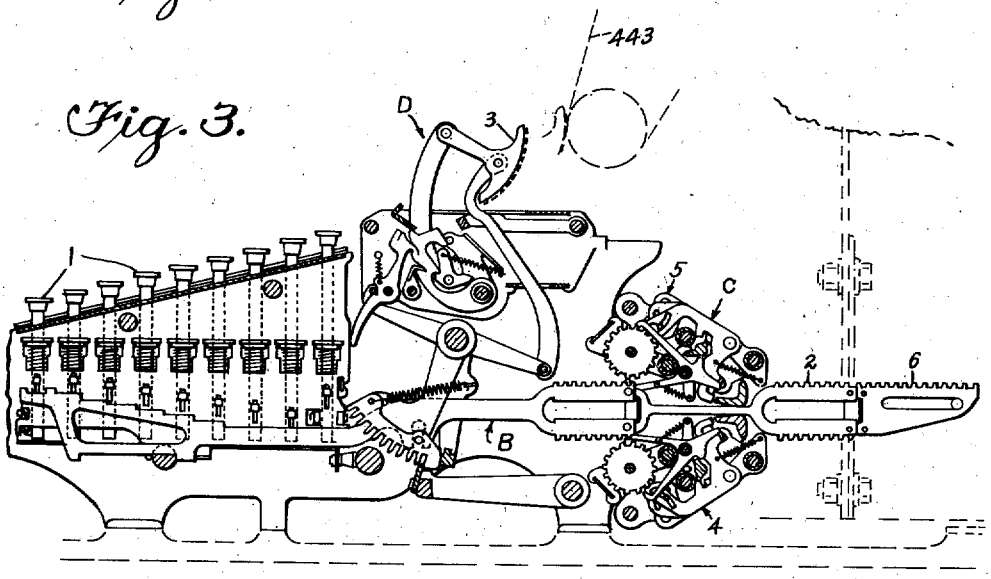
Figure 3 is a fragmental side elevation of the accounting machine illustrated in Figure 1 and particularly illustrating one of the connecting links between such machine and the multiplying unit embodying our invention.

After the motor bar has been actuated, the racks 2 move to the right, as illustrated in Figure 3, as far as permitted by the depressed key 1. After remaining momentarily in a stationary position, the racks 2 return to their original position. While the racks 2 are momentarily stationary, the multiplicand control link 23 (Figures 1 and 22) from the accounting machine is actuated, this being the normal "add timing" of the Ellis machine. The control link 23 as shown in Figure 22 is connected to the multiple control lever 24 and operated through a mechanism hereafter described to trip the start-stop mechanism of the multiplying unit and at the same time to release the liners 60 (Figures 4 and 5) to engage the teeth of the pinion segments 18, locking them against further movement and holding them in position during the return movement of the racks 2.

As has been explained, the Ellis type machine provides a plurality of control links for controlling the operation of a plurality of accumulators. Three of such control links are utilized to control the operation of the multiplying unit, and the remaining ones perform their normal function of controlling the operation of the accumulators remaining in the machine. The selective operation of these control links is in turn controlled by the carriage lugs of the Ellis machine as set forth in the patents referred to, and as well known in the art. They also may be controlled by the control keys, provided by the Ellis machine. To introduce a multiplicand into the multiplying unit the carriage of the Ellis type machine is placed in the position shown in Figure 1, in which position it is held by the carriage lug 26 which is a standard part of the Ellis machine, and which is of such nature as to select for operation the multiplicand link 23 (Figures 1 and 22), and to actuate the same on add-timing, that is, as if a number were to be added. It is thus seen that when the accounting machine is actuated to print the first factor, the link 23 will be actuated in the manner normally required to engage an accumulator with the racks 2 for addition. However, instead of engaging an accumulator, the following sequence of operations will take place:

The lever 24 and its associated lever 24ª are both pivotally mounted on stud 521 carried on frame 418. Lever 24 is connected to lever 24ª by the spring 522 and lever 24ª has attached to it spring 523 which is attached to a suitable stud on frame 418. The spring 522 is substantially stronger than the spring 523 so that the lever 24 and the lever 24ª are normally held with the shoulder 524 of lever 24ª in contact with lever 24. Thus the heavy spring operates as a flexible connection between the two levers 24 and 24ª and the lighter spring tends to hold both levers 24 and 24ª and also link 23 in the normal unoperated position shown in Figure 22.

Figure 6:
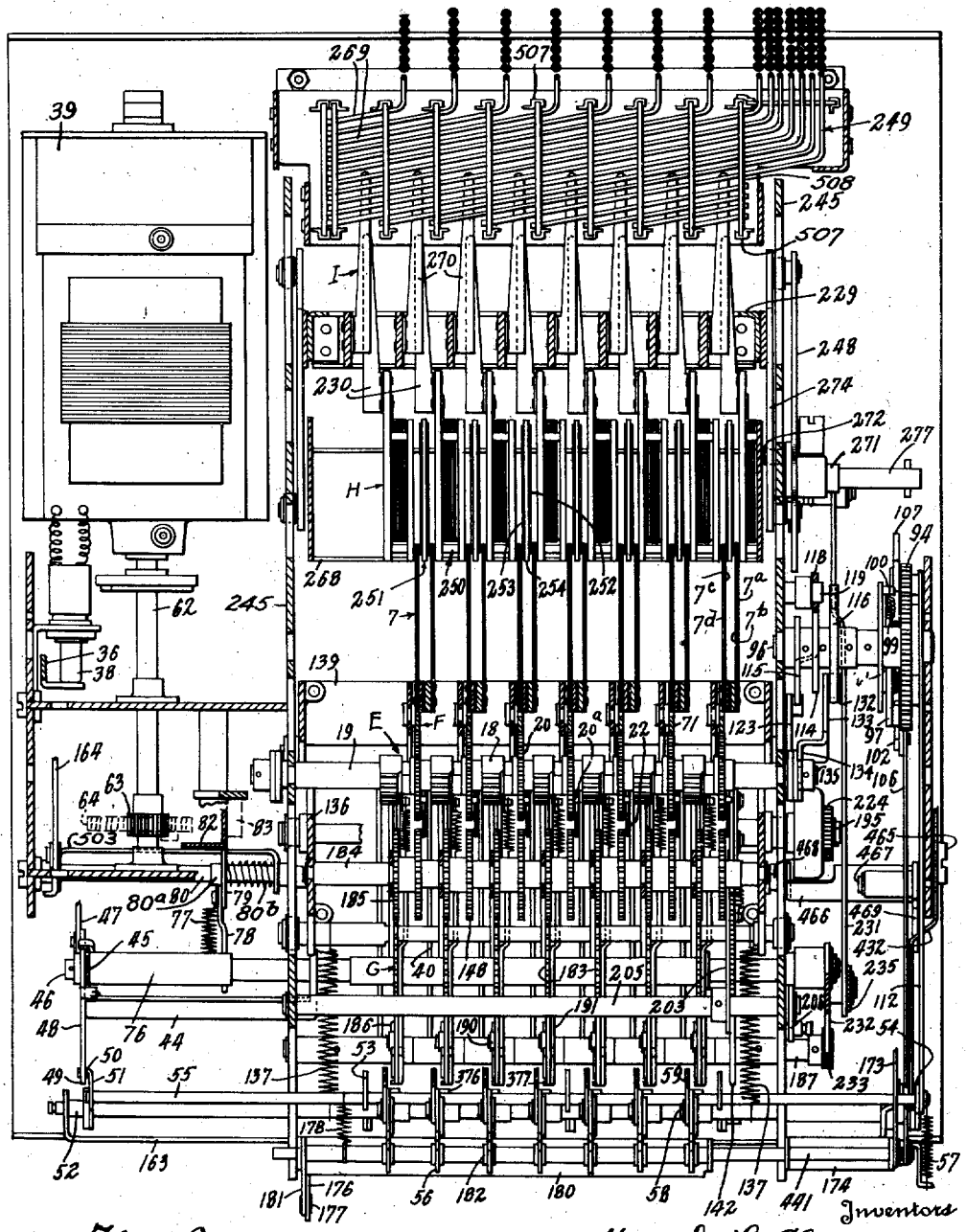
Figure 6 is a sectional elevation taken substantially on the line 6—6 of Figure 4.
Figure 23:
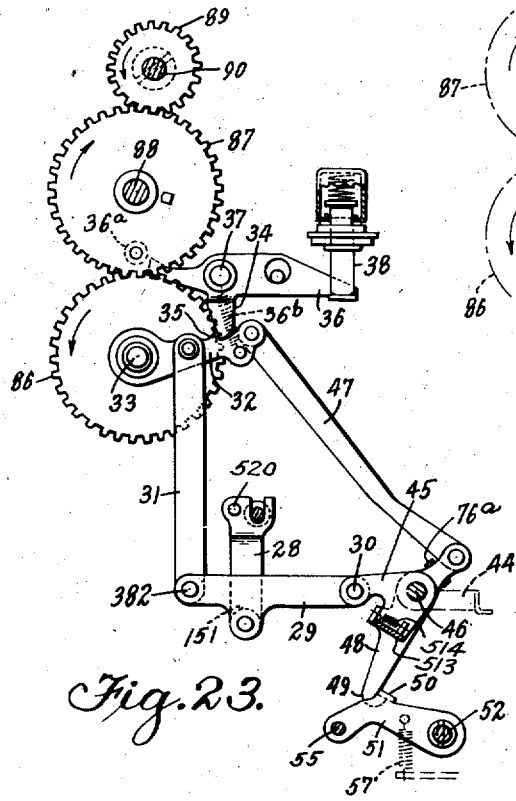
Figure 23 is a detached elevational view of the stop-start linkages of the multiplier mechanism illustrating particularly the main switch operating means and illustrating the parts in inoperative position.
Figure 24:
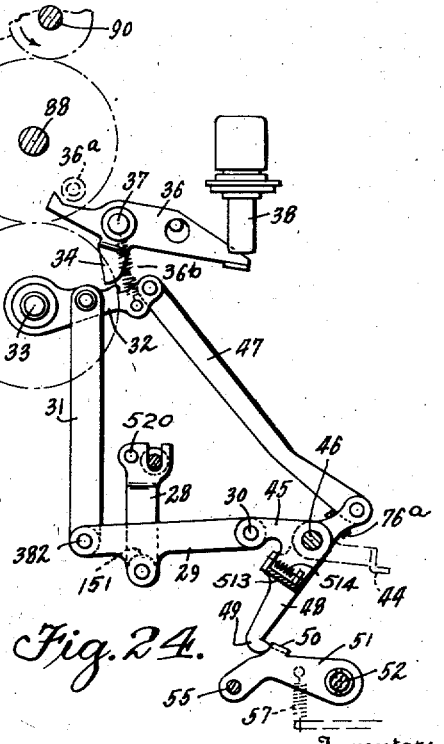
Figure 24 is a view similar to Figure 23 and differs therefrom in that the parts are moved to the operative position to close the switch.

When link 23 is operated to set the multiplicand as above described, lever 24ª will be rotated about the pivot 521 through the action of the spring connection 522. Any excess motion will be imparted to the spring 522 and breakage of parts will be prevented. On lever 24ª is a pin 519 which rests against a pin 520 on link 28. Rotation of lever 24ª therefore moves a link 28 downward and causes link 29 to move about the pivot 30 (Figure 23). This operation results in the connecting link 31 being also depressed to rotate the latch lever 32 around its pivot on the stub shaft 33, releasing the latch dog 34 from the latch shoulder 35 of the latch lever 32. The latch dog 34 is formed integral with the multiplier control switch stop lever 36. This lever 36 is pivotally mounted on a pin 37 and its free end forms a stop to resist the downward thrust of the switch button 38. This switch button 38 is normally urged downwardly under the influence of a spring. As long as the button 38 is held up in the position as indicated in Figure 23, the switch is out of contact. As soon as lever 24 depresses link 28 the parts move to the position as indicated in Figure 24 which allows the switch button to move downwardly, completing the electrical circuit to the multiplier unit operating motor 39. (Figure 6.)

Concurrently with this operation of permitting the motor switch to close to complete the electrical circuit, it is necessary as previously explained that the multiplicand as set in the pinion segments 18 of the multiplying unit be maintained therein by the liners 60 when the actuating racks 2 return to their original position. This is accomplished by the following mechanical operations. As each pionion segment 18 is rotated in the meeting of the multiplicand, the rollers 21 are permitted to move inward toward the axis of the shaft supporting pinions 18. As viewed in Figure 4, the pinion segments 18 in this operation rotate in a clockwise direction. The rollers 21 are carried by operating levers 40 which are pivoted on a shaft 41. As the levers 40 thus pivot under the influence of the springs 42, they move their setting shoulders 43 over the motor switch control bail 44, thereby holding the motor switch control bail 44 in the position that this bail is illustrated as having in Figure 23, thereby fixing the pivot 30. The pivot 30 is a pin which connects the link 29 with an extension 45 of the motor control bail 44. Moving the stop 43 into a position above the edge of the motor control bail 44 prevents the counter clockwise pivoting of the bail 44 upon its pivotal support, the shaft 46, when the link 28 is depressed downwardly, thereby permitting release of the motor control stop lever 36.

The bail 44 as shown in Figures 4, 6, 19, 23 and 24 is an irregularly formed member extending past all the shoulders 43 of the levers 40 and pivoted on shaft 46. It has an extension 45 which joins with link 29 at pivot 30 and another extension 513 (Figure 23) which is held against a suitable projection on latch lever 48 by the spring 514. This spring forms a flexible connection between the two members permitting the latch lever 48 to be tripped through the thrust of link 47 as hereafter described. As soon, however, as the downward pressure of the lever 24[a] on the link 28 (Figure 22) is released, the spring 514 moves bail 44 downward and brings the two members together as shown in Figure 24. This movement of the bail 44 engages the bail 44 with a second shoulder 152 on levers 40 (Figure 4), pinions 18 being so constructed as to permit this additional movement of levers 40. The bail 44 when thus engaged holds latch 48, link 47, and latch 32 in the position shown in Figure 24, that is, in the position to prevent engagement of latch 32 with tip 34 of latch 36. It follows that as long as bail 44 is thus held the motor switch 38 cannot be latched open to stop the motor.

During this same operation of releasing the motor control stop lever 36 as the latch lever 32 is rotated upon the stub shaft 33, a link 47, pivotally connected with the lever 32, is actuated to rotate a latch lever 48 which is journaled on the shaft 46. The latch lever 48 has a latch end 49 adapted to engage a latch stop 50 carried by the lever 51. The lever 51 is secured to a shaft 52. Likewise secured to the shaft 52 are supporting and connecting levers 53 and 54, each of which at its opposite end supports the rod 55, as does also the lever 51. Mounted on the rod 55, one for each bank of keys, are pivoted levers 56 which are mounted on the rod 55 in elongated slots 55[a]. There is one pivoted lever 56 for each bank or order of the multiplying unit. The pivoted levers 56 are shown in Figures 4, 6, 20 and 21.

As the link 47 is actuated, it results in releasing the latch member 49 from the latch stop 50, permitting the lever 51 to fall under the influence of the spring 57 which is interposed between the link 54 and the frame at the opposite side of the machine from the lever 51. This lowers rod 55, with the result that the pivoted levers 56 are all moved downwardly as viewed in Figure 4. The pivoted levers 56 are individually secured by pins 58 to liner control links 59, each of which is in turn pivotally connected to a locking liner 60 which now engages the pinion segment 18 to retain the same in the position to which it has been moved under the influence of the rack 2 during the multiplicand setting operation.

The liners 60 are journaled on a shaft 61. With the liners 60 thus engaged to hold the pinion segments 18 in the selected position, the racks 2 return to their normal position and as the racks 2 have returned to their normal position, the train of gears 10, 14, 15 and 18 are held stationary and the gear 8 has returned to its normal position, tensing the spring 13 so that subsequently when the liners 60 are released, as explained later, the entire train of gears 10, 14, 15 and 18 will likewise return to their normal position under the influence of the said tense spring 13.

Figure 25:
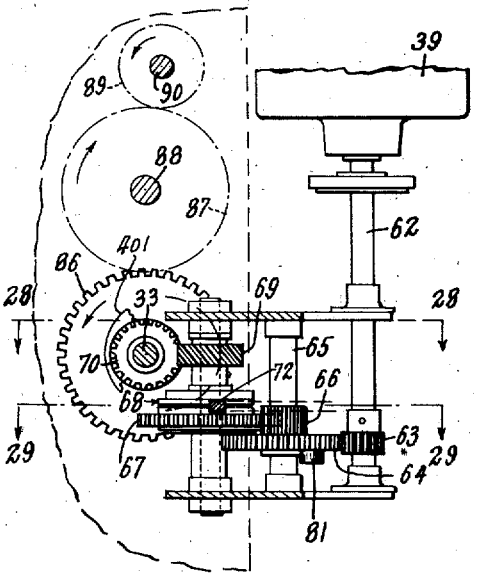
Figure 25 is an elevation partly in section of the power connecting gearing taken substantially on the line 25—25 of Figure 7.

As soon as the liners 60 have locked the pinion segments 18 in position, the mechanism is in position to set the multiplicand in the first factor setting racks F. The motor switch has also been closed to set the motor 39 in operation causing the motor shaft 62 to be revolved (Figure 25).

Figure 29:
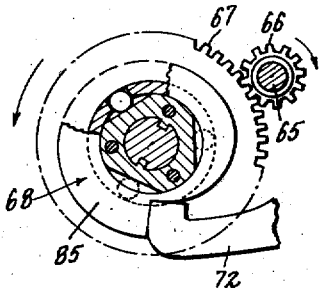
Figure 29 is an enlarged fragmental section taken substantially on the line 29—29 of Figure 25 illustrating the structure of the main clutch for the motor shaft.

A pinion 63 is mounted upon the motor shaft 62 in mesh with a gear 64 carried upon the shaft 65. Driven with the gear 64 is a pinion 66 maintained in mesh with a clutch gear 67 (Figure 29). The clutch gear 67 operates through a one revolution-one direction clutch 68 to rotate a spiral gear 69 which in turn is in mesh with the spiral gear 70 carried upon the shaft 33.

Figure 28:
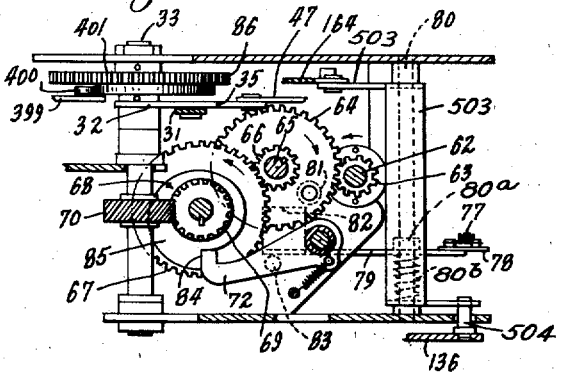
Figure 28 is a fragmental sectional top plan view taken substantially on the line 28—28 of Figure 25 illustrating the gearing and clutch control assembly.

The gear 64 starts to revolve as soon as the motor switch has been closed. The clutch does not, however, engage to drive shaft 33 until the roll 81 which is mounted on a pin on gear 64 engages the flange 82 of lever 79 (Figure 26), thus forcing the lever 79 against pin 83 of clutch dog 72 (Figure 28), and moving the latter away from stop shoulder 84 which permits cam 85 of the clutch 68 to make one revolution.

The lever 79 and its associated flange 82 is moved into the path of roll 81 at the time the starting control mechanism is tripped. The operation of link 47 as illustrated in Figures 23 and 24 and as previously described, rotates latch lever 48 which carries with it yoke 76, yoke 76 being fastened to latch lever 48 by suitable lugs 76[a] as shown in Figures 23 and 24. Yoke 76 is shown more completely in Figures 6, 19 and 26. Yoke 76 acts through a spring 77 and a slotted link 78 to pull yieldingly downward on lever 79. This rotates lever 79 about shaft 80 and brings the flange 82 in the path of roll 81 ready to actuate the clutch to make one revolution. Lever 79 is pivotally mounted on shaft 80, being held in position by a suitable spring 80[b] which presses it against collar 80[a] which is fastened on shaft 80 (Figure 6). This permits lever 79 to tilt on shaft 80 at the time it acts on pin 83 of clutch dog 72. Slotted link 78 is mounted loosely to permit this movement.

Power is thus established to drive the shaft 33 upon which is secured a gear 86 (Figure 25) which is in mesh with gear 87 journaled on a stub shaft 88 and which in turn meshes with a gear 89 secured to a shaft 90.

Figure 7:
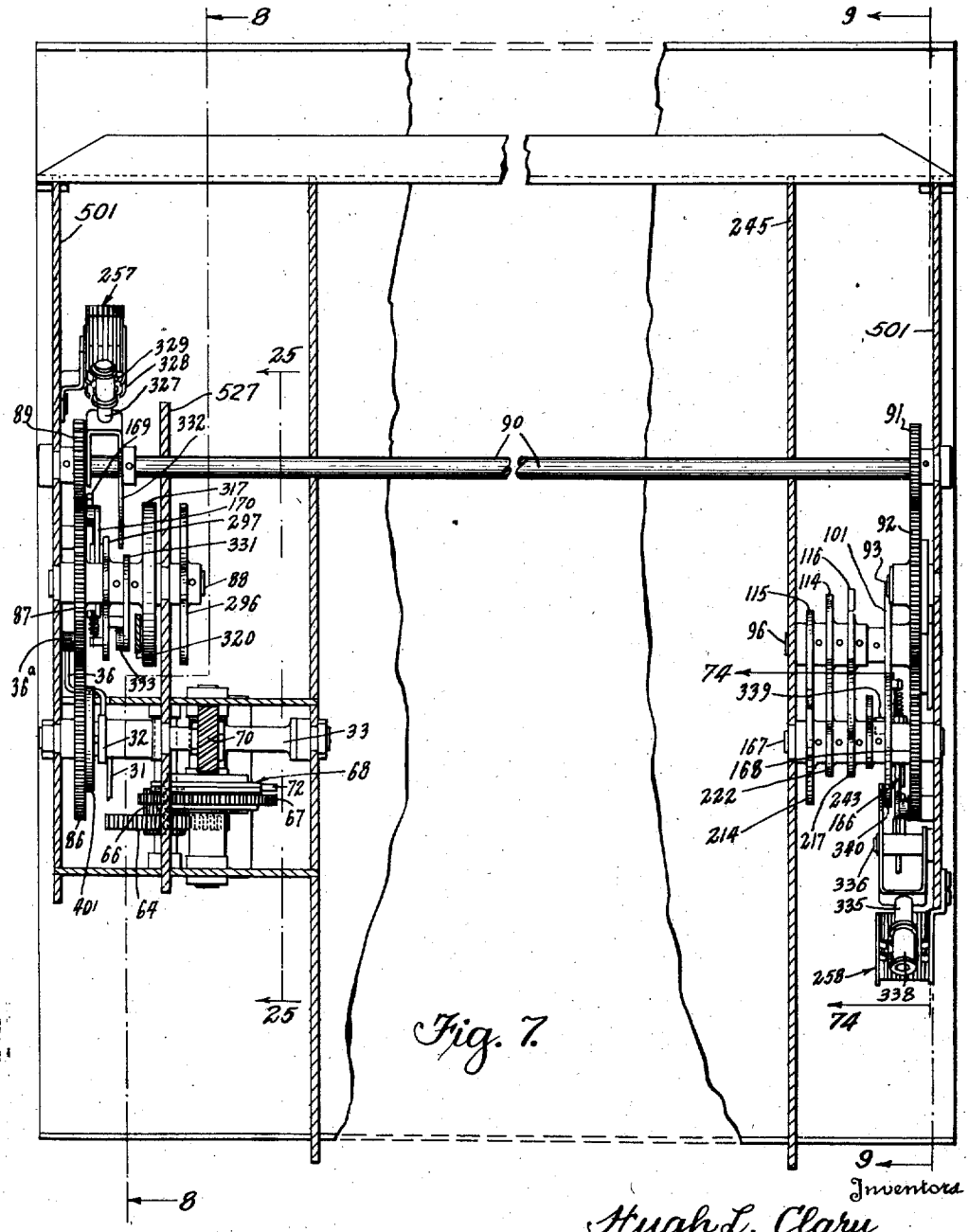
Figure 7 is a fragmental sectional view taken substantially on the line 7—7 of Figure 4.
Figure 32:
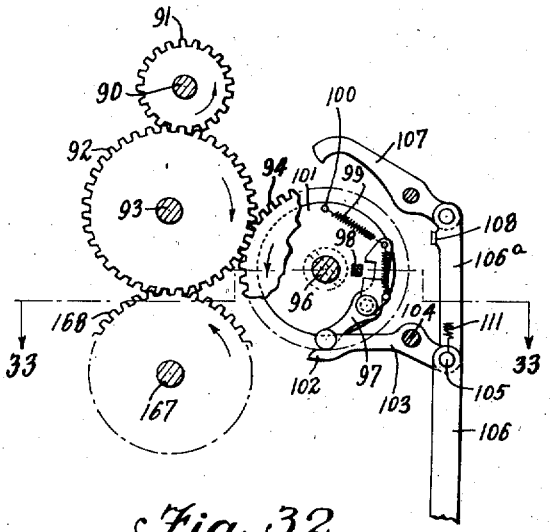
Figure 32 is a fragmental elevation partly in section illustrating the clutch mechanism included in the mechanism illustrated in Figure 30 with the portion of linkage illustrated in Figure 30 removed.

Secured to the shaft 90 on the opposite side of the frame is a gear 91 (Figure 7) which is in turn in mesh with the gear 92 journaled on a stub shaft 93 carried by the frame. The gear 92 is in turn in mesh with the clutch gear 94 and also with the gear 168 (Figure 32). The clutch gear 94 is journaled on a shaft 96. A clutch mechanism is interposed between the gear 94 and the shaft 96 and operates through a clutch dog 97 mounted on plate 101 and clutch pin 98 carried by the gear 94 to drive shaft 96 as explained later.

Figure 31:
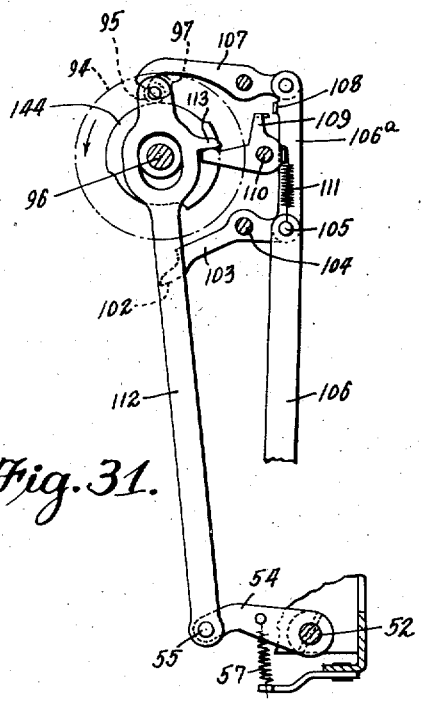
Figure 31 is a view similar to Figure 30 illustrating the parts, however, as moved to the "on" position ready for the second factor and as maintained during the multiplier cycles.

The clutch dog 97 is normally urged toward engaging position by a spring 99 connected between clutch dog 97 and a pin 100 carried by a plate 101 secured to the shaft 96. The clutch dog 97 is normally held out of engagement by the end thereof engaging the end 102 of a lever 103 carried on a pin 104 supported by the frame. The opposite end of the lever 103 is pivotally connected at 105 to a link 106 and link 106a which link 106a is pivotally connected at its upper end with a clutch interrupter member 107. Also carried on the link 106a is a latch lug 108 adapted to engage a latch member 109 (Figure 31).

Figure 30:
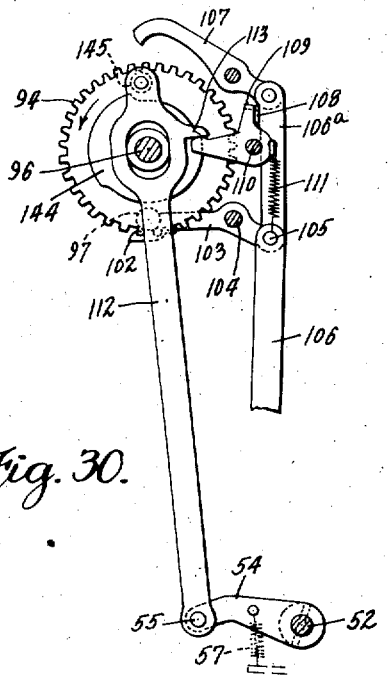
Figure 30 is a fragmental detached elevation illustrating the control mechanism for the initial raising of the brush frames of the multiplier embodying our invention, which detached elevation illustrates a fragment of the elements illustrated in Figure 9 and illustrates the parts in the "off" or non-operated position, with the machine cleared of both factors.

The latch member 109 is journaled on a pin 110 in the right hand frame and is normally urged into engaging position by means of a spring 111. The spring 111 is connected to the pin 105. The latch member 109 is released when the latch 49 of latch member 48 (Figures 23 and 24) is released from its complementary latch stop 50 permitting the spring 57 to pull the lever 54 downwardly, resulting in moving the rod 55 down, thus resulting in a downward pull upon the clutch link 112 (Figures 30 and 31). The clutch link 112 carries a latch release lug 113 which engages the latch member 109, rotating the same counter-clockwise on its pin 110, releasing the latch members 108 and 109 permitting the spring 111 to impart an upward movement to the links 106 and 106a causing the clutch stop 103 to be moved away from the end of the clutch dog 97, and also resulting in the shifting of the clutch interrupter 107 downwardly into position to engage the stop end of the clutch dog 97 to arrest the clutch after a one-half revolution, where the clutch remains until the completion of the multiplier cycles, as will hereinafter be described.

Figure 33:
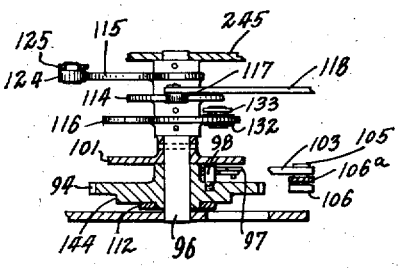
Figure 33 is a sectional plan view taken substantially on the line 33—33 of Figure 32.
Figure 35:
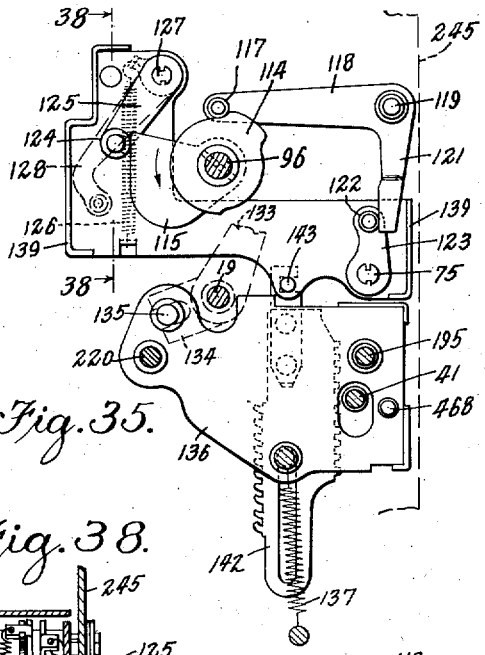
Figure 35 is a detached fragmental elevation partly in section further illustrating portions of the brush assembly control.
Figure 38:
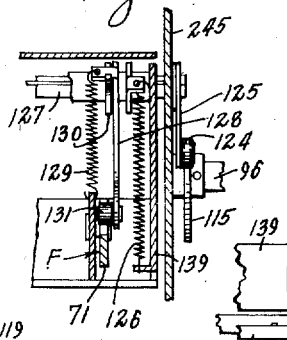
Figure 38 is a fragmental section taken substantially on the line 38—38 of Figure 35.

Secured to the shaft 96 and rotated thereby through one-half revolution during this period of the operation are cams 114, 115 and 116. As the cam 114 is rotated, it operates through a cam roller 117 to raise the end of the bell crank lever 118 (Figures 33 and 35). The bell crank lever 118 is journaled on a pin 119 carried by the frame 245 (Figure 6). The opposite arm 121 of the bell crank lever 118 engages a roller 122 carried by an arm 123.

The arm 123 is secured to the shaft 75 and through this engagement operates to rotate the shaft 75 in a counter-clockwise direction to release the latch member 73 from the rack 71, thereby permitting the rack 71 to be moved horizontally to position the brush 7 as determined by the numerical value of the movement previously imparted to the pinion segment 18. At the same time the cam 115 is also rotated through one-half revolution. The cam 115 is engaged by a cam roller 124 carried by an arm 125. The roller 124 is caused to follow the cam 115 by means of a spring 126.

Figure 4:
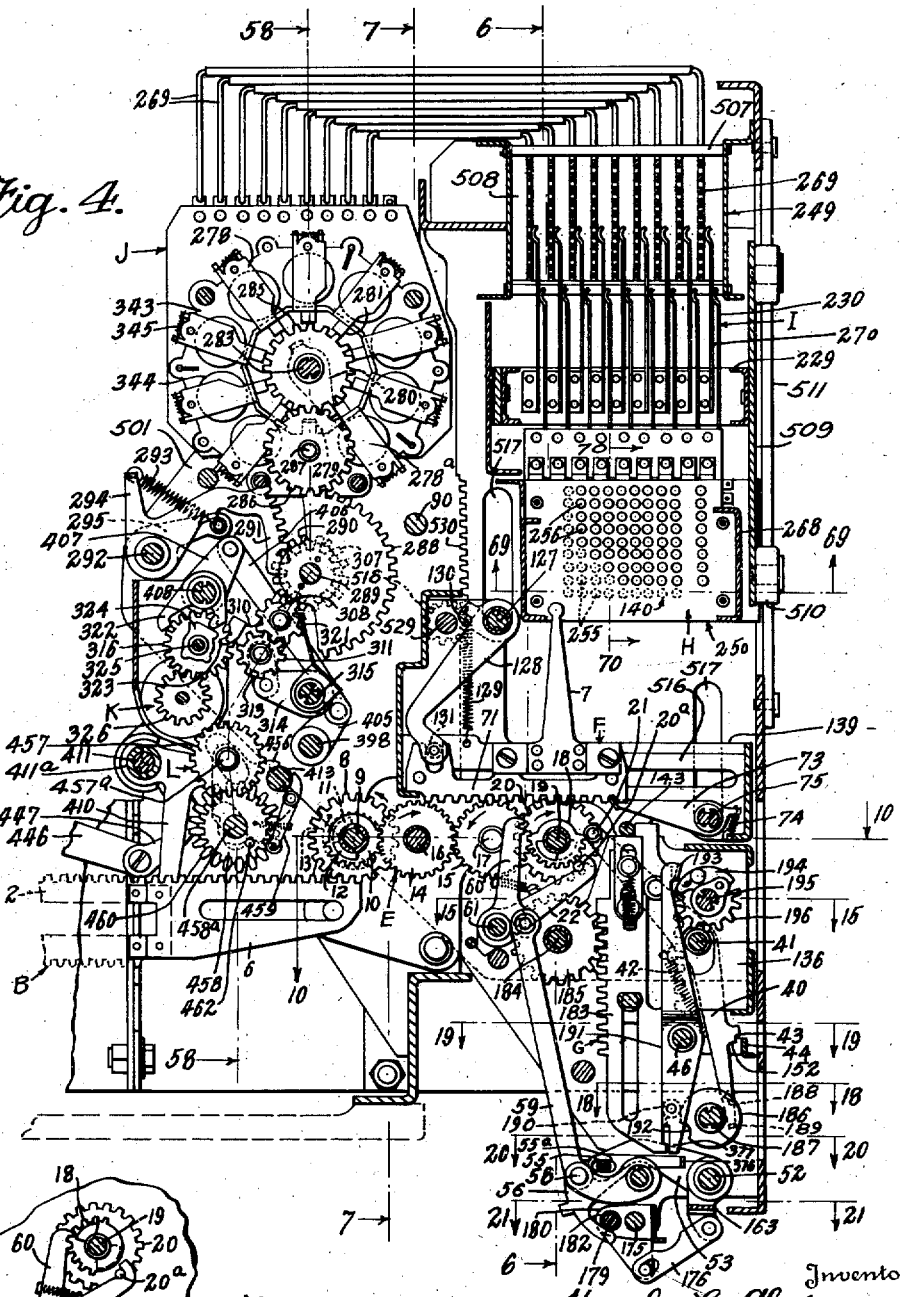
Figure 4 is a sectional view taken substantially on the line 4—4 of Figure 1.
Figure 5:
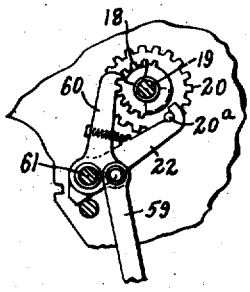
Figure 5 is a fragmental detail view illustrating the control liner in engagement with the acuating pinion of the multiplying unit embodying our invention.

The arm 125 is secured to a shaft 127 upon which shaft there is also provided the brush shifter arms 128. The arms 128 are yieldably urged in a direction to shift the racks 71 by means of springs 129 and are normally held from such movement by stop members 130 (Figure 4) which are keyed to shaft 127. The stop members normally retain the arms 128 in the initial position illustrated in Figure 4, but when shaft 127 is rotated, as previously explained, the movement of the arms 128 is permitted. The arms 128 then, because of their flexible connection as indicated at 131 with the racks 71, drive the racks 71 in a horizontal direction until the lugs interposed between the gear 20 and the pinion segment 18 are again engaged, which determines the amount of horizontal movement of the brush 7 with direct relationship to the numerical value of the previous movement of the pinion segments 18. Thus the brushes 7 are shifted horizontally to indicate the numerical value of the multiplicand for each key depressed. The brushes 7, the construction of which will be described in more detail later, are borne on the racks 71. These racks are suitably mounted in slots in members 516 which are supported by brush frame 139. The brush frame 139 is mounted in suitable slots 517 in the frames 245 as shown in Figures 4 and 6. In these slots the brush frame is movable as described later, being kept in alignment by gears 518 mounted on either end of shaft 519 and riding on racks 530 of the frames 245.

Figure 34:
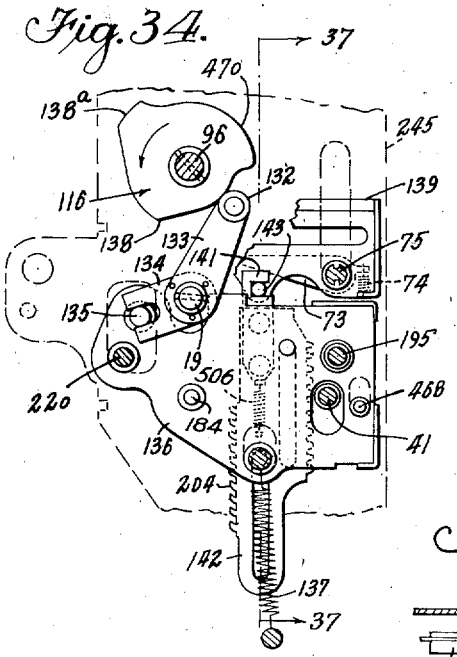
Figure 34 is a detached elevation partly in section of the brush frame elevating means.
Figure 36:
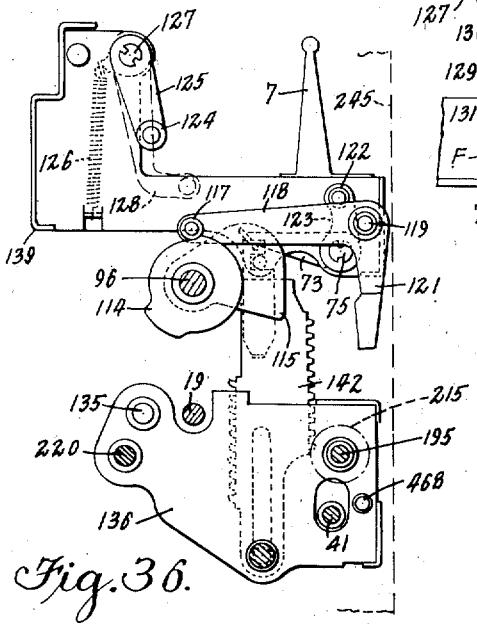
Figure 36 is a further illustration of the brush assembly control means illustrating the brush frame in its extreme elevated position it would assume in the operation of the multiplication of 9×9.
Figure 37:
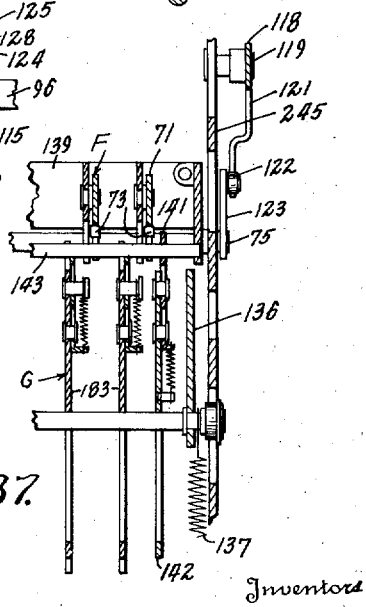
Figure 37 is a sectional elevation taken on the line 37—37 of Figure 34 illustrating a portion of the brush frame assembly.

The brush frame 139 is flexibly connected to the multiplier rack frame 136 by a hook 141 which engages transverse rod 143 of the frame 139 (Figures 34, 35 and 36). The hook 141 is borne on driving rack 142 being slightly movable with respect to rack 142, a spring 506 being provided to form a resilient connection. The frame 136 is shown in Figures 4, 6, 34, 35, 36, 52 and 53. Slidably mounted on this frame is rack 142 and also racks 183 (Figure 55) whose functions will be described later. It is only necessary to note now that the construction described and illustrated in the figures permits frame 136 to move brush frame 139 and the further motion of brush frame 139 is later possible.

The frame 136 is moved by cam 116 (Figure 34) acting on cam roller 132 carried by an arm 133. The arm 133 is mounted on the shaft 19. Operatively connected with the arm 133 is a yoke member 134 so that as the arm 133 is rotated under the influence of the cam 116, the yoke 134 engages a pin 135 carried by the multiplier rack frame 136, which is normally held downwardly by means of a spring 137.

The cam 116 in this operation is rotated until a mid-point 138 of said cam engages the roller 132, at which time the roller 132 passing over said point, lifts the frame 136 to raise the brush frames 139 (Figure 4) to a position of disengagement of racks 71 with the gears 20. While the gears 20 are thus disengaged, the liners 60 are released from engagement with the pinions 18, permitting pinions 18, gears 20 and the gear train associated with them to return to normal under the action of the springs 13. The release of the liners 60 is accomplished through the medium of the cam 144 (Figures 30 and 31) which engages the cam roller 145 of the yoke member 112. As the mid-joint of this cam 144 passes under the roller 145, it raises the yoke 112 which is connected to the rod 55. As rod 55 is raised from the position shown in Figure 4, it will slide the tails of the pivoted levers 56 over rolls 182 on shaft 179 (Figure 21), raising link 59 and disengaging liners 60. Cams 144 and 116 are so timed in relation to each other that the liners 60 are released at the mid-point in the movement of the multiplier rack frame 136 when gears 20 are not in mesh with the racks 71 nor the gears 148. Continued rotation of the shaft 96 until the roller 132 reaches the high-point 138a of the cam 116 results in further elevation of the frames 136 until the gears 148 are brought into mesh with the gears 20, this part of the operation occurring after the gears 20 have been returned to their normal position. At this time the clutch interrupter 107 interrupts the operation of the clutch driving the shaft 96 to hold the parts in this position during the remainder of the multiplier cycles. The gears 148 have companion gears 185 which are secured to integral hubs journaled on shaft 184. The gears 185 are in engagement with the racks 183 (Figures 4 and 6), and control the amount of movement of said racks as hereinafter explained.

The raising of this frame 136 through the connection thereof with the brush frame 139 results in the raising of the brush frame 139. Consequently the brushes 7 which are borne on the racks 71 in frame 139 move into position in alignment with the first row of contacts 140 of the multiplier panels 268. The assembly mounted on the panels and the brushes 7 cooperating therewith are the multiplying member H. As the brush 7 has been previously shifted to the right, as viewed in Figure 4, to the point determined by the multiplicand as set, it will be in a position of alignment with one of the contacts of said row 140. This operation also results in the raising of the rack 71 away from the gear 20 so that in order to maintain the brush 7 in this selected position, the latch member 73 must have previously been returned into engagement with the teeth of the rack 71. This is accomplished due to the fact that the timing of the cams is such that the cam roller 117 passes off from the high-point of the cam 114 as soon as the brushes 7 have been set to the multiplicand position, as previoutly described, thus permitting the spring 74 to return the latch member 73 into engagement with the teeth of the rack 71 and to hold the brushes 7 in the selected position until the multiplication has been completed.

It has been explained how clutch dog 72 (Figure 28) is released to permit cam 85 and its associated spiral gear 69 to transmit one revolution to gears 70, 86 and 87 (Figure 25). Gear 87 (Figures 23 and 24) carries a pin 36a adapted to strike switch lever 36 just before the cam 85 makes one revolution. This moves switch lever 36 enough to open momentarily switch 38 which will again close unless switch lever 36 is latched as hereafter described. When rod 55 was raised to release the liners 60 as previously described, the latch lug 50 was moved to a position to permit engagement with latch 49. At the same time, through the release of liners 60, pinions 18 and levers 40 were returned to their initial position, releasing the bail 44 from engagement with the shoulders 152. The latch lever 32 has therefore moved against the latch tip 34 of switch lever 36 under the influence of spring 36b, this movement being permitted by the release of bail 44 as previously explained. The switch lever 36 will therefore be latched with the switch 38 in the open position, and latch 49 will engage latch lug 50 to retain the liners 60 in the disengaged position in which they are now being held by the "high" portion of cam 44 (Figure 31).

The current now being off, the momentum will complete the movement of cam 85, shaft 90, and associated gears. When the clutch dog 72 strikes the shoulder of cam 85, gear 67 will be declutched and the multiplying unit will come to rest. As the gears coast to complete their cycle of revolution, the "high" point of cam 144 will pass from under roller 145, but rod 55 being held in its upward position by the engagement of latch lug 50 and latch 49, it will remain away from cam 144 as shown in Figure 30.

The multiplicand cycle is now complete and the elements of the multiplying unit has been positioned to receive the multiplier.

*The multiplier cycles*

The multiplicand cycle having been completed to set all of the brushes 7 into position adjacent their determined electrical contacts of the rows 140 (Figure 4) of the multiplying members H, the multiplier is then set into the machine through the medium of the same keys 1 of the keyboard of the accounting machine. The same keys 1 are utilized for setting both factors and operate through their normal depression to determine, as the motor bar of the accounting machine is actuated, movement of the racks 2 corresponding with the particular value of the keys 1 depressed.

This movement operates through the chain of gears 8, 10, 14, 15, 18 and 20 in exactly the same manner as heretofore described for the multiplicand operation, moving the pinion segment 18 of each of said units the amount determined by the particular key depressed.

Figure 8:
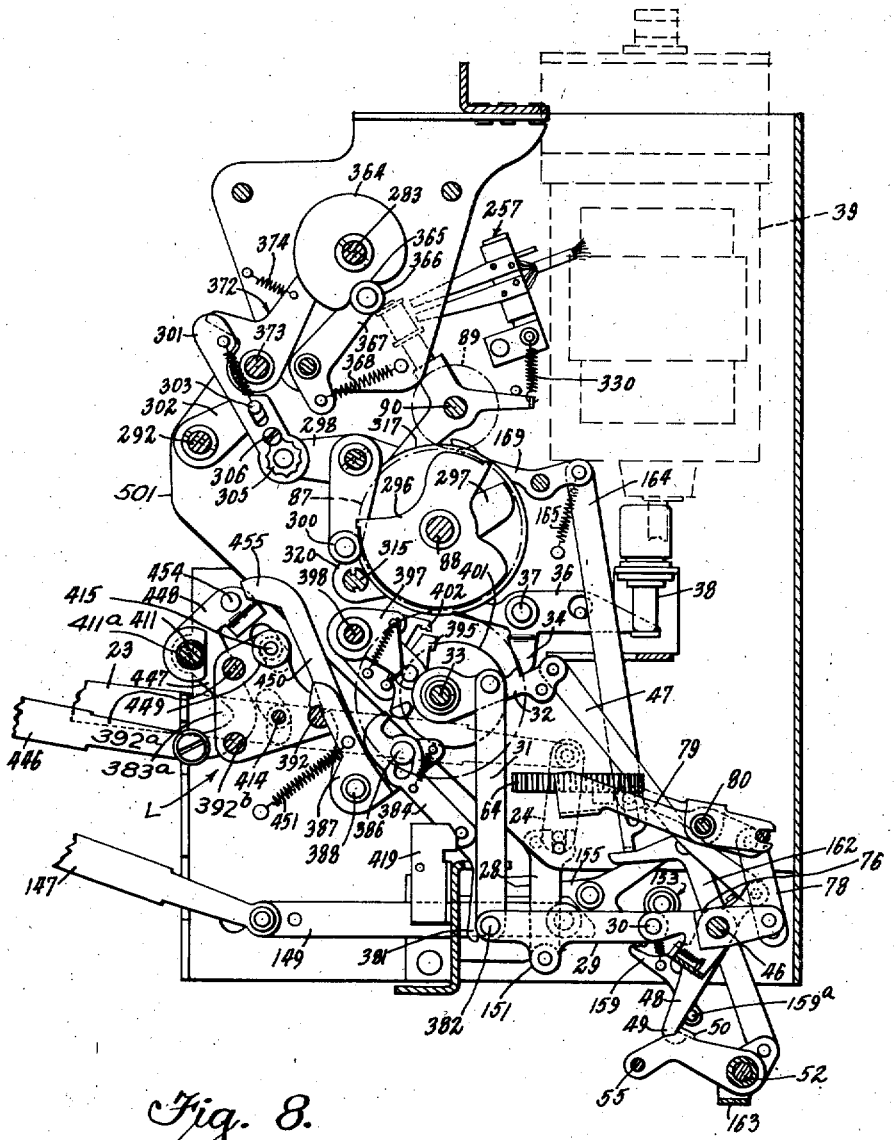
Figure 8 is a sectional view taken substantially on the line 8—8 of Figure 7.

As soon as the accounting machine is actuated to print the first factor, the carriage automatically shifts to the second factor position—this being the normal functioning of the accounting machine. In the second position the carriage lug 143 which is a standard part of the Ellis machine is of such a nature as to control the actuation of link 147 (Figures 8 and 22), which is also a standard part of the Ellis machine, on "add-timing." However, instead of the control link 147 actuating one of a plurality of counters as was intended by the designers of said machine, it now actuates the member 149 of the multiplying unit at the time during the cycle of the accounting machine when it would normally engage an accumulator for addition. Thus when the carriage is in the second position and the motor bar is depressed, the accounting machine will print the multiplier and the racks 2 will move the pinion segments 18 to the appropriate position in the same manner as described for setting the multiplicand in which position they rest momentarily while the link 147 is actuated. This actuates member 149 of the multiplying unit and starts the sequence of operations hereafter described.

Actuation of link 147 will, through means hereinafter described, engage the liners 60 with the pinion segments 18 to hold them in position until released and, through means also hereinafter described, will start the motor 39 and multiplier cycles.

The mathematical principle on which the multiplication is based is that all digits of the first factor must be multiplied by each digit of the second factor and the resulting partial products accumulated to give the final product. There is therefore one complete cycle of the multiplying unit for each significant digit of the second factor. By significant digit is meant a digit other than zero.

As the multiplier control lever 147 is actuated, it produces a forward impulse upon the connecting link 149 (Figure 39) to which it is pivotally connected. On link 149 there is pivotally mounted a member 150 which is held against pin 149a in the position shown in Figures 22 and 39 by a spring 512 so that when member 150 is moved to the left (Figures 22 and 39) a downward pressure will be exerted on the roller 151 as the bent tip of member 150 moves over it. When member 150 returns, the spring 512 will permit member 150 to slide idly over the roller 151. Roller 151 is mounted on link 28 and downward pressure thereon moves links 28 and 29 (Figures 22 and 23) which, operating through the links 31, 32 and the control switch stop link 36, closes the electrical circuit to the motor 39. At this time the pivot 30 has been again fixed in the same manner as heretofore described, i. e., due to the fact that the motor control bail 44 is engaged with the shoulder 43 of the lever 40.

At the end of the multiplicand cycle, this engagement between the shoulder 43 and the motor control bail 44 as it is occurred during the multiplicand cycle was disrupted by the return of the pinion segments 18 and the rollers 21 to their normal position. But now that a numerical value has again been set in the segmental pinions 18, these parts are again moved to the latched position. It will be recalled that the bail 44 first engages shoulders 43 of levers 40 and then after the tripping of latch 48 engages shoulders 152 of levers 40.

Figure 26:
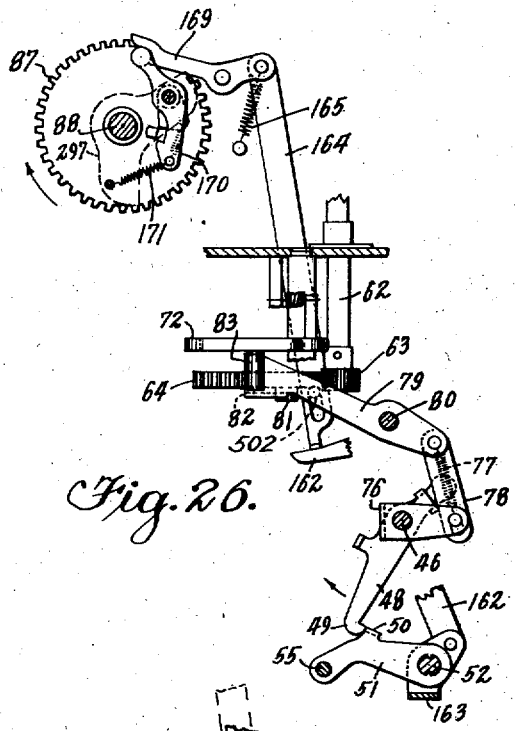
Figure 26 is a detached elevation of the clutch control mechanism for the operating motor.
Figure 39:
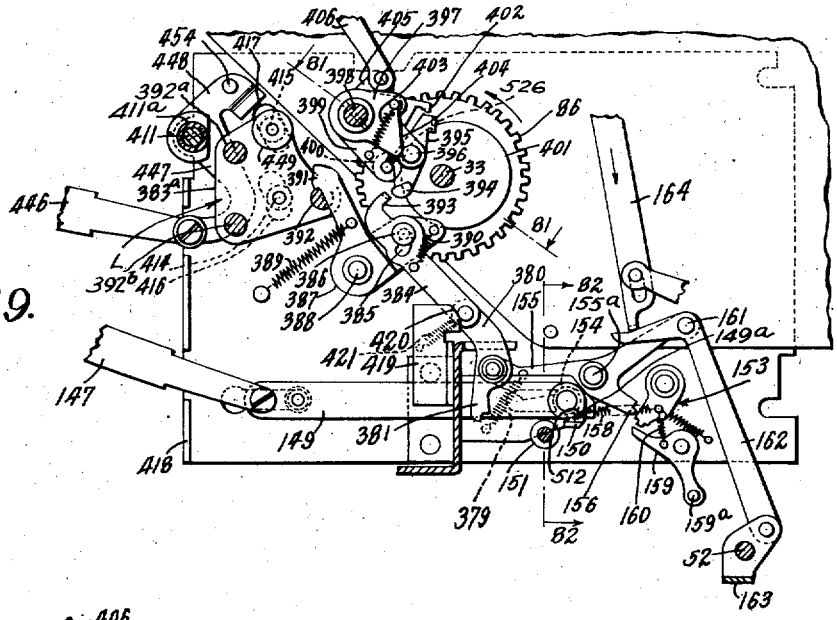
Figure 39 is a fragmental elevation partly in vertical section of the linkage mechanism for operation of the motor stop-start mechanism illustrated in Figure 23 and illustrating the mechanical relay connections between the accounting machine and the multiplying unit illustrating the same in their non-operated positions prior to the setting up of the first factor.
Figure 40:
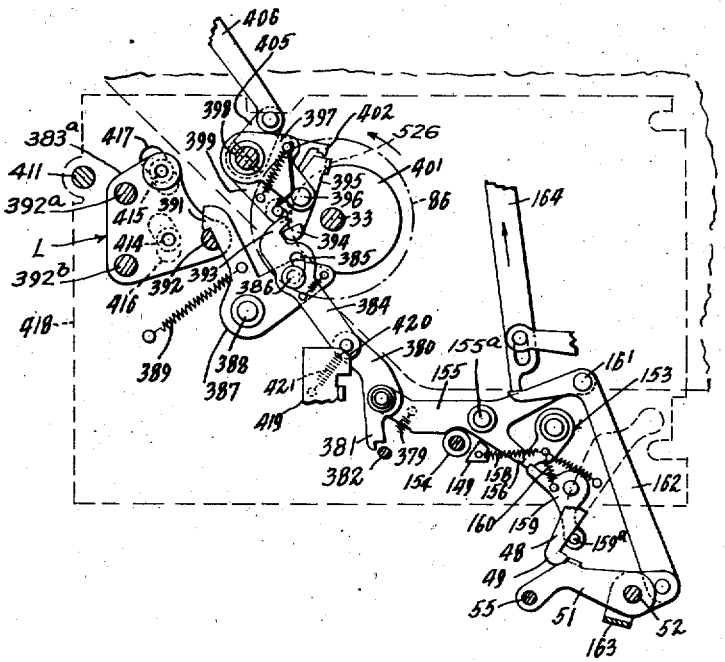
Figure 40 is a view similar to Figure 39 illustrating the same mechanism as Figure 39 but with the parts moved to the positions occupied after the section factor has been set.

At the time the mechanism previously described is actuated to start the motor and engage the liners 60 with the pinion segments 18 to set the second factor therein, the double trigger latch 153 and 159 which is normally in the position shown in Figure 39 is set in the position shown in Figure 40. This is accomplished by the roller 154 rotating the lever 155 about pin 155a carried on frame 418 moving the trigger end 156 into position to engage the trigger member 153 as the same is pulled forward under the influence of the spring 158 and at the same time the second element 159 of this trigger latch is likewise pulled into engaging position by the spring 160. During this operation, as the lever 155 is rotated by the roller 154, the pivot 161 carried thereby is lowered, resulting in the swinging of the clutch control link 162 to rotate the yoke 163 journaled on the shaft 52 (Figures 39, 40 and 41) and at the same time permits the control link 164 to move downwardly under the influence of its spring 165 (Figure 26).

Yoke 163 is linked to a yoke 174 through a link 176 and a crank piece 181. A slot in link 176 and a pin 177 on crank piece 181 provides a loose connection between the two yokes. Yoke 180 is pivotally mounted on shaft 175, being urged upward by a spring 178 which connects rod 55 with the rod 179 which is borne on yoke 180. Also mounted on shaft 175 is a second yoke 174 which also carries rod 179 so that the entire assembly comprising yokes 174, 180 and rod 179, acts as a single yoke pivoting about shaft 175. Yoke 174 is connected to a clutch operating link 173 by a pin 441.

It has previously been explained how gear 92 (Figure 32) drive gears 94 and 168 when the motor is running. Gear 94, as previously explained, is at this stage of the operation declutched by clutch arrestor 107 and is turning idly, as is also gear 168. Gear 168 is journaled on shaft 167 carried on the frames (Figures 7, 32, 41 and 42). Gear 168 carries a clutch dog 166 which is normally urged toward engaging position by a spring. A plate 340 is fastened to the shaft and carries a pin adapted to engage the clutch dog and cause the gear to drive the shaft. This clutch mechanism is of the same type as was described for gear 94 and its associated driving plate.

Through the linkage between yoke 163 and clutch link 173 as described above, the actuation of yoke 163 will cause link 173 to move upwardly and move the clutch arrester 172 so as to allow the clutch dog 166 to engage to drive the shaft 167. Fastened to shaft 167 are the cams which control certain of the operations that take place during the multiplier cycles as will subsequently be described.

At the same time yoke 163 is moving, link 164 (Figures 41 and 26) is moving downwardly to release the clutch arrestor 169 and permit the gear 87 to drive the shaft 88. The construction of this clutch is the same as those previously described. Gear 87 is journaled on shaft 88 carried on the frames. Shaft 88 also carries cams which control certain of the operations which take place during the multiplier cycles as subsequently described.

Figure 27:
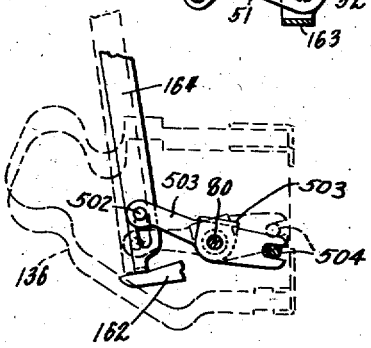
Figure 27 is a detached fragmental view illustrating the balance of the control linkage which cooperates with the mechanism as illustrated in Figure 26 in controlling the clutch mechanism for the operating motor.

The link 164, whose function is above described, is mounted on a pin 502 in yoke 503 (Figures 6 and 27). Yoke 503 pivots about shaft 80. Yoke 503 is moved by a pin 504 mounted on frame 136. During the multiplicand cycle, frame 136 moves upward as previously described and assumes the higher dotted position illustrated in Figure 27 which places pin 502 in the lower end of the slot in link 164 and the downward movement of the link 164 is permitted.

The figures heretofore described show the rod 55 in its upward position, and the yoke mechanism, which is more particularly illustrated in Figures 41 and 42, in the position before the actuation of link 147 trips the latch members 49 and 150 (Figures 22 and 23). After this tripping operation, the rod 55 assumes the lower position and the rollers 182 which are mounted on rod 179 move upward so as to free the tail portion of the pivoted levers 56. Rod 55 (Figure 41) moves downward under the influence of spring 57 as has been described (Figures 22 and 23). This pulls downwardly on pivoted levers 56 and engages liners 60 with the pinions 18.

The second factor is now set in the pinions 18 and the tail pieces of pivoted levers 56 are now free from engagement with the rollers 182 so that these pivoted levers may perform the functions subsequently described.

As has been explained, the gears 148 which have associated with their companion gears 185, have heretofore been moved into a position of mesh with the gears 20, and as the racks 2 have moved, they have rotated the lugs between the pinion segments 18 and gears 20 away from each other a distance corresponding to the numerical value as determined through the movement of the racks 2.

The gear pairs 148 and 185 are journaled upon shaft 184 which is carried on brush frame 136. Gears 148 are adapted to mesh with the gears 20 and gears 185 are continuously in mesh with the racks 183 (Figure 4). Gears 148 now being in mesh with gears 20, the racks 183 can move upward by an amount determined by the position of the lugs on the pinion segments 18 when racks 183 are driven upwards as hereafter explained.

The racks 183 are the second factor setting racks G referred to in Figure 2 and now become control elements which in connection with the mechanism hereinafter described, control the successive actuation of the multiplying mechanism in accordance with the digits of the second factor.

There is provided in the machine a control means which determines the sequence of operation of the multiplier cycles so that each digit of the multiplier proceeding from right to left is independently multiplied with the multiplicand and this control mechanism includes stop discs 186 (Figures 4 and 48) which are secured to a shaft 187.

It has previously been described how the frame 136 is moved and how it pushes upward the frame 139 (Figure 34) so as to disengage the racks 71 from the gears 20 and bring the gears 148 into engagement with the gears 20. It is in this manner that the pinions 18 are made to do double duty, i. e., first to control the positioning of the brushes 7 in a horizontal plane and subsequently to control through racks 183 the positioning of these brushes 7 in a vertical plane, as will now be described.

There is one stop disc 186 for each rack 183, i. e., for each multiplier digit within the capacity of the machine and each of these discs includes an operation stop 188 and these discs are positioned upon the shaft 187 so that these operation stops 188 are progressively advanced around the shaft 187. The stops 188 are adapted to be engaged by the tail piece 189 of the levers 40 (Figure 50), and as these stops 188 are staggered around the circumference of the discs 186, the stop of the first unit or bank of the multiplying unit in which there is a digit of the multiplier other than zero will engage the tail piece 189 when the roller 21 passes onto the low point of the pinion segment 18 and when the shaft 187 is rotated. This permits a roller 190 carried by the lever 191 to drop into a related cutout 192 in the disc 186 as the rotation of the shaft 187 is arrested. There is one cut out 192 for each disc 186 and these cutouts are staggered or progressively advanced with respect to shaft 187 so that only one roller 190 can drop into its associated cutout 192 at any one time.

Figure 56:
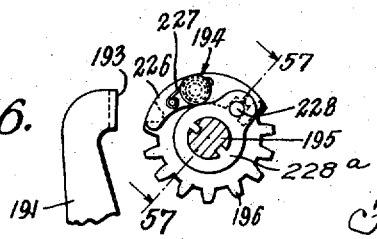
Figure 56 is a fragmental enlarged sectional view of the brush assembly pinion shaft clutch engaging mechanism.
Figure 55:
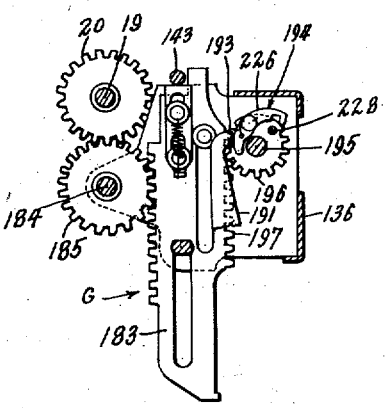
Figure 55 is an additional elevation partly in section of the stop racks of the multiplicand mechanism.
Figure 73:
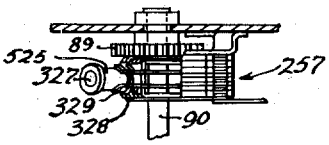
Figure 73 is a top plan view of the mechanism illustrated in Figure 72.

The levers 191 are all mounted upon the shaft 46 and at their opposite end are provided with clutch control ends 193 which control the meshing of the clutches 194 (Figures 55 and 56). The clutches 194 are interposed between the shaft 195 and the multiplier rack drive pinions 196 which are engaged with the teeth 197 of the racks 183.

It is necessary that the brush frame 139 be raised through a distance corresponding to the digit of the multiplier of the lowest denominational order, and subsequently by a distance corresponding to a digit of the next lowest denominational order and so on until the multiplication is complete.

Figure 52:
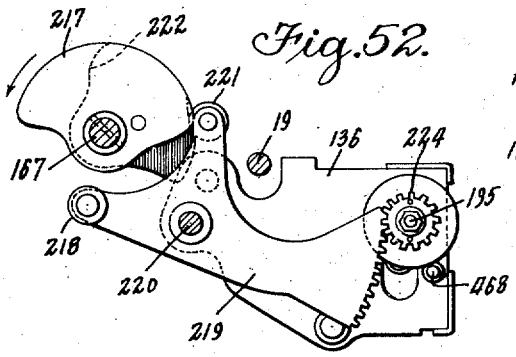
Figure 52 is a fragmental elevation partly in section illustrating the brush assembly operating means in its non-operating position.
Figure 53:
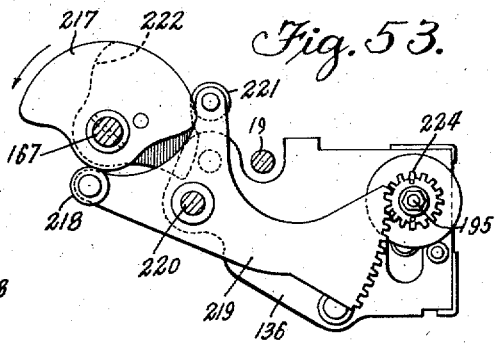
Figure 53 is a view similar to Figure 52 illustrating the parts in operating position.

The means for driving the frame is the flexible drive mechanism illustrated in Figures 52 and 53. The driving segment 219 is journaled on a pin 220 borne on the frame 136 and is moved into the operating position illustrated in Figure 53 when frame 136 is moved to the second factor position to engage gears 148 and gear 20 and to shift the brushes 7 to the first row of contacts 140, as previously described.

Figure 16:
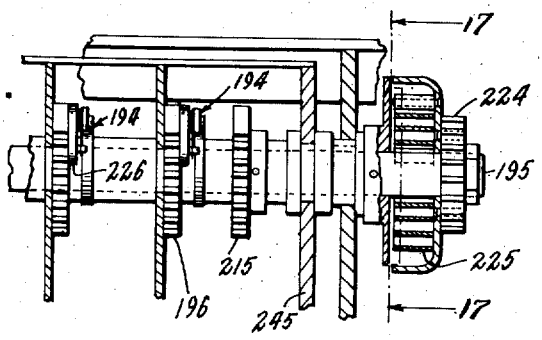
Figure 16 is a fragmental sectional view taken substantially on the line 16—16 of Figure 15.
Figure 17:
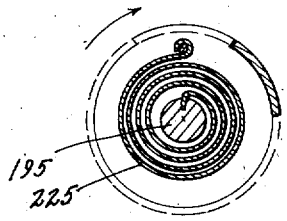
Figure 17 is a sectional end view taken substantially on the line 17—17 of Figure 16.
Figure 19:
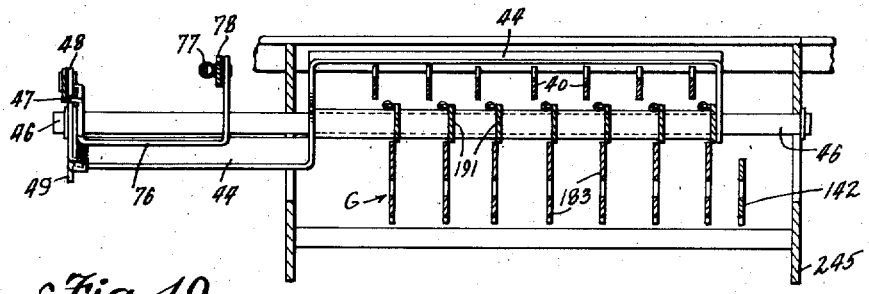
Figure 19 is a sectional plan view taken substantially on the line 19—19 of Figure 4.
Figure 20:
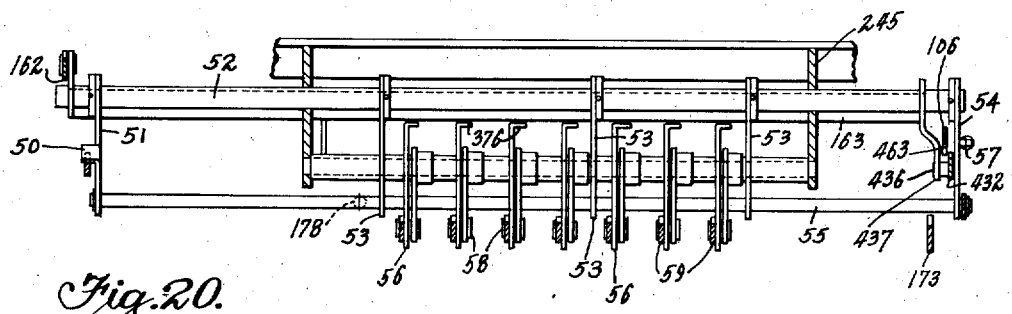
Figure 20 is a sectional plan view taken substantially on the line 20—20 of Figure 4.
Figure 21:
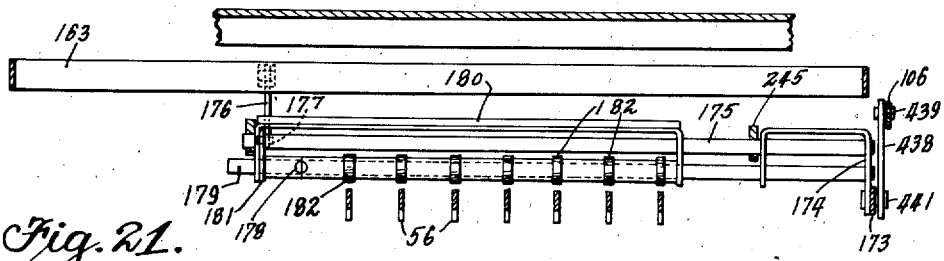
Figure 21 is a sectional plan view taken substantially on the line 21—21 of Figure 4.
Figure 54:
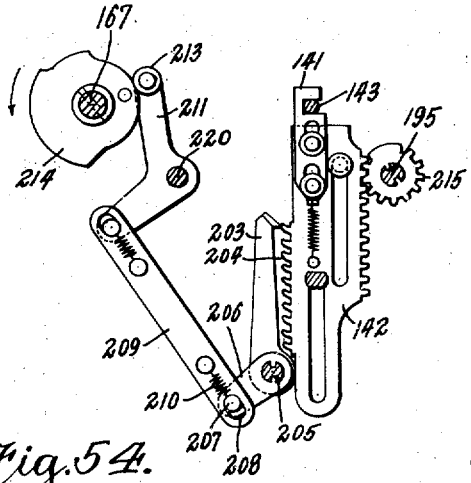
Figure 54 is a fragmental elevation partly in section illustrating the brush frame operating mechanism for the vertical movement of the brush assembly.

Cams 217 and 222 cooperate to drive the segment 219 in a counter-clockwise direction and then in a clockwise direction, acting first on cam roller 218 and then on cam roller 221. During the counter-clockwise movement, rotation is imparted to shaft 195 through the spring drive 225 (Figures 16 and 17). Shaft 195 will rotate with it the gear 215 (Figure 54), and through the hook connection 141, previously described, rack 142 will drive the brush frame 139 further upward (Figure 36). It will be remembered that heretofore the frames 136 and 139 have moved upward together. Frame 139 is now driven further upward as is shown in Figure 36. It will also be remembered that shaft 167 on which cams 217 and 222 are mounted was clutched to the rotating gear 168 (Figures 7, 32, 41 and 42) at the beginning of the multiplier cycles. A flexible drive through the spring 225 (Figures 16 and 17) is thus established to drive the frame 139 a distance which is controlled by the settings of the pinions 18, as will now be described.

Also mounted on shaft 167 is cam 243 (Figure 47). A spring 244 pulls the roller 242 against the cam 243 through a link 231, a gear segment 232 mounted on stub shaft 234 carried in frame 245, a link 239, and a bell crank lever 240 which is mounted on stub shaft 220. Stub shaft 220 is mounted on frame 136 and extends through an opening in frame 245 so as to permit movement of the bell crank lever 240 and the driving sector 219 (Figures 52 and 53) as previously described and also so as to permit movement of frame 136. The mechanism illustrated in Figure 47 serves also to control the denominational distributor and it will be described in more detail when that element is described. However, it is necessary to note at this stage of the description that gear sector 232 as it moves under the influence of spring 244 drives gear 233 which is keyed to shaft 187 on which are mounted the discs 188 previously described.

Figure 57:
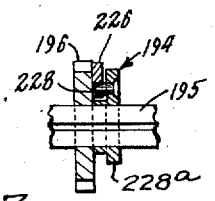
Figure 57 is a fragmental sectional view taken substantially on the line 57—57 of Figure 56.

The cam 243 is so related to cams 217 and 222 which are all on the same shaft 167 that the roller 252 will drop off the high point of the cam 243 before any motion is imparted to sector 219 as is more particularly illustrated in the cam timing chart to which reference will be made later. Therefore, the first thing which will happen as shaft 167 rotates is the rotation of shaft 187 through the linkage already described. However, this shaft can only rotate until one of the staggered operation stops 188 on one of discs 186 hits the tail-piece 189 of lever 40 (Figures 49 and 50). As shown in Figure 48, and as previously described, the tail-piece 189 will not be in the path of the stop 188 unless the associated pinion 18 is set to represent a numerical value. Due to the manner in which the stops 188 are staggered, the shaft 187 will be stopped by the lever 40 associated with the pinion 18 representing the lowest order that is set. When the disc 186 of this lowest order is thus stopped, the roll 190 of lever 191 will drop into the related cutout 192 under the influence of spring 42. This will release the clutch dog 226 (Figures 56 and 57) and engage the gear 196. (There is one gear 196 for each lever 191 and each pinion 18.) Clutch dogs 226 are normally held out of engagement with pins 228 which are borne on crank arms 228a which are keyed to shaft 195. When, however, a lever 191 is moved, as previously described, the spring 227 brings the associated clutch dog 226 into engagement with the pin 228 so that the associated gear 196 is driven by the shaft 195. Each gear 196 is in mesh with the teeth 197 of a rack 183 (Figure 55). As has been explained, these racks are mounted on frame 136. Since only one gear 196 can be clutched to the shaft 195, only one rack 183 can move at any one time. Shaft 195 is driven by the drive mechanism previously described after the discs 186 have been set and the appropriate rack 183 selected (see timing chart). The first rack 183 that is selected for operation as described above will move upward, rotating gear 185 and its associated gear 148 and gear 20 until the stop shoulder of gear 20 meets the stop shoulder of pinion 18. The motion of the entire chain of racks and gears will then stop, shaft 195 will cease to rotate, and further motion of segment 219 and gear 224 will serve merely to tense the spring 225. As cams 217 and 222 continue to rotate, segment 219 will reverse itself and, moving in a clockwise direction, will release the tension on spring 225 and thereafter positively drive shaft 195 and the associated chain of racks and gears to their original position.

The movement of the frame 136 as occurring at the end of the multiplicand cycle also controls the clutch dogs 226, throwing all of these clutch dogs out of engagement with their associated clutch pins 228. This is accomplished by the fact that the shaft 195 is carried by this frame 136 and the clutch dogs 226 are so related to the clutch ends 193 of the levers 191 as to cause this disengagement on upward shifting of this frame in the moving of the brushes 7 to the first row of contacts 140. The clutches 194 are selectively engaged thereafter by the selective releases of the members 191 as heretofore described.

Means are provided whereby when the rack 142 is raised the amount determined by the digital value of one of the components of the multiplier, it will be held in this raised position throughout the cycle of multiplication of the multiplicand by this digit of the multiplier, and this means includes a ratchet pawl 203 (Figure 54) which is adapted to engage the teeth 204 of the rack 142. This pawl 203 is secured to a shaft 205 to which is also secured a link 206. The link 206 carries a pin 207, which pin 207 is mounted in the slot 208 of the link 209. A spring 210 is interposed between the link 209 and the pin 207 to provide a yielding connection so that when in proper position the teeth 204 may ratchet over the pawl 203 in permitting the control rack 142 to return to its normal position.

The link 209 is connected by means of a similar yielding connection with the bell crank 211 pivoted on a pin 220 and carrying at its opposite end a cam roller 213, which cam roller is yieldingly held against a cam 214 carried on the shaft 167. As the shaft 167 is rotated, as was heretofore described, the cam roller 213 passes to the low part of the cam 214 permitting disengagement of the pawl 203 from the teeth 204 which permits the control rack 142 to be raised, and when the control rack 142 has been raised to raise the multiplier frames 139 the distance determined by the digital value of the multiplier, continued rotation of the shaft 167, operating through the linkage just described throws the pawl 203 into engagement with one of the teeth 204 holding the control rack in this position.

Before the next digital value of the multiplier can be registered in the multiplying unit, it is necessary to return the frame 139 which carries the brushes 7 to the starting position so that the second digital value of the multiplier as has heretofore been set up in the next bank of the machine can be utilized to similarly position the brushes 7 for the multiplying operation. This is accomplished by the cam 214 on the shaft 167 releasing the pressure on the pawl 203 and allowing it to ratchet over the teeth 204 of the rack 142. At the same time the cams 217 and 222 also carried on the shaft 167 drive the racks 183 and 142 back to their original position and the cam 144 which is borne on the side of gear 94 and rotates with it, will, through the link 112, pull rod 55 rocking the arms 51, 53 and 54 and the shaft 52 to which they are fastened.

In the case of all of the banks of the multiplier unit in which a zero stop lever 191 has not been set, the tip 376 of the member 56 will move idly, but in the bank where the stop lever 191 is set, this free movement of the member 56 is prevented by the tip 377 of the stop lever 191 which, in this case, lies in the path of the tip 376 and then becomes a pivot about which the member 56 will move and this movement will be transmitted through the stud 58 to the link 59 to disengage the liner 60 of the operating bank. As has been explained, the lever 191 which is in position so that its tip 377 will act as an operating pivot for the pivoted lever 56 is the one for which the associated roll 190 has entered the cutout 192. This is the lever 191 associated with the pinion 18 of the lowest order of digits in the multiplier. The line 60 associated with this pinion 18 now having been released, said pinion 18 will be free to return to its initial or zero setting under the action of the spring 13 (Figure 4). Pinion 18, however, is in mesh with gear 148 and will return as gear 148 is returned to its initial position. As previously described, only the rack 183 associated with the pinion 18 representing the right-hand digit of the multiplier has been moved to act as a stop for the multiplier control racks 142. This rack is now restored to its starting position due to the rerotation of the shaft 195. The return of the rack 183 rotates the gear 148 back to its original position. As the pinion segment 18 is now free, it also returns to its original position due to the action of the tensed spring 13 acting through the chain of gears to the gear segment 18. This resets all the gearing for this operating bank of the multiplying unit. As this gear segment 18 is reset, it restores the stop bar 40 through the camming action of the pinion 18 on the roll 21, which makes this bank ineffective for further operation but permits the operation of the next bank in which the stop bar 40 is set. The oscillatory motion of sector 232 will return shaft 187 to its initial position after each pinion 18 is released. Since shaft 195 is stationary when shaft 184 moves, any momentary engagement of unselected clutches 194 is immaterial.

As has been previously explained, the motor will continue to run and the multiplying unit continue its second factor cycling operation as long as the switch control bail 44 is restrained from rotation by the shoulder 152 of any stop lever 40. Each pinion 18 that is set and its associated vertical rack 183 (the second factor setting racks G of Figure 2) will thus consecutively take control of the operating of the multiplier brush frame 139 until the rack 183 in the last bank (highest denomination) in which a pinion segment 18 has been set has operated. Switch control bail 44 will then be released and the control mechanism will be free to start the clearing cycle as explained later.

*The multiplying members*

We have told how the brushes 7 are moved, first to position representing the first factor and then how the brush frame in its entirety is moved successively to positions representing the product of all the digits of the first factor by each digit of the second factor. We shall now describe in more detail the structure of the multiplying members H.

The brushes 7 heretofore for simplicity indicated in the singular for each rack 71 in the frame 139 are in fact composed of two pair of brushes $7^a$, $7^b$, $7^c$ and $7^d$. Cooperating with these brushes are electrical multiplying plate assemblies 250 and feed plate assemblies 251, Figure 6. The feed plate assemblies 251 are composed of feed plates 252 and 253 separated by an insulating plate 254.

Figure 71:
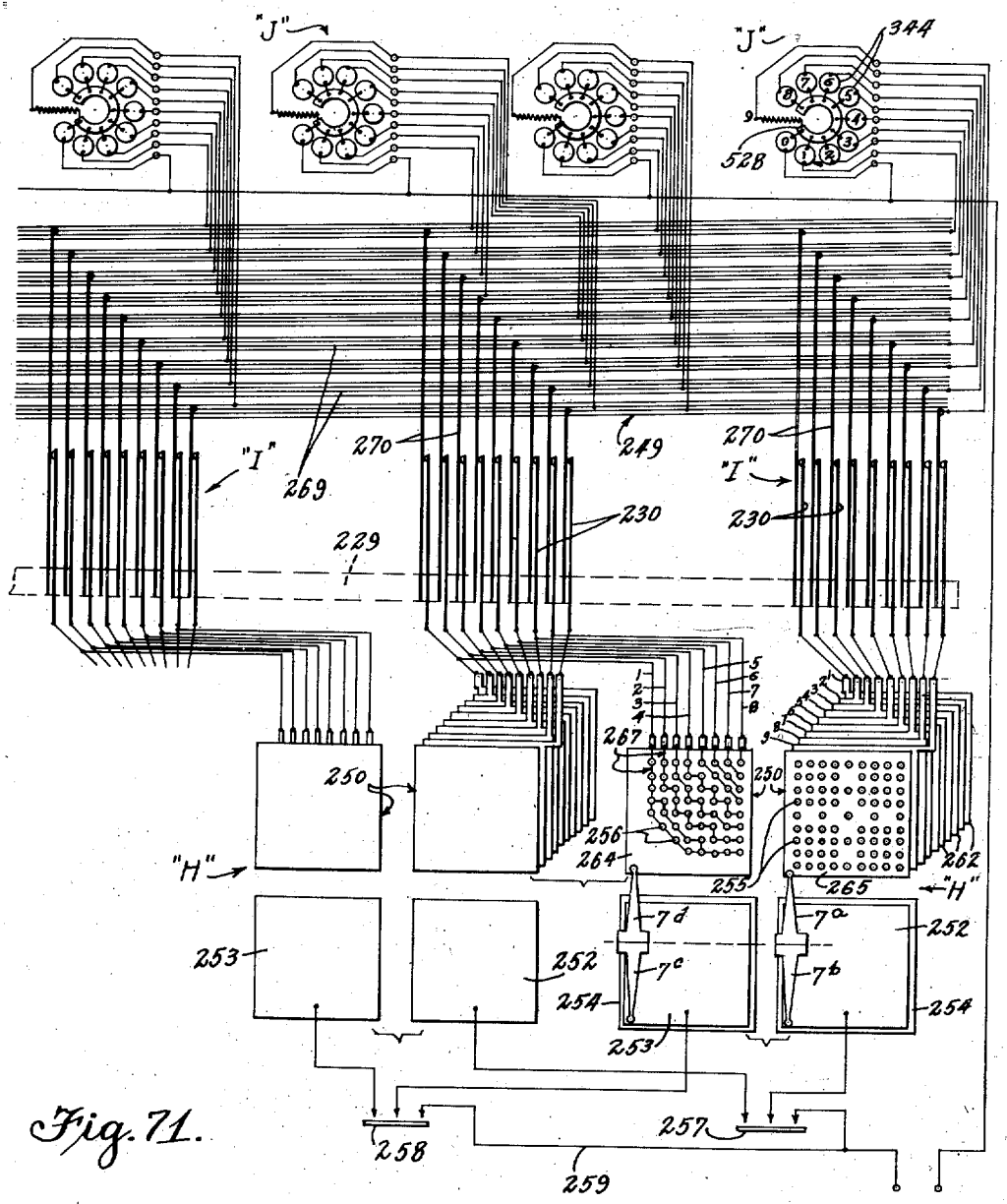
Figure 71 is a diagrammatic circuit diagram.

As represented in Figure 71, the plate assembly 250 at the right-hand side of said figure is the third assembly represented in Figure 6, i. e., the one of unit value. The second assembly 250 is of tens value, and the third assembly 250 is of the hundreds value. The brush pairs are interposed between these assemblies 250 and the feed plates 252 and 253, the brush 7[a], for example, adapted to engage the electrical contacts 255 of the right-hand assembly 250 and the brush 7[b] to contact the feed plate 252, and the brush 7[c] to contact the feed plate 253, and the brush 7[d] to engage the opposite face contacts 256 of the second or next adjacent plate assembly 250, that is, the one of the next higher order.

The feed plates 252 are electrically connected with a switch 257. The feed plates 253 are electrically connected with a second switch 258. When the switch 257 is closed, the electrical circuit is completed from the supply main 259 to the plate 252, and through the brushes 7[b] and 7[a] and the preselected contact 255 of the assembly 250, through the denominational order brushes 270 to the appropriate solenoid of the accumulator control J, Figure 2. The denominational distributor I and the accumulator control J will be described in more detail later. Only sufficient mention will be made now to show the manner in which the circuit is completed through the multiplying members H.

When the switch 258 is closed, the electrical circuit is also completed from the main 259 to the contact plates 253 through the brushes 7[d] and 7[c] and the contacts 256 of the plate assemblies 250 of the next higher order, and through the denominational distributor brushes 270 to the solenoid of the accumulator control J of the next higher order. As is later explained, there are two actuations of the accumulator control J for each multiplication cycle, one for the right-hand component and one for the left-hand component. The switch 257 closes during the first actuation and the switch 258 during the second.

The multiplying plate assemblies 250 (Figures 69, 70, 75, 76 and 77) are each composed of nine plates 262 representative of the units from 1 to 9, inclusive, and are electrically connected by the contacts 255 representative of the digital value of the right-hand components of the product of the numbers from 1 to 9 by any number from 1 to 9.

The plates 262 are electrically insulated by insulators 263 and are held between insulating plates 264 and 265. Each of the plates 262 is electrically connected to a brush 230. The brushes 230 make continuous contact with the denominational distributor brushes 270. These latter brushes are connected through nine circuits of the denominational distributor 249 to the appropriate solenoids of the accumulator control J.

Each plate assembly 250 also includes eight contact plates 267 which serve to represent the left-hand component of the products of numbers of the next lower order. Contact plates 262 and 267 for any one plate assembly 250 have common terminals appropriate to their digital values. To illustrate: The left-hand component of the product of 9×9 is 8. This left-hand component 8 will represent 8 in the tens place or 80, and will have the same brush terminal 230 as the right-hand component of the next higher order, as, for instance, the product of 80×1 or 20×4 or 90×2, etc.

In general, multiplication is performed by the selection of circuits in the multiplying members which are representative of the products of multiplications of 1×1 to 9×9. Contacts 255 represent the right-hand component of such products and contacts 256 represent the left-hand component. The contacts represent digital values of partial product and their coordinates represent the factors.

Figure 70:
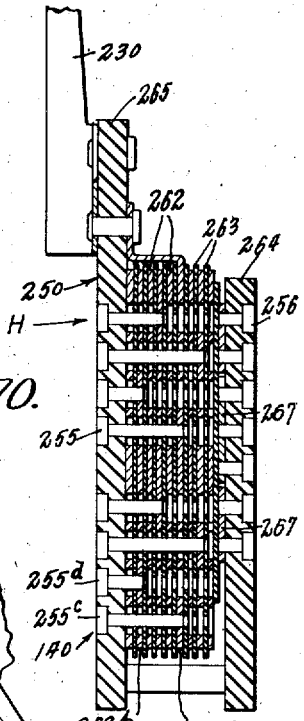
Figure 70 is a sectional view taken substantially on the line 70—70 of Figure 4 through the No. 4 set of contacts.
Figure 84:
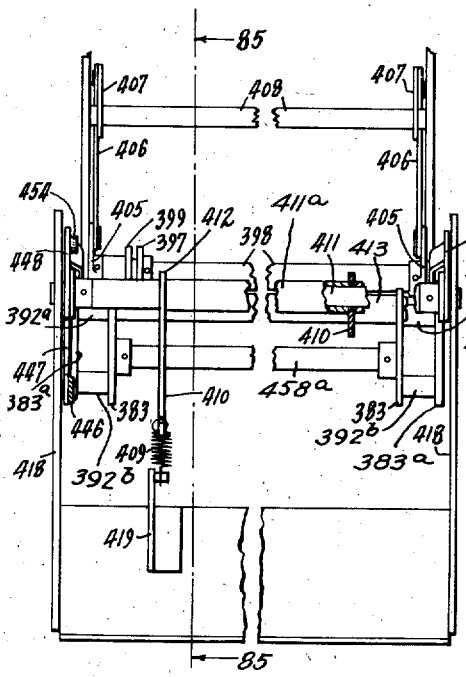
Figure 84 is a broken front elevation of the extremities of the accumulator-clearing shaft and the transfer assembly.

The construction of the multiplier plate assemblies is illustrated in Figure 70, which is a section taken at the fourth multiplicand position, i. e., the position in which a first factor of 4 may be multiplied by any second factor from 1 to 9. The contact 255[c] lies in the first row of contacts 140 and is therefore indicative of the multiplication of 4 by 1, giving the product 4, which it will be seen is in contact with the plate 262[a] which it will be observed is the fourth of the said nine plates 262.

The contact 255[d] is in electrical contact with the plate 262[b] which is the eighth plate of the nine plates and is indicative of the product of 4 by 2 or 8. Similarly the other contacts 255 are electrically connected with the corresponding plates 262 representative of the right-hand digit of the product of the multiplication of 4 by the numbers onward from 3 to 9, inclusive. It will be noted that where the product of 4 by 5 would give the right-hand component of zero in the product, no corresponding contact is provided.

The eight contact plates 267 are nested together in the multiplier plate assemblies 250. As has been explained the contact plates 262 representing the right-hand component are electrically connected to these eight contact plates 267 representing the left-hand component of the product of the next lower order having the same digital value. There is thus provided an assembly of nine circuits each one of which, except the circuit representing 9, has two branches, one branch for the right-hand component and one branch for the left-hand component of the next lower order. These circuits are connected to the brushes 230, there being nine brushes 230 for each assembly and one assembly for each digit of the multiplicand within the capacity of the machine. As above stated, the plates 267 representing the left-hand component of a units place product is assembled with the plate 262 representing the right-hand component of a tens place product and similarly for higher orders. The extreme right-hand plate assembly of the lowest order of the multiplying members H will be a half assembly constituting only right-hand components and the extreme left-hand plate of the highest order multiplier unit will be a half assembly containing only left-hand components, but each assembly and each half assembly will have a separate set of nine brushes 230. The multiplier assemblies provided are mounted on suitable frames 268 suitably spaced apart.

The multiplying members herein described are an improvement over that disclosed in the Clary Patent No. 2,167,827, hereinabove referred to. In this instance it will be noted that in order to select positions representative of the second factor, the brushes move and the circuit members representing numbers 1 times 1 to 9 times 9 are stationary, which is converse to the operation of that disclosed in the copending Clary application wherein the brushes are stationary and the circuit members movable.

It will also be noted in this respect that instead of the keys of the accounting machine acting as closing members to select the appropriate multiplicand circuits, the keys control the positioning of the circuit closing members to select the circuits. In the multiplying members it will be noted that the multiplicand circuits are the first row 140 of contacts on the member H.

*The denominational distributor*

A denominational distributor I is provided in order to place the product in its proper decimal position and includes a decimal shifter or decimal order control member composed of a frame 229 carrying the brushes 270, and the diagonally spaced contact wires 269 of the denominational distributor 249.

Figure 9:
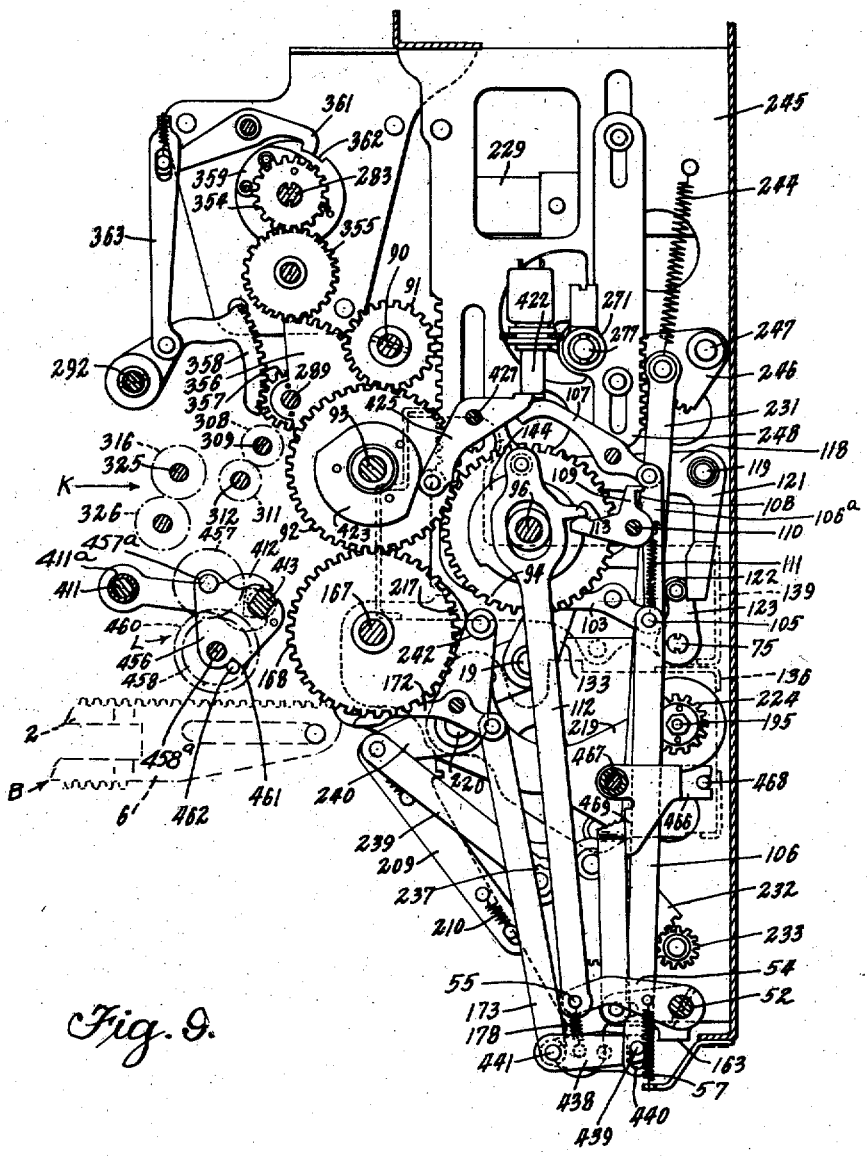
Figure 9 is a sectional elevation taken substantially on the line 9—9 of Figure 7.
Figure 10:
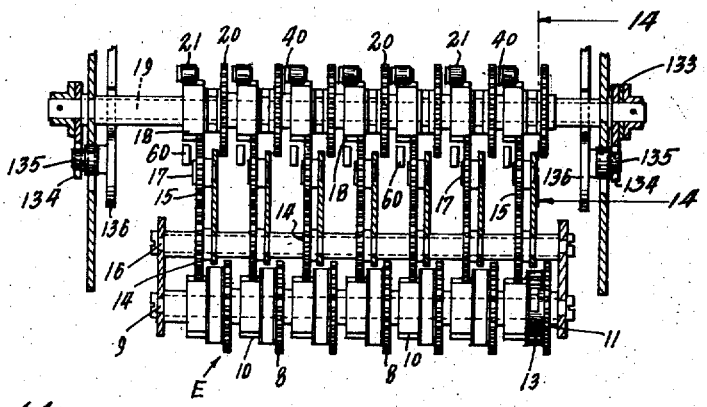
Figure 10 is a sectional plan view taken substantially on the line 10—10 of Figure 4.
Figure 11:
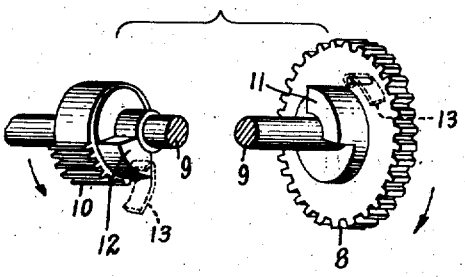
Figure 11 is a separated perspective illustrating the structural relationship of the mutilated pinion and associated gear embodied in the structure illustrated in Figure 10.
Figure 12:
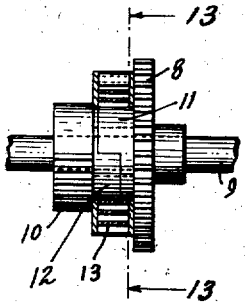
Figure 12 is an assembled elevation of the structure as illustrated in Figure 11.
Figure 13:
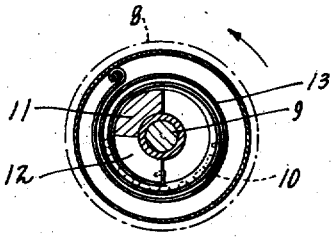
Figure 13 is a sectional view taken substantially on the line 13—13 of Figure 12.
Figure 14:
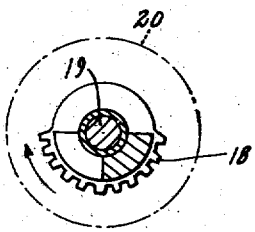
Figure 14 is a view taken substantially on the line 14—14 of Figure 10 and illustrates the stop gear arrangement of the multiplying unit.
Figure 15:
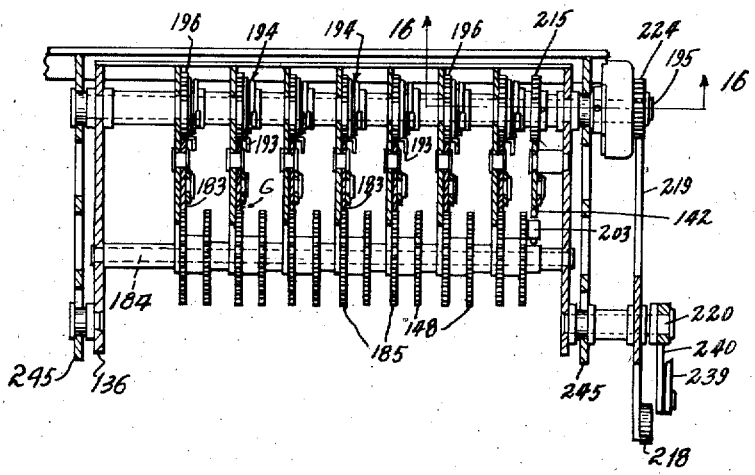
Figure 15 is a sectional plan view taken substantially on the line 15—15 of Figure 4.
Figure 18:
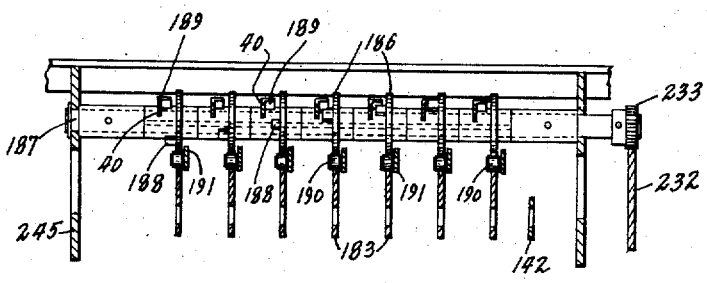
Figure 18 is a sectional plan view taken substantially on the line 18—18 of Figure 4.

The denominational distributor is shown in Figures 4, 6, 9 and 47. Figure 4 shows a vertical section through the mechanism, and Figure 6 a section at a right angle thereto. Figures 6 and 9 show how the movable part of the distributor, i. e., brush frame 229, is mounted in slots in the side frames 245; and Figure 47 shows the mechanism for moving the brush frame 229.

The stationary part of the distributor mechanism is mounted in the frame 249, which is formed so as to enclose four sides of the mechanism, and to leave the top and bottom open. Fastened to the frame 249, across the top and bottom, are guide channels 507. In these channels are fitted spacers 508 which are of insulating material, and which are notched to permit the passage of the wires 269, and to space them evenly. The wires 269 are laid through these notches in a diagonal pattern as shown in Figure 6. Figure 6 is a section through the distributor mechanism in which all of the brushes 230 have a digital value of two when electrically alive; and consequently in which each diagonal wire 269 is connected to a solenoid 344 having a digital value of two. If a section were taken to the right of this section 6 (i. e., to the right as shown in Figure 4), all of the brushes 230 and the diagonal wires 269 would have a digital value of three, and so on. There are nine sections of the frame 249 in which the wires 269 are arranged exactly as shown in Figure 6. In each of these sections there are dummy wires 269 which are not connected to any solenoid. (Four of these are shown in Figure 6.) These dummy wires 269 serve only as supports and guides for the brushes 270 which are mounted on the movable frame 229.

The movable brush frame 229 is mounted in slots in the side frames 245 (Figures 6, 9, 47 and 51). On each side of the brush frame is a plate 274 which bears rollers which slide in these slots. Also riding on these rollers is a slotted member 248. Pivotally mounted on this member 248 is a member 271 having an outward extension 277 for adjusting it as described later. Member 271 carries a crank piece on which is borne a pin 272 which rides in slot 273 of the plate 274. As shown in Figures 9 and 51, the plate 274 is on the inside of frame 245 and the member 248 on the outside, the frame 245 being cut away to permit the pin 272 to engage the slot 273 and to permit the movement and the adjustment to be described later.

There is also mounted on frame 229 a plate 509 (Figure 4) carrying rolls 510 which ride against guide bars 511 and serve to assist in aligning the brush frame 229 as it moves.

As has been said, potentially the product of multiplication is set up on the brushes 230, there being potentially a live brush to represent each digit of the product. The current, however, is transmitted to the accumulator control mechanism through the brushes 270 which are mounted on the frame 229 and which, when the frame 229 moves in the manner hereafter described, slide with relation to the brushes 230 to maintain contact therewith as the brushes 230 remain stationary.

The position of advancement of the frame 229 determines the diagonal wires 269 with which the brushes 270 will make electrical contact. In Figure 6, the parts are illustrated in the position with the decimal control means set to provide for a hundredths multiplication, i. e., by any number which has two decimals, as .01, 1.01, etc. The position of the third brush 270 with respect to the wires 269 represents the hundredths position in the accumulator control J and the positions of the two brushes to the right thereof represent the thousandths and ten-thousandths positions in the accumulator control J. If the keyboard is actuated to indicate .01 as a multiplicand and then again to indicate .01 as a multiplier, the brushes 270 will remain in the initial setting shown in Figure 6 and the current will flow through the extreme right-hand wire 269 to the extreme right-hand bank of the accumulator control J, which bank represents .0001 the decimally correct product.

In order to multiply any number by a unit, i. e., by 1, 2, 3, etc., the frame 229 would be advanced two positions. Supposing the same multiplicand .01 has been set as before and the second factor 1 is set thereafter. By means hereafter described, the entire brush frame 229 moves upward two diagonal wires and the right-hand brush 270 would in this advanced position be contacting the wire 269 which is the third from the right as viewed in the vertically extending portion of said wires in Figure 6. This wire leads to the hundredths bank in the accumulator control J to give the decimally correct product .01. Had the multiplicand been 1.01, the brush 270 representing 1 being also advanced from the third wire 269 to the fifth wire 269 (counting from the right), the product would be imparted to the accumulator control J as 1.01.

It will be recalled that there is one actuation of the multiplying unit and one operation of the multiplier brush assembly under control of the appropriate second factor setting rack for each digit of the second factor. For each of the above described operations there is also one setting of the denominational distributor brush frame 229 which is appropriate to the decimal position of the digit of the second factor which is then in control.

It has previously been described how the multiplier brush frame 139 is moved upward and downward for each digit of the second factor by the selective engagement of the driving clutches 194 with the gears 196 (Figures 6 and 56). It was also described how this selective engagement was controlled by the position in which the shaft 187 (Figure 47) was stopped by the operation stop 188 of disc 186 engaging the tip 189 of lever 40 (Figure 49). The shaft 187 and the related mechanism also controls the positioning of the denominational brush frame 229. Referring to Figure 47, let us suppose that the pinion 18 representing the unit digit 5 has been set and that no pinions 18 to the right thereof have been set. As previously described, the revolution of shaft 167 will cause roller 242 to move radially inward under the influence of spring 244, thus rotating shaft 187. Shaft 187, however, also as previously described, can only rotate until the operation stop 188 of the units disc 186 meets the tip 189 of the lever 40 associated with the pinion 18 of the units bank; that is, it will rotate from the first or initial position to the third position, a distance of two spaces. The link 231 which is thus moving is pivotally mounted on a gear segment 246 which is in turn pivotally mounted on pin 247 carried on side frame 245. Gear segment 246 is in mesh with the slotted member 248.

It has previously been explained how member 248 is connected to the denominational brush frame 229 through pin 272 and how frame 229 is slidably mounted to permit movement. It therefore follows that the movement of shaft 187 of two spaces will cause a movement of the denominational brush frame 229 of two spaces, that is, from the initial position representing multiplication by .01 to the position representing multiplication by 1. The link 239 is connected to gear segment 232 by means of an eccentric adjustable connector 237 operative in connection with screw 238. There are similar adjustable connectors 235 and 236 between gear segment 232 and link 231. These adjustable members assist in securing the exact relationship between the parts which is required for operability.

Returning now to our illustration of multiplication by five in the units place: After the denominational brush frame 229 has been advanced two spaces as just described, the multiplier brush frame 139 will be advanced five spaces where it will remain until after the right-hand and left-hand component of the partial product have been delivered to the accumulator control J when it will return to its initial position. How multiplier brush frame 139 is operated has already been described. How the current is transmitted through the brushes will be described later, and also the cam timing sequence, which causes each element to move at the proper time.

Referring now to Figure 47, it will be recalled that shaft 167 is rotating during the above-described operation. As it completes its cycle of rotation, cam 243 will push roller 242 radially outward, pull link 231 downward, and return the denominational brush frame 229 to the initial position. It will thus be seen that the operation of the denominational distributor is selective, not progressive, that is, it is not displaced step by step as the multiplication proceeds, as is common with most multiplying machines, but after each digital value is introduced, returns to the original position.

Normally the keyboard of an adding machine, or an accounting machine of the type illustrated herein, has provision for two digits to the right of the decimal point. It is frequently desirable, however, to multiply by factors which have more digits to the right of the decimal point than is provided by such a keyboard. This may be done without any change in the keyboard merely by adjusting the initial position of the brush frame 229 with respect to the wires 269.

The means provided for adjusting the denominational distributor frame 229 so as to enable multiplication by a factor carrying greater than two decimal places is the member 271 (Figures 47 and 51) and may be any other means for varying the relative position of the frame 229 with respect to the rack 248. For example, as heretofore set forth, the multiplying unit is normally set for multiplication by a multiplier containing two digits to the right of the decimal point, as, for instance, a multiplier like 24.25. However, it may, for example, be desired to multiply by multipliers having up to six digits to the right of the decimal point, as, for instance, by multipliers like 1.007, 1.0573 or 1.000136. For this purpose the initial adjustment may be appropriately varied by turning the member 271 so as to retard the brushes 270 four spaces with respect to the wires 269 which will automatically throw the product into the accumulator four spaces to the right, i. e., will increase the maximum decimal capacity as regards one factor from two decimals to six decimals. The product will then come in its correct decimal position in the accumulator control J. The capacity of this latter element will not, however, be increased.

In this disclosure the increase in the decimal capacity of the keyboard as illustrated above is accomplished by rotating about its own axis the member 271 (Figure 51) which is carried by the rack 248. This rotation shifts the frame 229 with respect to the rack 248. The member 271 carries a crank pin 272 which is engaged in a slot 273 of an extension 274 of the frame 229. The member 271 is provided with spaced recesses 275 adapted to be engaged by a spring-pressed stop 276 to determine its position of adjustment. The member 271 is provided with an outward extension 277 which may be suitably linked with a control knob on the outside of the multiplying unit and may be manually adjusted as desired.

This adjustment of the decimal point is extremely important where the product is to be printed. The adjustment described above will permit the pre-setting of the denominational distributor so as to provide for the calculation of a particular problem or set of problems. Let us suppose, for instance, that it is desired to multiply dollars and cents by a six place decimal, for instance, .004166, and yet have the answer print as dollars and cents, such calculations being very common. If we lower the initial setting of denominational brush frame 227 four spaces, we will move the initial setting of the decimal point four spaces to the right as respects the accumulator control. However, setting one factor four places to the left as respects the keyboard will compensate for this displacement and the product will, as before, be printed in dollars and cents. .004166 would therefore be set on the keyboard as if it were 41.66. This is very important where it is required to accumulate dollars and cents as required in interest and dividend calculations and in price extensions. It is also possible by lowering the initial setting of the denominational distributor three places to set each factor on the keyboard as five places and read the printed answer to five places. This is equivalent to changing the machine from a constant two decimal machine to a constant five decimal machine. A variety of adjustments are possible, the nature and effect of which will be apparent to any one skilled in the use of figures.

*The accumulator control and the product accumulator*

The accumulator control mechanism J, as has been heretofore explained in part, includes nine electro-magnets which provide stops positioned determinative of the digit of the partial product which they are to indicate. Each of the solenoids which make up the accumulator control is provided with armature stops 278 which are representative of the digits 0, 1, 2, 3, 4, 5, 6, 7, 8, and a fixed stop 279 is representative of the digit 9.

The armature stop 278a of the zero coil (Figure 4) is normally in the path of the arm 280 and the other armature stops are not. The zero coil is in series with each of the other coils of each of the solenoid units representative of 1 to 8 so that it will be energized when any coil of the solenoids from 1 to 8 is energized. When a number 9 contact is energized, only the zero coil will receive current. Thus when a bank is not operating, the position of the zero armature stop 278a will prevent motion of the arm 280, but when it is operating, it will permit motion of the arm 280 to the first armature stop set other than zero or to the fixed stop 279.

The rotation of the arm 280 is arrested by the projection of a stop tip 281 of any one of the armatures 278 that is energized. This stopping of the arm 280 arrests the arm in a position indicative of the digital value of the partial product electrically transmitted to the particular solenoid unit of the accumulator control J. The arm 280 is operatively connected to the product accumulator K to transmit this digital value as determined by its rotation to the accumulator mechanism as will hereinafter be described.

Figure 58:
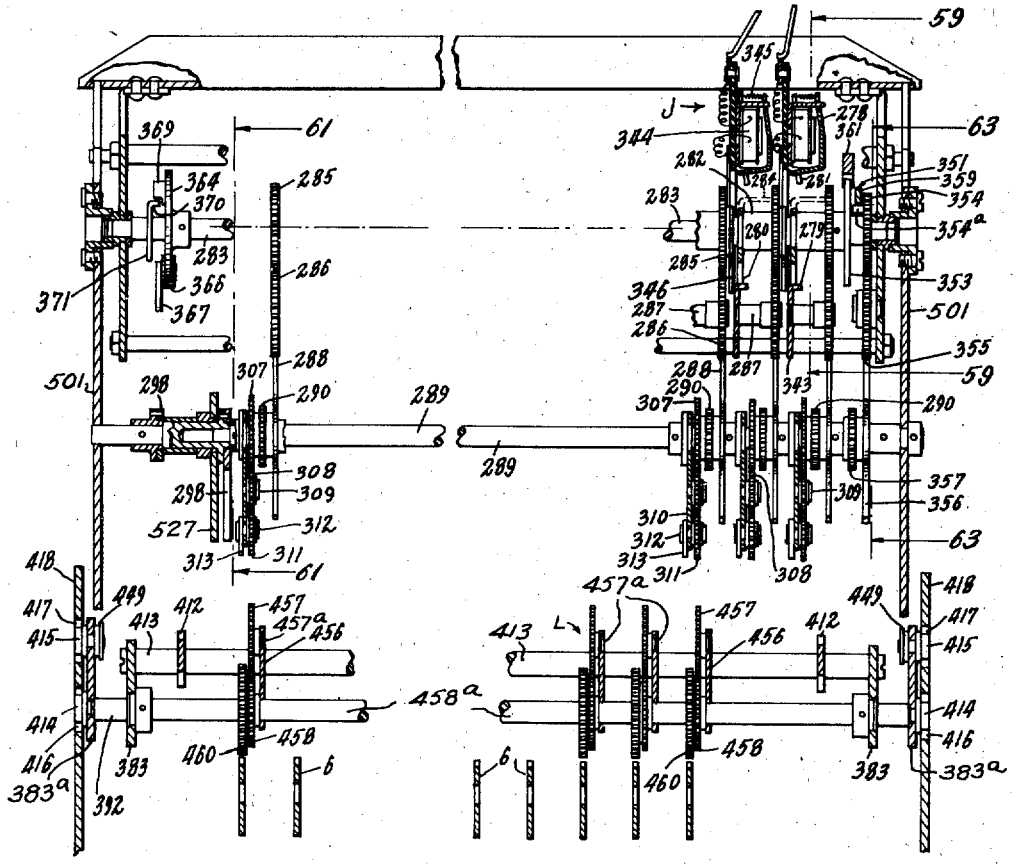
Figure 58 is a fragmentary transverse section taken substantially on the line 58—58 of Figure 4 from which certain parts have been removed for the purposes of clarity of illustration.
Figure 60:
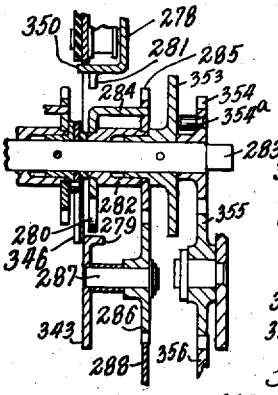
Figure 60 is a fragmentary vertical section on an enlarged scale through the solenoid unit taken substantially on the line 60—60 of Figure 59.
Figure 65:
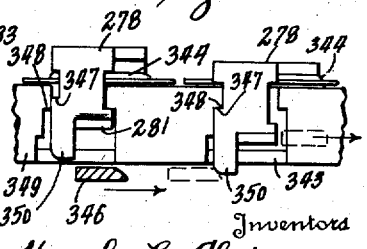
Figure 65 is a developed view in elevation of the solenoid armatures illustrating the means of latching the armatures when actuated and illustrating the release of the armatures by the restoring arm mechanism.

The arms 280 are mounted on sleeves 282 carried on the shaft 283. The arms 280 are provided with engaging sections 284 (Figure 60) which serve to fasten them to the gears 285 which are also mounted on the sleeves 282. The gear 285 of each bank meshes with an idler gear 286 which is journaled on a pin 287 carried by the supporting frame 343 of each solenoid assembly of the accumulator control J. The idler gears 286 in turn mesh with gear segments 288 which are journaled on a shaft 289 (Figures 4 and 58).

Secured to each gear segment 288 is a pinion 290, which is in mesh with gear segments 291. Gear segments 291 are journaled on a shaft 292 and are normally urged to drive the pinion 290 through the influence of the spring 293 interposed between the arms 294 of said segments 291 and lever arms 295 which are secured to the shaft 292.

The shaft 292 is driven by the cam pair 296 and 297 secured to the cam shaft 88 (Figures 7, 8, 61 and 62).

A compound lever 298 which is pivotally mounted on frames 501 and 527 (Figures 7 and 62) carries a pair of cam rollers 299 and 300, which cam rollers 299 and 300 are held in engagement with the cams 297 and 296, respectively. The cams 296 and 297 are the reverse of each other; that is, as cam 297 pushes radially outward on roller 299, cam 296 moves to permit roller 300 to move radially inward, then as cam 296 pushes the roller 300 radially outward, the cam 297 permits roller 299 to move radially inward. The cams have two "peaks" and two "valleys," one "peak" and its corresponding "valley" being considerably longer than the other. This construction provides for a dwell while the brush frames 139 and 229 are being set during which no motion will be imparted to the compound lever 298. Then a double oscillatory motion with a short dwell between the two movements will be imparted and the compound lever 298 returned to its initial position. This double oscillatory motion will be imparted to a shaft 292 through lever arm 302, slotted link 30, and pin 303. An eccentric adjustment 305 and 306 has been provided between the compound lever 298 and link 301 and the cam 296 has been cut away slightly for easier operation during the dwell periods.

As shaft 292 oscillates, it pulls spring 293 and through the train of gear segments and gears previously described, tends to rotate gears 285 and arms 280 fastened thereto through two forward and reverse revolutions. However, since the arms 280 are spring-driven, the motion of any arm 280 may be stopped by one of its associated armature stops 281 if such stop is in position to do so. In this manner a double actuation is imparted to the product accumulator as is required to accumulate right-hand components and left-hand components of partial products.

Figure 67:
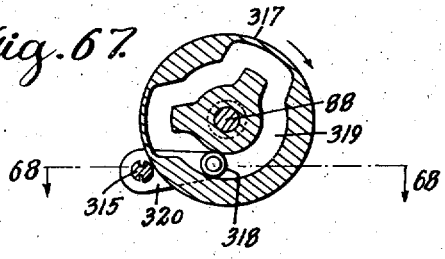
Figure 67 is a sectional detail of the cam mechanism of the means for shifting the gears interposed between the accumulator control means and the accumulator.
Figure 62:
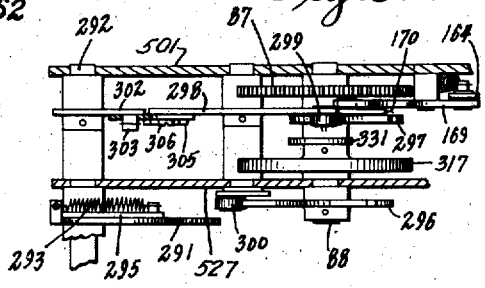
Figure 62 is a plan section taken substantially on the line 62—62 of Figure 61.

Means are provided for translating the digital value of rotation of pinion segments 288 to the accumulator or product accumulator K, which means includes a pinion 307 which is rigidly affixed to the pinion 290 and the gear segment 288 and is journaled on the shaft 289 (Figure 58). The pinion 307 is in mesh with a pinion 308 journaled on a pin 309, which pin is supported by an extension frame member 310 (Figure 58). The pinion 308 meshes with a pinion 311, which pinion 311 is journaled on a pin 312. The pin 312 is also carried by the frame 310. A link 313 is carried on the pin 312 and is in turn pivotally connected with an arm 314. The arm 314 is secured to a shaft 315 in order, as motion is imparted to the shaft 315, to thrust the pinion 311 into mesh with the counter pinion 316 so that the rotation of the gear segment 288 will be transmitted to the pinion 316. The shaft 315 is rotated from the counter control cam shaft 88 through the medium of the cam 317 (Figure 67) operating in conjunction with a confined cam roller 318 mounted to rotate in a cam track 319. The roller 318 is carried on the end of a crank arm 320 secured to the shaft 315 (Figure 67).

Also secured on shaft 315 are spring members 321 which engage gear segments 288, to retain them in the zero position and to assist in alignments at the time pinions 311 mesh with counter pinions 316 by taking up the back lash in the gear train. The cam timing is such that the engagement of pinions 316 with pinions 311 take place during the dwell periods of cams 296 and 297, i. e., while the gear segments 288 are stationary.

As has been stated, in each cycle of operation corresponding to multiplication of any multiplicand by one digit of the multiplier there is a subcycle for introduction of the right-hand components of the partial product and another subcycle for introduction of the left-hand components of partial products. The accumulator control mechanism as above described must operate and restore itself to normal twice during each digital multiplying cycle.

The electrical impulses imparted from the electrical multiplying member to the solenoids of the accumulator control J are transmitted through the medium of the switches 257 and 258 alternately, first to introduce the right-hand component and then the left-hand component. These switches are illustrated in Figures 7, 71, 72, 73 and 74 and may be of any type which connects a feed line 259 alternately with two sets of leads so that only one of the two sets can carry current at any one time.

In the switch 257 the common lead 259 terminates in the switch blade 328. There is one switch blade 329 (Figure 73) for each feed plate 252 within the capacity of the machine. Plate 252 is the feed plate from which current for the right-hand component is drawn, as previously described. Journaled on shaft 90 is yoke 332 from which projects an arm 327 carrying a cylindrical copper circuit closer 525 with a suitable insulating lining. The yoke 332 also has an arm with a tip 334 adapted to engage pin 333 which is borne on cam 331. As cam 331 rotates, pin 333 will engage tip 334, thrusting the circuit closer 525 against the inner row of switch blades 329. This thrusts the latter against the outer row of switch blades 329, and against switch blade 328, which is also in the outer row. Thus all the blades are interconnected and current flows from the source to all of the feed plates 252. As cam 331 continues to rotate, the pressure is relieved and spring 330 rotates yoke 332 in a counterclockwise direction and opens all the circuits. This momentary closure is sufficient to actuate the armature stops 281 and latch them in position as hereafter explained. The switch 258 includes a yoke member 335 mounted on a pin 336 in the frame. It has an arm 342 with a tip 341 and another arm on which is mounted the circuit closure 338. The arrangement of the switch blades is the same as switch 257. It is operated by pin 339 on disc 340 and serves to connect the feed line 259 with all the feed plates 253 from which, as has been previously explained, is drawn the current for the left-hand components. The two switches close alternately as shown in the cam timing chart to be described later.

Figure 59:
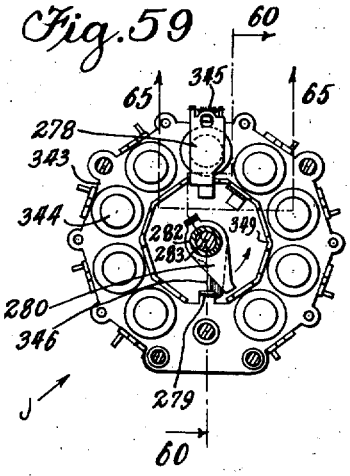
Figure 59 is a sectional elevation of a solenoid disc taken substantially on the line 59—59 of Figure 58.

The solenoid assembly units of the accumulator control J are each composed of plate elements 343 (Figure 59) of decagonal formation which carry the solenoid coils 344 operative to move the solenoid armatures 278 horizontally to project the armature stops 281 in and out of the path of the stop arm 280. The armatures 278 are normally urged out of stop-engaging position by means of springs 345.

Keyed on the shaft 283 are armature restoring arms 346 (Figures 60 and 61) which operate as a latch release mechanism to release the armature stops 281 which, when projected into the stop-engaging position, are latched in their projected positions. The latch means consists of latch shoulders 347 of the armatures 278 and companion latch shoulders 348 of an inwardly turned flange 349 of the decagonal frame plate 343.

The armature arm 278 has a projecting restoring section 350 which is engaged by the restoring arm 346 when the armature 278 is in latched position. The timing of this release is such that the release is effected only during the proper cycle of the operation and after the stop arm 280 has been restored to its initial position from its engagement with the particular armature stop 281 which is operating. In order to insure this operation, a safety means is provided. The stop arm 280 is returned when the gear segment 291 is moved back by the action of the cams 296 and 297 on the shaft 88, thereby reversing the direction of rotation of the gear segment 288 and the direction of rotation of the idler 286 and the gear 285 on the shaft 283. The restoring arm 346 is secured to the shaft 283 which is releasably clutched to its driving means through the medium of a clutch mechanism 351 (Figure 63) normally held in engagement by means of a spring 352.

Figure 63:
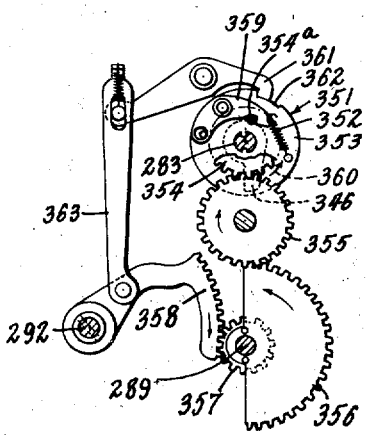
Figure 63 is a fragmentary elevation of the restoring arm operating mechanism.
Figure 68:
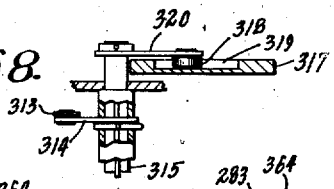
Figure 68 is a plan section taken substantially on the line 68—68 of Figure 67.
Figure 66:
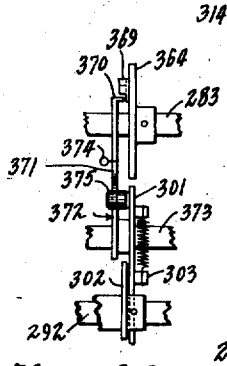
Figure 66 is a fragmentary elevation of the elements illustrated in Figure 64 but illustrating the parts in the position of Figure 61.

The clutch 351 includes a clutch plate 353 which is keyed to the shaft 283. A gear 354 is journaled on the shaft 283 and carries the clutch pin 354a adapted to be engaged by the clutch member 359 carried by the plate 353. As the shaft 292 is rotated during its forward operation to move the stop arms 280 into engagement with the selected stops 281, it also rotates gear 354 (Figure 63) through sector 358, gear 357, segment 356 and idler 355, in the direction of the arrow 360. This results in the pin 354a riding under the clutch member 359, releasing the engagement between the clutch plate 353 and the gear 354 so that no drive is imparted by this mechanism to the shaft 283. On the return drive, however, the gear segment 358 rotates the gear segment 356 in the opposite direction, at which time the pin 354a engages the clutch member 359 with the result that the restoring arm 346 is driven in a direction opposite from that indicated by the arrow 360 or in a direction to release the latched armature stops. Before this operation can occur, a holding pawl 361 is released from its holding notch 362 in the plate 353. This is accomplished through the link 363 connected between the pawl 361 and the arm of the gear segment 358. This pawl 361 is released slightly before the completion of the downward movement of the gear segment 358 from its position as indicated in Figure 63.

A safety means is provided for insuring the proper timing of this restoring operation, which safety means includes a control disc 364 (Figures 60 and 64) pinned to the shaft 283. This disc 364 is provided with a recess 365 normally engaged by a roller 366 carried by a bell crank 367. A spring 368 urges the roller 366 into the recess 365 and the function of this assembly is to insure that the shaft 283 is always returned to an initial starting position.

Figure 61:
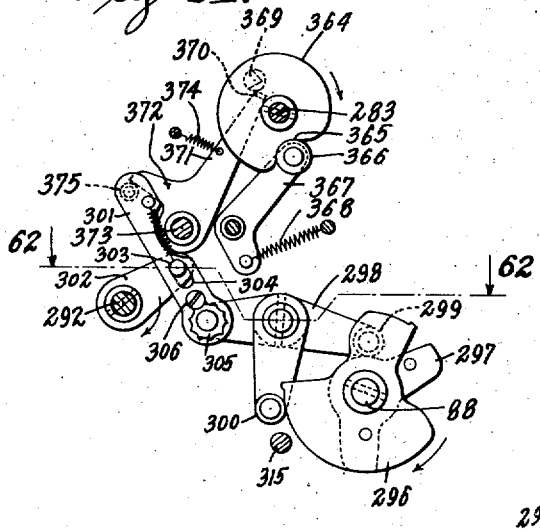
Figure 61 is a detached elevation partly in section of the accumulator control operating mechanism taken substantially on the line 61—61 of Figure 58.
Figure 64:
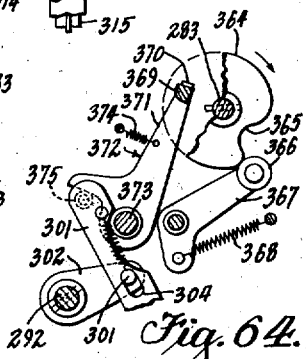
Figure 64 is a further fragmentary elevation of the accumulator operating mechanism and safety mechanism for the restoring arm similar to Figure 61 illustrating particularly the respective elements of the restoring arm safety mechanism illustrating the same in engaging position.
Figure 69:
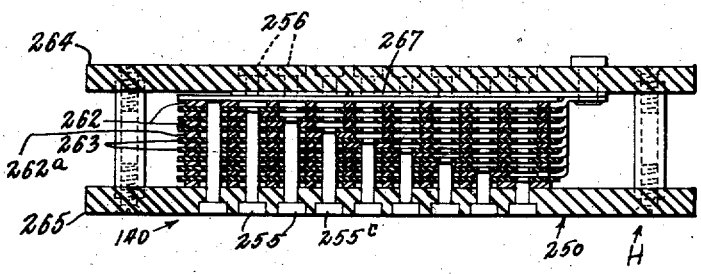
Figure 69 is a section through one of the multiplier circuit units taken substantially on the line 69—69 of Figure 4.

The disc 364 carries a flattened pin 369 which is adapted to engage the bent end 370 of the arm 371 of a bell crank 372. The bell crank 372 is journaled on a pin 373. A spring 374 normally urges the arm 371 into the path of the flattened pin 369 but the position of the arm 371 is in turn controlled by a roller 375 carried by the link 301 (Figures 61 and 64). This safety means is provided to insure that the stop arm 280 has returned to its normal position behind the zero solenoid stop 281 (i. e., 278a) before its associated restoring arm 346 which is following it releases the latch holding the zero solenoid stop 281. Should the restoring arm 346, for any reason, be so close to stop arm 280 as to make this possible the flattened pin 369 will engage the bent end 370 of the arm 371 delaying the rotation of the shaft 283 in the reverse or restoring direction a sufficient period of time to insure the movement of the arm 280 in advance of the restoring arm 346. After arm 280 has reached its initial position the link 302 carried by the shaft 292 operating through the link 301 and roller 375 rotates the bell crank lever 372 in a clockwise direction, moving the bent end 370 out of the path of the flattened pin 369, permitting the shaft 283 to complete its rotation under the influence of the spring-pressed centering arm 367.

This restoring operation is of course followed through twice for each multiplying cycle because, as was heretofore described, each solenoid unit of the accumulator control J must be susceptible of two operations for each multiplying cycle. Likewise it will be obvious that it is essential that the means operative to transmit the movement of the gear segment 288 (Figure 4) to the product accumulator K must have a two-cycle operation for each multiplying operation, which means that the pinion 311 must be twice thrust into position of engagement with the gear 316 and twice withdrawn during the restoring operation. This is accomplished by the double cam 317 carried on the shaft 88 which is operative to impart a double reciprocation to the shaft 315.

The right-hand component and left-hand component operations of the accumulator control J and the product accumulator K take place while the multiplier brush frame is in position for multiplication by the appropriate digit and while the denominational brush frame is in position for the appropriate denominational order. Thereafter, through means heretofore described, the multiplier brush frame 139 is restored to normal. Cam 243 (Figure 47) then resets the disc 186 and restores the decimal order brush frame 229 to its original position. As previously explained, the machine will now continue to function in this manner as long as any stop lever 40 is in operating position. When the last digit of the second factor has actuated the multiplying unit, the multiplication will be complete and the product will be on the product accumulator K.

In the foregoing we have carried the detailed description as far as the pinions 311 which operate the product accumulator K. These pinions 311 are engaged with product accumulator K and rotated an amount representative of the right-hand components of a partial product. They are then withdrawn and restored and thereafter reengaged and rotated an amount representative of the left-hand components of a partial product and again withdrawn and restored. All this has previously been explained. This differential movement of pinions 311 is of the same type as is normally used to operate an accumulator. Such structures are old in the art and our machine is not limited to any particular type of accumulator, the one selected being solely a matter of convenience and availability rather than a requirement of our machine.

The product accumulator selected for inclusion in the machine illustrated by this application is the one known commercially as the accumulator of the Marchant multiplying machine, Model D, sold during the year 1937. It is more particularly illustrated in Swiss Patent No. 183,500 issued to the Marchant Calculating Machine Company. This patent shows a carriage mechanism containing two accumulators. The one used in our machine is the upper accumulator. The upper and lower accumulators are mounted on common supports but these supports have been cut so as to leave the upper accumulator intact for operation in our machine. Comparison of that part of our Figure 4, which shows the accumulator K, with Figure 20 of the Swiss patent will indicate what has been eliminated by this process and what has been retained. This upper accumulator has a clearing lever attached to shaft 408. For this lever has been substituted our clearing lever 407. It also has a cover designed to hold the supporting members in place. This cover has been slotted as shown in Figure 4 to permit the engagement of gears 457 of the transfer assembly with the gears 326 of the accumulator as hereafter described. The accumulator thus obtained is a self-contained assembly usable for the accumulation of numbers and containing all the mechanism required to restore itself to a zero reading when the clearing arm 407 is actuated. This accumulator which we have referred to as the product accumulator K is mounted on the frames 501 by means of dowel screws which set the pinions 316 in proper alignment with the pinions 311 and the gears 326 in proper alignment with the gears 457 of the transfer assembly L.

As shown in the patent referred to, it is necessary for the operation of the accumulator, as above described, that the holding members 322 be released from engagement with the pinions 316 and that the rockers 324 be displaced in a counter-clockwise direction at the time of engagement of the pinions 311 with the pinions 316. This frees the accumulator mechanism so it may receive a numerical value from the pinions 311. Thereafter when the pinions 311 and the pinions 316 are in disengagement, the restoration of members 322 and 324 to their original position serves to bring the accumulator gears 326 into alignment so that they may represent the appropriate numerical value and serves to hold that value in the accumulator until other numerical values are added to it or until the accumulator is cleared. All this is well known in the art and is disclosed in the patent referred to. However, in the patent referred to, the accumulator is mounted so as to be movable into engagement with the pinion 311 and out again; whereas in our machine the accumulator is stationary and the pinions 311 are moved in and out of engagement with the accumulator. At the time pinions 311 are moved into engagement with the accumulator pinions 316, the lugs on the end of arms 310 press against the holding members 322 and the tips of these lugs press against the rocker 324 so as to free the accumulator to receive a numerical value as above described.

As has been explained, the numerical values delivered to the accumulator are the partial products and the accumulator accumulates these partial products to give the final product which is represented by the position of the gears 326.

*The transfer assembly and the clearing cycle*

In order that the product may be printed, it is necessary that it be transferred to the racks 2. Accumulators which serve the dual purpose of accumulation and of controlling the actuating racks to print totals are well known in the art. Had an accumulator of this type been employed, the product could be directly transferred to the racks 2. However, since the accumulator used was not designed for printing, an intermediate stage is required. The transfer assembly L fills this intermediate function.

Figure 85:
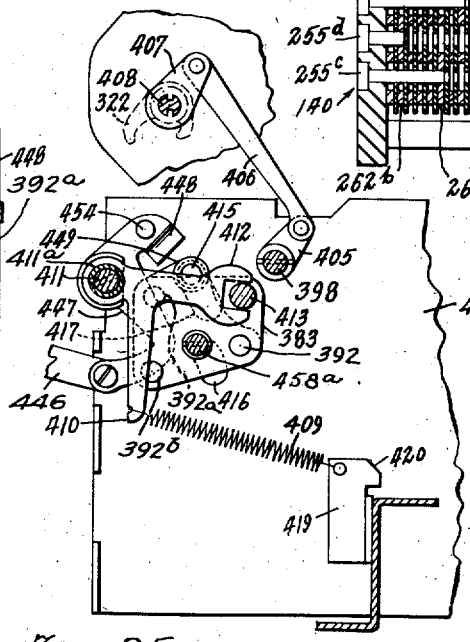
Figure 85 is a sectional end elevation taken substantially on the line 85—85 of Figure 84.

The transfer assembly L (Figures 4, 58, 79, 84 and 85) is mounted on end plates 383*a*. These carry rolls 414 and 415 which ride in slots 416 and 417 in the frames 418. Mounted on end plates 383*a* on studs 392, 392*a* and 392*b* (Figures 39 and 85) are plates 383 which support the shafts 458*a* and 413. Shaft 458*a* is on the same center line as rollers 414. Mounted on the shafts 458*a* and 413 are the spaced plates 456 which carry gears 457 on studs 457*a*, these studs being on the same center line as the rollers 415. Journaled on the shaft 458*a* are the gears 458 and 460. The gears 457 and 458 are in mesh, and gear 460 is fastened to gear 458. Gears 458 carry a pin 462 (Figure 9) which is adapted to contact a shoulder 461 of plates 456 when the transfer assembly has a zero reading. Associated with gears 458 are spring-pressed aligning pawls 459 (Figure 4).

A means is provided for moving the transfer assembly so that the gears 457 mesh with the gears 326 of the product accumulator to receive the product therefrom and for thereafter moving the transfer assembly so that the gears 460 mesh with the extensions 6 of the racks 2 so as to deliver the product to them for printing. This is done automatically as soon as the final product has been accumulated on the product accumulator by the following mechanism:

Near the end of each cycle the switch release arm 36 (Figures 23 and 24) is actuated by the roll 36a on the gear 87 placing latch dog 34 of switch release arm 36 in position to engage the notch 35. When, under the above condition, the yoke 44 is free, as in the case where the multiplication is complete, the spring 36b tends to restore the links 31 and 47 and associated mechanism to the shut-off condition shown in Figure 23. However, the latch arm 48 as it rotates toward the shut-off position hits the tip pin 159a of the trigger latch member 159 releasing the previously set trigger latch 153 (Figures 40 and 79) to control and start the clearing cycle as hereinafter described. The trigger member 159 releases latch 153 which releases the lever 155 for counterclockwise movement under the influence of the spring 379.

The forward end of the lever 155 is pivotally connected with a link 380 which link 380 has also an extension 381 adapted to engage the pin 382 carried at the forward end of the link 29.

Figure 79:
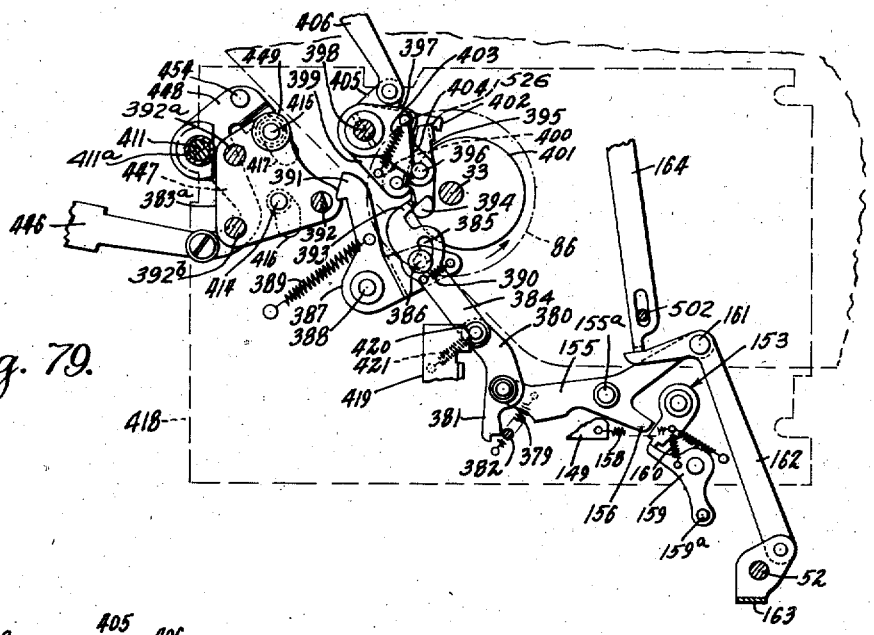
Figure 79 is a detail elevation illustrating the mechanism of Figure 39, i. e., the control links between the accounting machine and the multiplying unit and illustrating the control links in position at the start of the final or clearing cycle.
Figure 81:
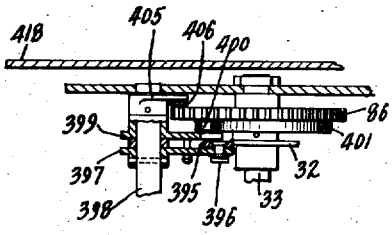
Figure 81 is a sectional plan view of the product accumulator clearing means and is taken substantially on the line 81—81 of Figure 39.
Figure 82:
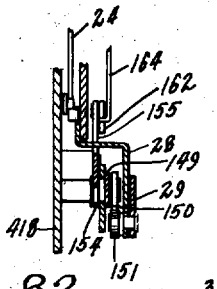
Figure 82 is a sectional elevation of a portion of the control mechanism and is taken substantially on the line 82—82 of Figure 39.
Figure 83:
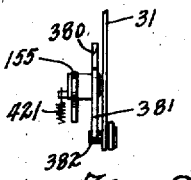
Figure 83 is a fragmentary section taken substantially on the line 83—83 of Figure 80.
Figure 80:
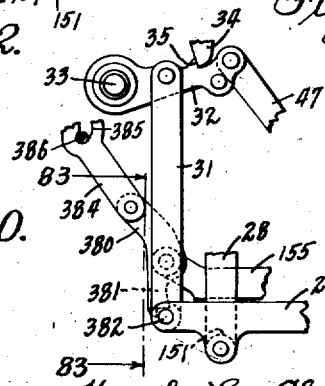
Figure 80 is detail elevation illustrating the relationship of the main switch tripping mechanism to the mechanism of Figure 79.

After actuating pin 382, extension 381 rotates away from it as illustrated in Figure 79, due to cam 419. The pin 382 forms the pivotal connection of link 29 with the connecting link 31. Thus a downward impulse is imposed on the forward end on the link 29 which, operating through the link 31, rotates the switch latch 32 away from the tip 34 of the switch arm 36 and again permits the completion of the electrical circuit to the operating motor 39 which will make one complete operating cycle and then automatically shut off. It should be remembered that the relationship of the switch latch 32 and the switch arm 36 is such that the motor tends to shut off at the end of one cycle. This final cycle is the clearing cycle.

Movement of the member 155 (Figures 39, 40, and 41) also acts to impart an upward force to the control link 162 and to impart an upward force to the clutch control link 164 to declutch the cam shaft 88. Operating from the link 162, the yoke 163 is now given a counterclockwise rotation which, through the link 176 and yoke 163, operates through the crank piece 181 to impart a downward movement to the rod 179 which exerts a downward pull upon the link 173 to move the disabling pawl 172 into position to declutch the cam shaft 167 from the gear 168.

At the time the second factor is set, the control link 147 is operated, as has already been explained. This actuation also sets the spring-loaded clearing and transfer assembly control mechanism which has remained in the inoperative condition illustrated in Figure 39 during the multiplicand cycle. After the actuation of link 147 this control mechanism assumes the "set" position illustrated in Figure 40. It remains in this position until the end of the multiplication when the trigger 159 is released to start the clearing cycle, as has just been explained. The control mechanism then assumes the position illustrated in Figure 79.

The lever 155 is connected through the link 380 with a link 384, which link 384 has an arcuate slot 385 in which a pin 386 is mounted. The pin 386 is carried by one arm of a bell crank hook member 387 pivoted on a pin 388. A spring 389 normally urges the bell crank lever in a counterclockwise direction and a spring 390 connected between the link 384 and the opposite arm of the bell crank lever 387 normally urges the link 384 in a clockwise direction.

As will be seen in Figures 39, 40 and 79, when the double trigger latch 153 is set, the hook 393 of the link 384 is engaged (Figure 40) with the projection 394 of a latch link 395. The latch link 395 is pivoted on a pin 396. There is a bent tip or lug 526 on latch link 395 which serves to engage latch lug 402 under the conditions hereafter described. The change in the position of link 384 from the position illustrated in Figure 39 to that illustrated in Figure 40 has resulted from the upward force transmitted from the lever 155 to push the link 384 upwardly permitting the link to ride on the pin 386 until the pin 386 is at the bottom of the arcuate slot 385.

The pin 396 is carried by a crank arm 397 which is secured to product accumulator clearing shaft 398. Journaled on the shaft 398 is an arm 399, the outer end of which is provided with a cam roller 400. This cam roller 400 rides on the cam 401 carried by the shaft 33. The bent tip 526 of latch member 395 being out of engagement with the corresponding latch lug 402 of the member 399 permits the roller 400 to ride over the surface of the cam 401 without imparting any motion to the product accumulator clearing shaft 398. Thus throughout the multiplicand and multiplier cycles as the shaft 33 is rotated, no impulse is imparted to the clearing shaft 398. However, at the end of the multiplier cycles when an impulse as heretofore described is imparted to the lever 155 to rotate the same counterclockwise, the downward impulse imparted through the links 380 and 384 moves the link 384 into the latched position as shown in Figure 79.

Means are provided for maintaining a balance between the members 399 and 397 and for urging the bent tip 526 of latch member 395 out of engagement with the latch end 402 after the clearing operation is complete. Thus a spring 403 is connected between the arms 397 and 399 which normally urges these arms toward each other but yieldably permits the same to move away from each other except when the bent tip 526 of the latch member 395 engages the latch end 402. This latch end is moved into this position under the downward pull imparted to the member 384 at the end of the multiplier cycle by the further impulse imparted to the member 155 at this time as heretofore described. Thus the latch member 395 is swung in a counterclockwise direction against the urge of the spring 404 which is interposed between the member 397 and a stop lug or bent tip 526 carried by the member 395. With these members latched together, they must move as a unit under the influence of the cam 401 against the roller 400, thereby at this part of the cycle imparting movement to the shaft 398 and hence through the crank arm 405 carried thereby to the product accumulator clearing link 406. The product accumulator clearing link 406 is connected to an arm 407 secured to the shaft 408, and since arm 407 is the clearing arm of the product accumulator as heretofore explained, its actuation will clear the accumulated product from the product accumulator K into the transfer assembly L when the transfer accumulator is moved into engagement with the product accumulator as hereafter described.

At the same time as the latch member 395 is moved to engagement with the latch end 402 through the downward impulse imparted to the link 384 the pin 386 is also pulled downwardly to rotate the bell crank member 387 in a clockwise direction moving the hook end 391 away from the pin 392 permitting a spring 409 (Figure 85) connected with a bell crank lever 410 to shift the transfer assembly L into engagement with the product accumulator. The bell crank lever 410 is connected to the transfer assembly by means of its forked ends 412 engaging over a shaft 413 which is carried on the transfer assembly end plates 383. Transfer assembly L is yieldably held in position on rollers 414 and 415 which engage within slots 416 and 417 respectively of an auxiliary frame 418, as has been explained.

The movement of the release of the latch provided between the members 391 and 392 as hereinabove described permits the transfer assembly to be moved into engagement with the product accumulator gear 326 so that as the product accumulator is cleared through the action of the levers 405, 406 and 417 operating through the cam 401 and the roller 400, the accumulated total product is transferred to the transfer assembly L. In the operation of this linkage there is provided also a guide member 419 which has a slide face 420 adapted to engage the pivot connecting the links 380 and 384 to rotate the link 380 so as to release its lower tip 381 from the pin 382 after the switch release has been tripped, as previously explained.

A spring 421 is interposed between the plate 419 and this pivot in order to maintain a yieldable contact at this point.

The product accumulator having been cleared and the product placed in the transfer assembly, there now remains to complete the cycle only the necessary operation to restore the linkages operative during the multiplier cycles to their normal position.

During the clearing cycle just described, the gear 94 (Figure 30) has made one complete revolution. As explained, the member 155, when released by the double trigger latch 153, moves the yoke 163 counterclockwise (Figures 40, 43 and 79). This movement of the yoke 163 actuates the restoring controls in the multiplying unit and operates the link 106 (Figures 30, 31 and 43) which has a notch 463 into which the pin 436 carried by the link 432 moves under the action of spring 464 when the locking member 465 is in position to permit it, which is normally the case. The pin 436 is initially held out of the notch 463 by a lever arm 466 which is designed to move in a counterclockwise direction around a pivot 467 carried by the main frame of the multiplying unit.

The member 466 engages over a pin 468 carried by the frame 136 of the multiplier rack assembly. The lever 466, through its tail piece 469, will hold the pin 436 out of the notch 463 while the multiplicand is being set because the frame 136 is in its initial or lower position. During this cycle the link 106 will be moved in an upward direction permitting a one-half revolution of the cam shaft 96 which, as heretofore described, moves the multiplier rack frame 136 and the brush assembly to a position of alignment with the first row of contacts 140 of the multiplier.

This movement of the frame 136, acting through the pin 468, rotates the lever 466 and permits the pin 436 to press against the link 106 but not to enter the notch 463 as this has moved upward to a position to prevent entry of the pin 436. This upward movement of link 106 took place when the latch 48 was tripped at the beginning of the multiplicand cycle as previously explained and link 106 and the clutch release pawls 107 and 103 remain in the tripped position illustrated in Figure 31 throughout the multiplicand and multiplier cycles.

When the multiplier is set, the multiplier control link 147 actuates the multiplier control mechanism rotating the yoke 163 in a clockwise direction as heretofore explained. This action moves the pin 436 over the notch 463, and member 466 being rotated so as to permit it, the spring 464 causes the pin and notch to engage. The pin and notch will remain in engagement during the multiplier cycles.

It will be recalled that at the beginning of the clearing cycle the double trigger latch 159—153 was released rotating member 155 in a counterclockwise direction. This imparts through link 162 a similar counterclockwise movement to yoke 163. Yoke 163 is connected to link 432 through pin 436 which rides in a slot in said yoke (Figure 43). Inasmuch as pin 436 is now in notch 463, as has been explained, yoke 163 will impart a downward thrust to link 432 and link 106. This will swing the clutch disabling pawl 107 (Figure 31) out of engagement with the clutch pawl 97 and the clutch disabling pawl 103 in position to disable the clutch when the gear 94 completes its revolution. The gear 94 will drive the cam shaft 96 during the last half revolution at the end of which the latch 109 will lock the mechanism in the position illustrated in Figure 30 through the action of the spring 111. As has been explained, the first half revolution of cam shaft 96 took place during the multiplicand cycle.

During the last half revolution of the cam shaft 96, the cam 116 permits the frame 136 and with it the brush frame 139 to be moved to their initial position through the action of the springs 137 (Figure 34).

As there is provided on the cam 116 the concentric track portion 470, there is a period of dwell in the operation during which time the cam 115 (Figure 35) rotates the lever 125 and the shaft 127 and lever 128 in a clockwise direction, restoring the racks 71 (Figure 4) to their initial position where they are held by the latch members 73. The multiplying unit is now restored to its initial position ready for further operation.

*Printing and accumulating the product*

As the multiplying unit has now been cleared and the product set upon the transfer assembly, the next operation is to transfer the product from the transfer assembly back to the racks 2 and thereby to the printing segments and also to one of the accumulators of the accounting machine if it is desired to accumulate the products as is usually the case. The conclusion of this operation should restore all parts of both machines to their starting position so that the multiplying operation may be repeated.

During the multiplier and clearing cycles which are now completed, the carriage of the accounting machine has shifted to a position in alignment with the third tabulator stop 442.

Transferring the product to the record 443 is accomplished by actuating the totalizer key 445 of the accounting machine and then again pressing the motor bar 27, thus again setting in motion the accounting machine motor.

The totalizer key 445 is designed for taking the totals from an accumulator of the Ellis machine by controlling the actuation of link 446 (Figure 22). This link normally connected to an accumulator in the Ellis machine is now connected to lever 447 of the multiplying unit. This lever is fastened to sleeve 411a which is journaled on shaft 411 which is mounted on end plates 418. On this sleeve 411a are arms 448 adapted to contact rollers 449 which are borne on the same studs which carry rollers 415 in plates 383a of the transfer assembly. The totaling operation controlled by key 445 thus imparts a clockwise rotation to arms 448 which press on rollers 449 and shift the transfer assembly from engagement with the product accumulator into engagement with the extension 6 of the racks 2 in the same manner as would have been done for taking a total from the accumulator which has been removed.

As the transfer assembly is thus moved, it engages a hook 450, causes the same to move counter-clockwise under the action of a spring 451, holding the transfer assembly in engagement with the rack 2 until the product has been taken off. This holding action is accomplished by a notch 452 engaging the pin 392. Then as the link 446 restores the member 447, the hook 450 is cammed off and the transfer assembly is pulled out of engagement by means of springs 409 and held by the hook 391 which is pulled into engagement by spring 389. This camming action is performed by a pin 454 carried by the member 447 and engaging the cam end 455 of the hook 450.

The transfer assembly L normally occupies the position illustrated in Figure 39 and moves into the position of engagement with the product accumulator K (Figures 79 and 85) or into engagement with the racks 2 as just described.

As the racks 2 are operated by the accounting machine in the normal manner required for a totaling operation, the gears 460, and with them the gears 458, are rotated until the pins 462 engage the stop shoulders 461. This clears the transfer counter and through the motion of the racks 2 which control and operate the printing segments 3, prints the product through the normal manner of operation of the accounting machine.

The accounting machine accumulator 4 (Figure 3) may also be engaged with the racks 2 so that the product may be accumulated therein and later printed as the grand total of all of the product of a series of multiplications. As soon as the product has been printed, the accounting machine carriage will be released to return to the initial or multiplicand position and both the multiplying unit and the accounting machine will have completed their functions and will be ready for a subsequent multiplication.

Although a transfer assembly L as thus illustrated has been provided for coupling the product accumulator K with the racks 2 for cooperative action, it will be obvious that any other suitable type of accumulator other than the accumulator as illustrated might be employed and that an accumulator might be utilized for direct cooperation with the racks 2 permitting elimination of the transfer assembly.

*The safety interlock*

During the multiplying operation as performed by the multiplying unit, the accounting machine operating motor is interrupted in its operation after the operation of the racks 2 to set the multiplier in the multiplying unit and the operation of the accounting machine operating motor is maintained interrupted throughout the multiplier cycles. This is accomplished through the connections as specifically illustrated in Figures 43, 44, 45 and 46.

Illustrated at 422 is a switch connected to the accounting machine motor. This switch is operated from a cam 423 secured to the gear 92 carried on the stub shaft 93 of the multiplying unit gear train illustrated on the right side of Figure 7.

The switch 422 is of the same type as the switch 38 provided for the multiplier unit motor, i. e., the type normally urged to the closed position but which may be held opened against the yielding impulse tending to close the same. The cam 423 is so shaped that the switch 422 will be opened when the multiplying unit has completed approximately one-half its cycle, i. e., at the time when the accounting machine has set in the multiplying unit the multiplier factor and for approximately the time required for the multiplier unit to move the brushes 7 to the multiplying position. The cam 423 engages a cam roller 424 carried by the lever 425, which lever 425 has the switch engaging end 426. The lever 425 is pivoted on a pin 427 carried by the main frame. A latch means is provided for maintaining this switch open throughout the remainder of the multiplier and clearing cycles and includes a latch arm 428 which is pivoted on a pin 429. The latch member 428 has a latch end 430 adapted to fit over a latch projection 431 of the switch lever 425.

The latch lever 428 is yieldably connected to a link 432 by means of a pin 433 fitting in an elongated slot 434 and held in balanced position within the slot through the medium of a pair of opposed springs 435 which yieldably tend to maintain the pin 433 centrally of the slot 434.

The link 432 is in turn connected by means of a pin 436 to an extension 437 of the yoke 163 journaled on the shaft 52. The link 106, which actuates the clutch interrupter 103 of the multiplicand frame shifting clutch is supported by a lever 438 which is pivoted on the pin 441 in yoke 174. The lever 438 is connected to the link 106 through a pin 439 and slot 440. When the link 432 is freed by both the arm 466 and the control 465, the pin 436 may enter the notch 463 and does so when the yoke 163 is rotated at the beginning of the multiplier cycles. At the end of the multiplier cycles the yoke 163 is again rotated by the release of the member 155 to take the position shown in Figure 43. When the yoke 163 is in the position shown in Figure 40, the link 432 is in the raised position so that the spring 435 urges the lever 428 in a counter clockwise direction, and when the roll 424 is on the high part of cam 423, the lugs 430 and 431 engage. Continued rotation of the cam 423 therefore does not affect the position of the roll 424 and its associated arm 425 so that the switch 422 is held open until the end of the multiplier cycles. When the yoke 163 is rotated to the position shown in Figure 43, the spring 435 urges the lever 428 in a clockwise direction so that the lugs 430 and 431 disengage when the cam 423 again contacts the roll 424 during the clearing cycle. The parts are all restored to the positions shown in Figure 43 at the end of the clearing cycle.

*Multiplication by a constant factor*

An adjustment is provided by the locking member 465 which is provided with a rectangular latching member 471 having sides of unequal length, which sides engage the edge of the link 432.

The multiplicand is retained and used as a constant factor for each subsequent multiplication by manually rotating the member 465 to the position where its shorter side holds the link 432 so that the pin 436 can not enter the notch 463, which prevents the multiplicand clearing mechanism from operating due to the fact that the resetting mechanism for the multiplier racks will not be permitted to operate but will remain in their position ready to be multiplied by a subsequently applied multiplier. This is accomplished by preventing the clutch disabling member 107 from being swung out of the position shown in Figure 31. The cam shaft 96 is therefore held stationary and the brush frames and brushes are not restored.

*Chain multiplication*

Due to the fact that the multiplying unit is controlled by the racks 2 of the accounting machine, it is possible to reintroduce a product of a multiplication into the multiplying unit as a factor of a subsequent multiplication. This is accomplished by taking off the product, as heretofore described, with the accounting machine carriage set in the position to introduce either a first factor or a second factor into the setting gears E of the multiplying unit. No number keys on the keyboard are pressed, but the motor bar is actuated. The product is then printed and set on the setting gears E as the first or second factor of a subsequent multiplication as may be desired. No special mechanism is required to do this; the ability to reset products in the multiplying unit without the use of the keyboard being a natural consequence of the relationship between the two machines which has already been described. This is very important in a series of multiplications as is required in chain discount because it saved the operator the work of resetting the product in the keyboard.

It is also important in certain engineering calculations involving the repetitive use of a factor such as is required in compound interest work or other geometric progressions, in raising of numbers to the *n*th power, etc. With the constant factor set, such a series once started will proceed automatically without the necessity of resetting the factors or the products of the successive steps of the progression. Thus two keyboard settings will be sufficient to calculate the product of an extended series. Totals from the accumulators 4 of the accounting machine may also be introduced as factors into the setting gears E in the same manner and for the same reasons as heretofore explained.

We have now described all the electrical and mechanical elements of the machine and explained how they function. We shall now further illustrate the functioning of our machine by an example of a multiplication as performed on our machine. In this example we will make particular reference to the wiring diagram (Figure 71) and the timing chart (Figure 86) which we will first describe. However, we shall make no attempt to describe the nature or method of operation of the elements except in a general way, as reference to the foregoing description will give adequate detail.

In the wiring diagram (Figure 71) the interrelationship of the various electrical elements is shown schematically. Starting from its source the current flows to the feed brush of the switch 257 and also to the feed brush of the switch 258.

As has been explained, switches 257 and 258 are closed separately so as to provide two paths for the current. Taking first the switch 257: This contains a plurality of leads each of which is connected to one of the feed plates 252. For simplicity only two such leads are shown in the wiring diagram as these serve to show completely every circuit involved. Riding on these feed plates are brushes 7—*b* which are continuously in contact therewith. Connected with brushes 7—*b* are brushes 7—*a* which are initially in contact with insulating plates 265, but the brush pairs 7—*a* and 7—*b* may be moved so that each brush 7—*a* may contact any one of the pins 255. Each pin 255 is connected to the plate 262 which has the same digital value as the pin and contacts no other plate. The digital value of the plates 262 is shown in Figure 71 and the digital value of the pins 255 is indicated by the full line numerals in Figure 78. As has been previously stated, there are nine plates 262 associated with each insulating plate 265 and each plate 262 is connected to a brush 230. The brush pairs 7—*a* and 7—*b* may therefore be moved to carry current through an appropriate pin 255 and its associated plate 262 to any one of the nine brushes 230 associated with a particular insulating plate 265. The brushes 230 are in continuous contact with the brushes 270 which are movable to contact a plurality of wires 269. The wires 269 serve as contacts and also serve to carry current to the solenoids 344. Each brush 270 which carries current representative of a digital value of "one" may only contact a wire 269 terminating in a solenoid 344 having a digital value of "one," and so on for digital values up to nine. However, since a fixed stop representative of nine has been provided in the accumulator control as previously explained, a resistance wire has been substituted for the #9 solenoid. The current is thus brought to the selected solenoid or to the resistance wire and flows through the selected element to the common lead 528 and thence through the zero solenoid to the source of current.

Let us now follow the paths of the current through the switch 258. When this switch closes switch 257 is open and the current will flow to feed plates 253. Riding on these feed plates and continuously in contact therewith are brushes 7—*c*. Paired with brushes 7—*c* are brushes 7—*d* which are initially in contact with insulating plate 264, but brush pairs 7—*c* and 7—*d* may be moved so that each brush 7—*d* may contact any one of pins 256. Each pin 256 is connected to a plate 267 having a digital value corresponding to the digital value of the pin 256 and contacts no other plate. The digital value of the plates 267 is shown in Figure 71 and the digital value of the pins 256 is indicated by the dotted line numerals in Figure 78. As has been stated, these plates represent left hand components of partial products while plates 262 represent right hand components. There are eight plates 267 associated with each insulating plate 264 and each plate 267 is connected to a brush 230. From the brushes 230 the current flows as previously described through the brushes 270, the wires 269, the selected solenoids representing the digital values from 1 to 8 of the next higher order, the common leads 528, the zero coils and back to the source of current.

Each brush pair 7, i. e., 7*a*, *b*, *c* and *d*, being mounted on the rack 71, moves horizontally, independent of any other brush pair, but all brush pairs 7 move vertically together with the frame 139. All the brushes 270 move as a unit with frame 229. All other electrical elements illustrated in Figure 71 are stationary except the switches 257 and 258.

Figure 86:
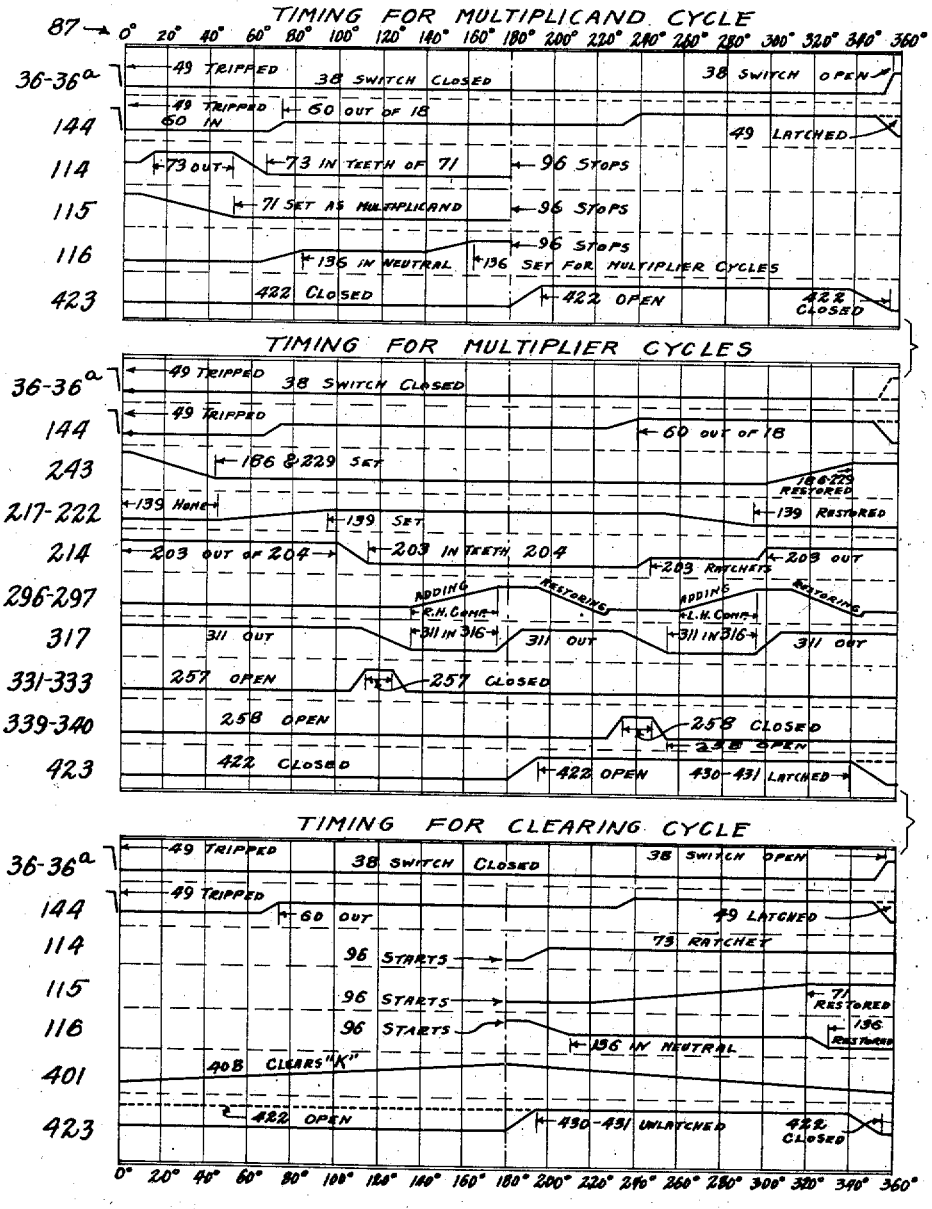
Figure 86 is a timing chart showing the timed relationship of the various operations of the machine.

Figure 86 is a timing chart showing what elements are operating at a given time. We have explained how under control of one revolution clutch mechanism, the gear 87 (Figure 23) tends to make one revolution when the motor is started and having done so comes to rest unless the control bail 44 is held and thus prevents the motor from being stopped. One revolution of gear 87 is called a cycle and is represented on the timing chart by 360 degrees. The timing chart relates the operation of each element to the other elements in terms of the angular position of gear 87 as it moves through one complete revolution.

As has been explained, the first operating cycle is the multiplicand cycle. It begins with the simultaneous tripping of latch 49 and latch 35 as already described.

Tripping latch 49 releases arm 51, and rod 55 moving downward trips latch 109 (Figure 30). Latch 35 releases switch arm 36 which closes the switch 38 and starts the motor. As will be seen from the chart, this tripping operation is followed immediately by the engagement of the liners 60 with the pinions 18. Gear 94 being permanently connected to the driving gears has just begun to move and latch 109 being tripped, gear 94 picks up shaft 96 which carries the multiplicand control cams 114, 115 and 116. It carries this shaft 96 for 180 degrees and the shaft is then declutched by pawl 107. Cam 114 as it turns throws out the liners 73 and holds them out for about 35 degrees during which period cam 115 permits the springs 126 to drive the racks 71 and the brushes 7 to positions representative of the multiplicand. Cam 114 then permits liners 73 to return under their spring tension and these liners hold racks 71 and brushes 7 in position. At about 65 degrees cam 116 begins to act on lever 133 to raise frame 136. There is a dwell from 80 degrees to 140 degrees when the frame 136 is raised half way. During this time the pinions 18 return to normal, the cam 144 acting on roller 145 having concurrently disengaged the liners 60. Cam 116 now continues to raise the frame 136 to its highest position, i. e., with the brushes 7 over the first row of contacts 255. Cam 144 being borne on gear 94 continues to rotate moving the liners 60 still further from the pinions 18 but this action has no significance in the multiplicand cycle.

At about 355 degrees latches 49 and 35 are relatched, control bail 44 being free, and the gears continue under their momentum for about five degrees and then the driving shaft is declutched by the one revolution clutch. As shown in the chart, cam 423 holds the switch 422 open during most of last 180° of the cycle, thus preventing the concurrent operation of the accounting machine.

The multiplier cycle also begins with the tripping of the latch 49 and the latch 35. However, as has been explained, the control link for this cycle also rotates yoke 163, moving clutch control links 164 and 173 (Figure 41) so as to engage cam shaft 83 to driving gear 87 and cam shaft 167 to driving gear 168. The cams on these shafts control the functioning of the elements during the multiplier cycles. First cam 243 permits spring 244 (Figure 47) to set the control discs 186 and the denominational distributor brush frame 229. This setting is complete at about 45 degrees. Then cam 217 drives the multiplier brush frame 139 to position. This movement is completed at approximately 95 degrees and cam 214 engages liner 203 to hold brush frame 139 in position until about 250 degrees of rotation have taken place, then cam 222 drives the brush frame 139 back to its starting position. At about 135 degrees of rotation cam pin 333 on cam 331 actuates the switch 257 to set the units component in the accumulator control. Thereafter box cam 317 pushes the pinions 311 into engagement with the product accumulator. The cam 297 then rotates these pinions 311 and holds them in the rotated position while cam 317 withdraws them from the product accumulator. Cam 296 then restores the accumulator control mechanism and pinions 311 to their initial position. As soon as this restoring operation is complete, pin 339 on clutch plate 340 (Figure 74) actuates switch 258 to introduce the tens component in the accumulator control. Continued rotation of cams 317, 297 and 296 serves to engage, operate and disengage the pinions 311 to add the tens component, the timing and manner of operation being the same as for the units component. As soon as the tens component has been added, cam 243 drives the control discs 186 and the denominational distributor 229 back to the initial position and the cycle is complete. During this cycle cam 144 is rotating as it is also during the multiplicand cycle. At about 62 degrees this cam pulls the link 112 (Figures 30 and 31) and through rod 55 rotates the pivoted levers 56 about pin 58. One and only one lever 191 is in position with its tip 377 opposite the tip 376 of the associated pivoted lever 56. The first action of cam 144 serves to move these two tips nearly into contact, all other pivoted levers 56 moving idly. At about 230 degrees link 112 is given a further upward impulse by cam 144 which raises rod 55 further. Because of the contact between tips 376 and 377 the appropriate pivoted lever 56 pushes upward on link 59, raising liner 60 and releasing the appropriate pinion 18 to return to normal. All other pinions 18 are unaffected since their associated pivoted levers 56 move idly. As has been explained, if only one pinion 18 is set (i. e., if there is only one multiplier digit) bail 44 will now be free and the clearing cycle will begin automatically. If, however, other pinions 18 remain set, other multiplier cycles will follow exactly like the first until all pinions 18 have been cleared out. During the first multiplier cycle cam 423 opens switch 422 and it is held open until the end of the clearing cycle, as explained under the heading Safety interlock.

At the end of each multiplier cycle the latches 49 and 35 tend to reset themselves but are prevented from so doing by control bail 44. It has been explained how the last multiplier cycle frees control bail 44 and permits this latching operation to take place and also how as the latching operation does take place it releases a trigger mechanism set at the beginning of the multiplier cycles which immediately unlatches these elements to start the clearing cycle. Although the latching operation is not fully completed before it is reversed, nevertheless it can be said that in effect the clearing cycle starts with the unlatching of these elements. Borne on the gear 86 and continuously rotating with it is cam 401. This cam idly moves arm 399 with each revolution. As has been explained, the release of the trigger mechanism clutches the clearing arm 397 to the arm 399, and through the restoration of yoke 163 declutches the multiplier cam shafts 88 and 167. This resetting of yoke 163 imparts a downward pull on link 106 (Figures 43 and 31). It will be remembered that cam shaft 96 made only ½ revolution during the multiplicand cycle and then was declutched by pawl 107. The downward pull on link 106 releases pawl 107 and moves pawl 103 into the disengaging position, thus permitting cam shaft 96 to make its remaining ½ revolution and restore itself to its initial position. As shown in the timing chart, the cam 401 operates to clear the product accumulator and set the product in the transfer assembly during the first 180 degrees of the clearing cycle. The gear 94 then picks up cam shaft 96 for the remaining 180 degrees. As this shaft revolves, cam 116 will turn to permit the spring 137 to return the frame 136 and frame 139 connected thereto to their initial positions, cam 114 will release the spring pressure on liners 73 to permit restoration of racks 71 and cam 115 will restore the racks 71. The latches 49 and 35 now being free to do so will latch at the end of the clearing cycle which will then be complete. Latch 109 will also be relatched link 106 having been pulled downward. Cam 114 also rotates during the clearing cycle raising liners 60, yoke 163 having been reset, and these liners are latched in the raised position at the end of the clearing cycle.

The printing operation is not shown in the timing chart as it is done by the accounting machine and is controlled by the timing elements therein.

We shall now give an example of the multiplication .36×.54. Figure 71 shows the circuits for the two lowest orders of the machine which serve to illustrate fully all the circuits involved as higher order circuits are identical.

First .36 is set up on the keyboard of the accounting machine and the motor bar pressed. This starts the multiplicand cycle as above described. During this cycle the pinions 18 of the two right-hand banks are rotated to represent .36 and locking in position by the liners 60. The release of the liners 73 as above described then permits the springs to drive the brush pairs 7 of the two right hand banks in a horizontal direction to positions representative of .36. The brush pairs 7 are then locked in position by the liners 73. Then as above described the frame 136 is raised and pushed upward with it the frame 139 carrying the brush pairs 7. There is a dwell during this upward movement in which the pinions 18 are released to return to normal. The movement then continues until it places the brush pairs 7 over the selected contacts 255 in the first row of contacts. In this case over the contacts representing 3 and 6 in the wiring diagram Figure 71, see also Figure 78. Circuits representative of .36 (the multiplicand) have thus been selected. The accounting machine carriage has now tabulated to the position to set the multiplier and .54 is set in the keyboard and the motor bar pressed. This rotates the pinions 18 of the two banks on the extreme right and liners 60 lock them in the rotated position so as to represent the multiplier .54. As frame 136 was moved upward during the multiplicand cycle it carried gears 148 into mesh with gears 20. The movement of gears 20, however, is controlled by pinions 18 as previously described. Thus, pinions 18 now serve through gears 20, 148 and 185, to control the upward motion of racks 183 and racks 183 in turn control the upward motion of brush frame 139 as has previously been described. It has been explained that frame 139 is driven upward through a flexible drive by cam 217, and also how the control discs 186 with the operation stops 188 and the related cutouts 192 serve to allow the pinions 18 to successively control the upward movement of frames 139 and 229. This successive control begins with the extreme right hand pinion 18 that is set. In this case .04. The distributor frame 229 is initially set for multiplication by a digit in the hundredths place and since a pinion 18 in this bank has been set the related operation stop holds shaft 187 and hence distributor frame 229 in the initial position. Cam 217, however, drives the brush frame 139 and with it the brush pairs 7 as far as the pinions 18 will permit; in this case four spaces. Reference to the wiring diagram will show that the brushes 7*a* will then be over the contacts representing 2 and 4 (see also Figure 78) and the brushes 7*d* over the contacts 1 and 2. This represents a right hand component of 24 and a left hand component of 120. It should be here explained that zero (0) in this description always represents a position and is used for convenience in indicating the decimal order of digits. There are no zero keys, no zero contacts, no zero circuits, and no actuation of the machine for any zero in any number. There is a zero release circuit through the zero solenoid but this is solely for the purpose of permitting the bank to become operative and not for the purpose of indicating zero.

The digital value of the product of .36×.04 is of course 144, the sum of the components 120 and 24 as now represented by the circuits selected. Following the circuits thus established will show that these actuate the solenoids of the accumulator control as .0024 and .0120 the sum of which is the decimally correct product .0144, which product is accumulated in the product accumulator operating under the control of the accumulator control. First the switch 257 is closed, which simultaneously actuates the solenoid numbered 2 in the thousandths bank and the solenoid numbered 4 in the ten thousandths bank, and also the zero release solenoids in these two banks. The circuit is closed only long enough to latch down the armature stops 278. During the time the switch 257 is operating the pinions 311 are being engaged with the product accumulator. As soon as engaged, they are held in engagement while the partial product .0024 is imparted to the product accumulator. Then, as previously described, the pinions 311 are disengaged from the product accumulator and the accumulator control is restored to its original position. Thereafter the switch 258 is closed momentarily to latch the armatures 278 of the solenoids numbered 1 in the hundredths bank and the solenoid numbered 2 in the thousandths bank and also the zero release solenoids in these banks. During this time the pinions 311 are being reengaged with product accumulator and when engaged the pinions 311 are driven as before to introduce the partial product .012 in the product accumulator which will then read .0144. Then the pinions 311 are withdrawn and the accumulator control restored as before. As soon the the brushes 7 have delivered the left hand components to the solenoids, the brush frame 139 is returned to its initial position over the first row of contacts 255. Then the denominational brush frame 229 is returned to its initial position if it has been moved from its initial position, which it has not in this case. During this operation the right hand pinion 18 has been released by the action of cam 144 and the pivoted lever 56, as previously described. The pinion 18 which is second from the right, however, still contains the digital value 5 since the pivoted lever 56 in this bank moved idly as has been previously explained.

This pinion 18 being set, bail 44 is held and the motor will continue to run starting the second multiplier cycle. The same sequence of events takes place in this cycle as in the previous one. However, the lever 40 in the tenths bank (i. e. the one associated with pinion 18 containing the multiplier 5) is the only one now set. Shaft 187 will, therefore, rotate under the pull of spring 244 until it is stopped by the related operations stop 188 on a distance of one space. This will move the denominational distributor 229 to the position in which all the brushes 270 are over wires 269 representing the next higher denominational order but of the same digital value. The brushes 7 will now move from the position representing .36 (the multiplicand) five spaces to a position where they contact pins 255 representing 50, the digital value of the right hand component of the product of 36×5, and contact pins 256 representing 130 the left hand component of 36×5. However, the denominational distributor being advanced one space these digital values will actuate solenoids in the accumulator control having decimal values of .0500 and .1300 respectively. This will be accumulated in the product accumulator as .18 in the manner previously described. There is already in the product accumulator the value .0144 so this will bring the reading to .1944, the product of .36×.54.

Having completed the second multiplier cycle there will be no pinions 18 remaining set and bail 44 will be free, thus permitting the double trigger latch 159, 153, Figure 40, to be released to start the clearing cycle as previously explained. The two right hand gears in the transfer assembly are adapted to engage the two right hand racks 2 in the accounting machine (or extensions thereof). These racks represent tenths and hundredths because the accounting machine is designed primarily for handling figures representing dollars and cents. When, therefore, the product accumulator is cleared into the transfer assembly as previously described, the thousandths and ten thousandths digits will be dropped and the transfer assembly will contain .19, the correct product in cents, or to two places, and it is this product which will be printed during the printing cycle of the accounting machine. It should be understood, however, that the position of the decimal point on the keyboard and in the printer is a purely arbitrary matter. This could have been fixed normally at five or any other desired number of places to the right of the decimal point or could be variable. The functioning of the multiplying unit is in nowise limited to a two decimal place machine.

Having fully described our invention and one particular adaptation thereof to a particular type of accounting machine, it will be obvious to those skilled in the art that our invention is not limited to the adaptation illustrated. It is, however, particularly useful and economical in many cases to utilize all of the operative elements of the accounting machine as supplementing our multiplying unit without the necessity of repetition of these operating elements or parts in the multiplying unit and without limiting the accounting machine in the performance of its original functions.

We claim:

1. A movable element settable to indicate by the amount of movement thereof a multiplicand digit and a multiplier digit, a movable brush, and means interposed between said movable brush and said movable element to move said brush to a position representative of a multiplicand, and to move said brush at right angles thereto to a position representative of the multiplier.

2. In a multiplying unit, a multiplying circuit member having contacts positioned to represent products, a movable element settable to indicate by the amount of movement a multiplicand digit and a multiplier digit, a movable brush for selecting a product position, and means interposed between said movable brush and said movable element to move said brush to a position representative of a multiplicand, and to move said brush at right angles thereto to a position representative of the multiplier.

3. In a multiplying unit, the combination of a plurality of multiplying circuit members, each having electrical contacts representative of the right-hand components of a partial product and each having electrical contacts representative of left-hand components of a partial product, said multiplying circuit members being mounted spaced apart in side to side relation with the right-hand component contacts of one member adjacent the left-hand component contacts of a second member, circuit selecting members interposed between said multiplying circuit members to engage said right-hand component contacts of one multiplying member and said left-hand component contacts of an adjacent multiplying circuit member to complete electrical circuits, electrical accumulating means, and means interposed in said circuits whereby the said circuits are completed successively to contacts representative of right and left-hand components of partial products.

4. In a multiplying machine, the combination of a moving element, the magnitude of movement of which is determined by the digital value of a multiplicand and multiplier successively, a brush operatively connected to said moving element, and means interposed between the brush and the moving element for driving the brush through a path determined by the magnitude of the movement of said movable member as determined by the digital value of the multiplicand, and means for driving the brush through a path at right-angles to the first path determined by the movement of said movable element with respect to the digital value of the multiplier.

5. In a multiplying machine, contacts representative of products, brushes for carrying current to said contacts, means for moving said brushes individually to positions representative of the first factor of a multiplication, and means for selectively moving the individually positioned brushes as a unit to positions representing the product of all the digits in the first factor by each significant digit in the second factor.

6. In a multiplying unit, the combination of an electrical multiplying member having contacts representative of the right-hand component of a multiplication of one number by another, brush members, means for shifting the brush members in one direction representative of a unidigit number, and means for shifting the brush members in a second direction representative of a second unidigit number whereby the brush members will be positioned in contact with one of said contacts representative of the right-hand component of the product of said numbers.

7. In a multiplying machine, the combination of electrical multiplying members, each having electrical contacts representative of right-hand components of a partial product and each having electrical contacts representative of left-hand components of a partial product of the next lower order as respects said right-hand components, brush elements, means for moving the brush elements individually in one direction distances representative of the digits of the first factor, means for moving the brush elements as a unit through a second direction representing a digit of a second factor whereby any of said brush elements is moved to a position in which such brush element may be electrically connected to a contact representative of the right-hand digit of said partial product and may be also electrically connected to a contact representative of the left-hand digit of said partial product.

8. In a computing machine, multiplying circuit devices having predetermined contacts representative of the partial products of two unidigit factors, movable brushes for selecting contacts representative of said partial products, means for imparting motion to the brushes which is representative of one digit of a multiplicand and one digit of a multiplier so as to move said brushes to contacts representative of the partial product of said unidigit factors, a denominational distributor having contact positions representative of decimal values and movable brushes for selecting decimal value positions, means for moving the brushes to the decimal value positions, means for establishing circuits through said multiplying circuit devices and said denominational distributor, an accumulator operatively controlled by said circuits to give a final product, and means operably associated with the accumulator for recording the final product.

9. In a computing machine, multiplying circuit devices having predetermined contacts representative of the partial products of two unidigit factors, movable brushes for selecting contacts representative of said partial products, means for imparting motion to the brushes which is representative of one digit of a multiplicand and one digit of a multiplier so as to move said brushes to contacts representative of the partial product of said unidigit factors, a denominational distributor having contact positions representative of decimal values and brushes movable to the decimal value positions, means for moving the latter said brushes to the decimal value positions, a plurality of electro-magnets, means for establishing circuits through said multiplying circuit devices and said denominational distributor and said electro-magnets, an accumulator operably controlled by said electro-magnets to give a final product, printing devices, and means operably associated with the accumulator for controlling the printing devices to print the final product.

10. In a multiplying machine, first factor and second factor receiving devices, means to give partial products of the first factor by the second factor, an accumulator for accumulating partial products to give a final product, decimal shift means, including a movable member intermediate to said partial product means and said accumulator to place the partial products in the accumulator in the appropriate decimal order, said decimal shift means also including a means selectively controlled by the second factor receiving devices to control the movement of the movable member, said last named means including a member having stop means related thereto, and said last named member being operably connected to said movable member.

11. In a multiplying machine, first factor and second factor receiving devices normally representing predetermined decimal values, means to give partial products of the first factor by the second factor, an accumulator for accumulating partial products to give a final product, decimal shift means, including a movable member intermediate to said partial product means and said accumulator to place the partial products in the accumulator in the decimal order appropriate to the normal decimal values set up in the first factor and second factor receiving devices, said decimal shift means also including a means controlled by the second factor receiving device to control the movement of the movable member, said last named means including a member having staggered cut-outs and stop means and said last named member being operably connected to said movable member, means for selectively adjusting the operable connection between said member having stop means and said movable member in advance of setting factors in said receiving devices so as to vary the normal decimal relationship existing between said first factor and second factor receiving devices and said accumulator.

12. In a multiplying unit, the combination of an electrical multiplying member having contacts representative of the left-hand component of a multiplication of one number by another, brush members, means for shifting the brush members in one direction representative of a unidigit number, and means for shifting the brush members in a second direction representative of a second unidigit number whereby the brush members will be positioned in contact with one of said contacts representative of the left-hand component of the product of said numbers.

13. In a cyclically operable multiplying machine, a keyboard for setting up digits in decimal orders to represent numbers to be used as factors in a multiplication, an accumulator for accumulating partial products to give a final product, a plurality of digit printing elements, one for each decimal order of the accumulator, a plurality of racks, each rack being operatively connected to a digit printing element, selective operating devices to cause the racks to move and to cause said printing elements to print the numbers, multiplicand receiving devices, devices cooperable with said multiplicand receiving devices and with said selective operating devices to cause an initial operation of the racks to effect the positioning of said multiplicand receiving devices to represent all the digits of a multiplicand set up on the keyboard and to print said multiplicand, multiplier receiving devices, devices cooperable with said multiplier receiving devices and with said selective operating devices to cause a second operation of the racks to effect the positioning of said multiplier receiving devices to represent all of the digits of a multiplier set up on the keyboard and to print said multiplier, devices operatively independent of the said selective operating devices and racks including partial product multiplying and decimal positioning mechanisms cooperable with said multiplicand and multiplier receiving devices for imparting to the accumulator in successive cycles of operation the partial products of all the digits of the multiplicand by each digit of the multiplier so as to accumulate a final product in the accumulator in the decimal position appropriate to the factors set up on the keyboard, and devices cooperable with the multiplier receiving devices and with the accumulator to cause a third operation of the racks by said selective operating devices to print the accumulated final product.

14. In a multiplying machine, a keyboard for setting up digits in decimal orders to represent numbers to be used as factors in a multiplication, an accumulator for accumulating partial products to give a final product, printing mechanism, racks cooperable with said keyboard, accumulator and printing mechanism, selective operating devices to cause operation of said racks and printing mechanism, multiplicand receiving devices, devices cooperable with said multiplicand receiving devices and said selective operating devices to cause an initial operation of said racks to effect the positioning of said multiplicand receiving devices to represent all of the digits of a multiplicand set up on the keyboard and to print said multiplicand, multiplier receiving devices, devices cooperable with said multiplier receiving devices and with said selective operating devices to cause a second operation of the racks to effect the positioning of said multiplier receiving devices to represent all of the digits of the multiplier set up on the keyboard and to print said multiplier, devices operatively independent of the said selective operating devices and racks including partial product multiplying and decimal positioning mechanism cooperable with said multiplicand and multiplier receiving devices for imparting to said accumulator the partial products of all of the digits of the multiplicand by each digit of the multiplier so as to accumulate a final product in said accumulator in the decimal position appropriate to the factors set up on the keyboard, and devices responsive to the entry in said accumulator of the last of said partial products for controlling said selective operating devices to cause a third operation of the racks to print the accumulated final product.

15. In a multiplying machine, a keyboard for setting up digits in decimal orders to represent numbers to be used as factors in a multiplication, an accumulator for accumulating partial products to give a final product, printing mechanism, racks cooperable with said keyboard, accumulator and printing mechanism, selective operating devices to cause operation of said racks and printing mechanism, multiplicand receiving devices, devices cooperable with said multiplicand receiving devices and said selective operating devices to cause an initial operation of said racks to effect the positioning of said multiplicand receiving devices to represent all of the digits of a multiplicand set up on the keyboard and to print said multiplicand, multiplier receiving devices, devices cooperable with said multiplier receiving devices and with said selective operating devices to cause a second operation of the racks to effect positioning of said multiplier receiving devices to represent all of the digits of the multiplier set up on the keyboard and to print said multiplier, devices operatively independent of the said selective operating devices and racks including electrical circuit partial product multiplying mechanism and decimal positioning mechanism cooperable with said multiplicand and multiplier receiving devices for imparting to said accumulator the partial products of all of the digits of the multiplicand by each digit of the multiplier so as to accumulate a final product in said accumulator in the decimal position appropriate to the factors set up on the keyboard, and devices responsive to the entry in said accumulator of the last of said partial products for controlling said selective operating devices to cause a third operation of the racks to print the accumulated final product.

16. In a cyclically operable multiplying machine, a keyboard, printing mechanism, an accumulator, means for causing the printing mechanism to print numbers in accordance with the numbers set up on the keyboard, multiplicand receiving devices, multiplier receiving devices, means controlled by said first named means for entering in said multiplicand receiving devices a representation of all of the digits of the multiplicand in accordance with the numbers set up on the keyboard, means for rendering said first named means effective upon the second operation thereof for entering in said multiplier receiving devices a representation of all of the digits of the multiplier in accordance with the number set up on the keyboard, means operatively independent of the first named means and associated with said multiplier receiving devices for imparting to the accumulator in successive cycles of operation the partial products of all of the digits of the multiplicand by each digit of the multiplier to accumulate a final product in said accumulator, and means operatively associated with the accumulator and the multiplier receiving devices to cause a third operation of the first named means to print the accumulated final product.

HUGH L. CLARY.
WILLIAM H. PETIT.

REFERENCES CITED

The following references are of record in the file of this patent:

UNITED STATES PATENTS

| Number | Name | Date |
|---|---|---|
| 1,221,927 | Vincent et al. | Apr. 10, 1917 |
| 1,414,978 | Bumstead | May 2, 1922 |
| 1,932,220 | Kottmann | Oct. 24, 1933 |
| 1,966,584 | Gardner | July 17, 1934 |
| 2,084,831 | Baumann et al. | June 22, 1937 |
| 2,216,063 | Brand et al. | Sept. 24, 1940 |
| 2,237,335 | Bryce | Apr. 8, 1941 |
| 2,335,368 | Uhlmann | Nov. 30, 1943 |

FOREIGN PATENTS

| Number | Country | Date |
|---|---|---|
| 9,563 | Great Britain | June 19, 1912 |
| 619,119 | Germany | Sept. 26, 1935 |